(12) United States Patent
Long

(10) Patent No.: US 10,525,511 B2
(45) Date of Patent: Jan. 7, 2020

(54) SYSTEMS, DEVICES, AND/OR METHODS FOR PIPE PIGGING

(71) Applicant: Danton S. Long, Wheeling, WV (US)

(72) Inventor: Danton S. Long, Wheeling, WV (US)

( * ) Notice: Subject to any disclaimer, the term of this patent is extended or adjusted under 35 U.S.C. 154(b) by 356 days.

(21) Appl. No.: 15/411,860

(22) Filed: Jan. 20, 2017

(65) Prior Publication Data

US 2018/0207693 A1 Jul. 26, 2018

Related U.S. Application Data

(60) Provisional application No. 62/354,794, filed on Jun. 26, 2016.

(51) Int. Cl.
*B08B 9/055* (2006.01)
*F16L 55/40* (2006.01)

(52) U.S. Cl.
CPC ............ *B08B 9/0557* (2013.01); *B08B 9/055* (2013.01); *B08B 9/0551* (2013.01); *F16L 55/40* (2013.01)

(58) Field of Classification Search
CPC ..... B08B 9/055; B08B 9/0553; B08B 9/0554; B08B 9/0557
See application file for complete search history.

(56) References Cited

U.S. PATENT DOCUMENTS

| | | | | |
|---|---|---|---|---|
| 3,058,137 A | * | 10/1962 | Doyle | B08B 9/051 15/104.061 |
| 3,106,735 A | * | 10/1963 | Landrum | B08B 9/0553 118/663 |
| 3,673,629 A | * | 7/1972 | Casey | B08B 9/0553 15/104.061 |
| 2009/0307857 A1 | * | 12/2009 | Hestenes | B08B 9/0557 15/104.061 |

* cited by examiner

*Primary Examiner* — Randall E Chin
(74) *Attorney, Agent, or Firm* — Dale Jensen, PLC; Dale Jensen

(57) ABSTRACT

Certain exemplary embodiments can provide a pipe pig. The pipe pig comprises a first mounting hub coupled to a mandrel and a first sealing element. The pipe pig further comprises two chassis, each of which is coupled to the mounting hub and the sealing element.

20 Claims, 52 Drawing Sheets

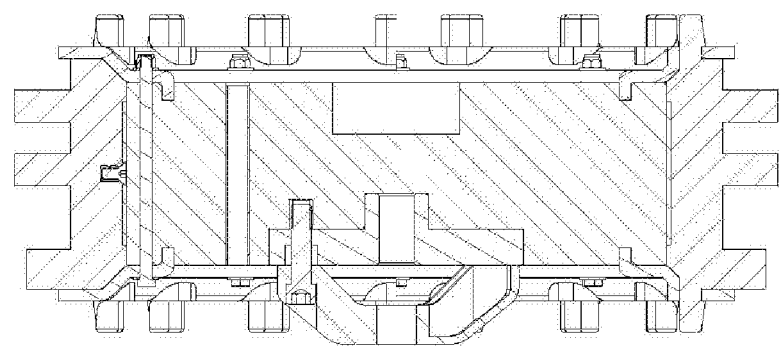
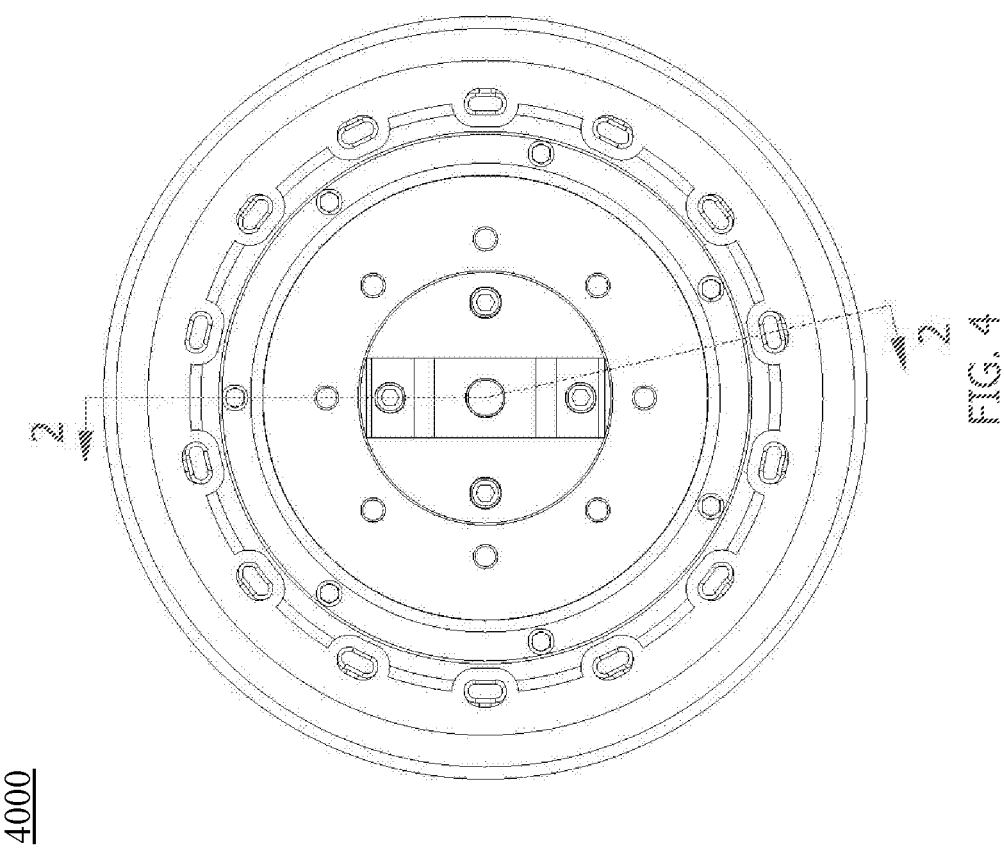
FIG. 4

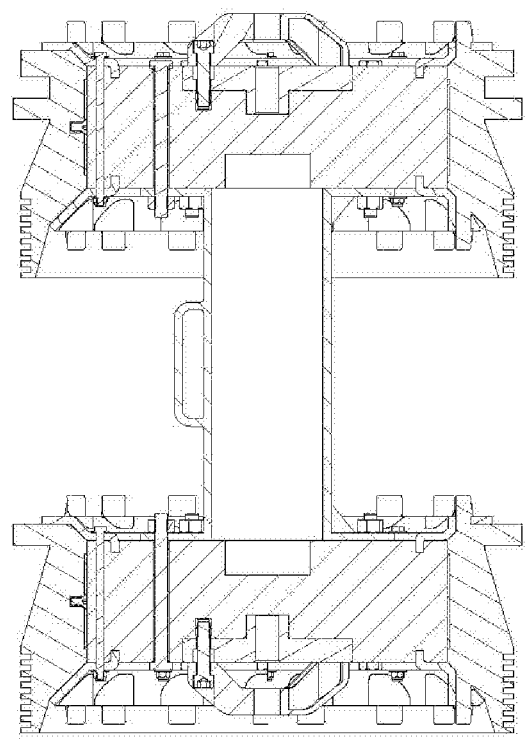
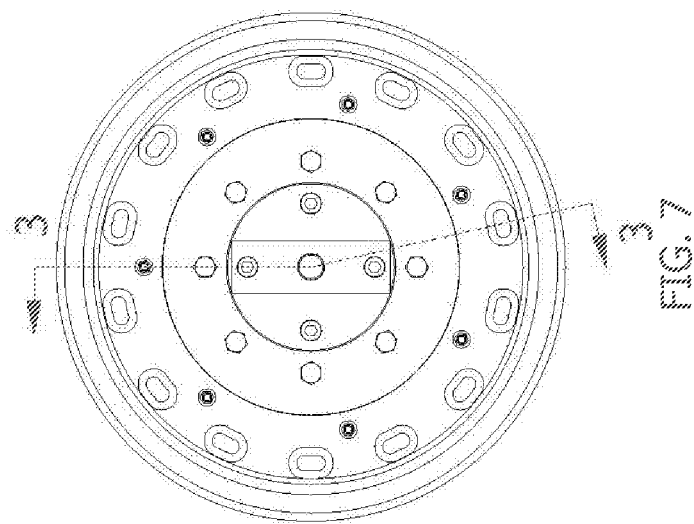
FIG. 7

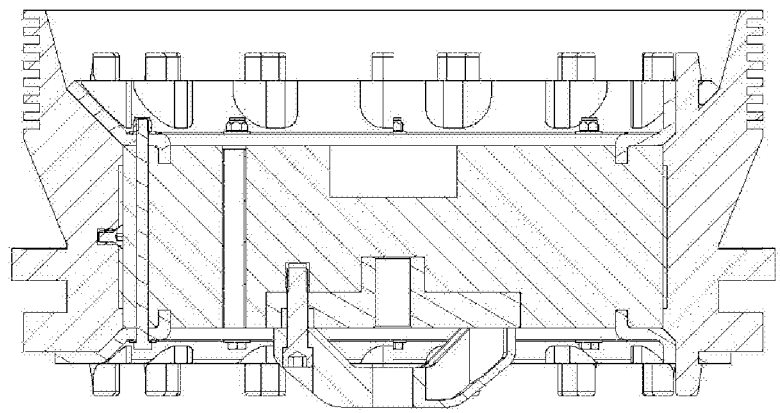
SECTION 4-4
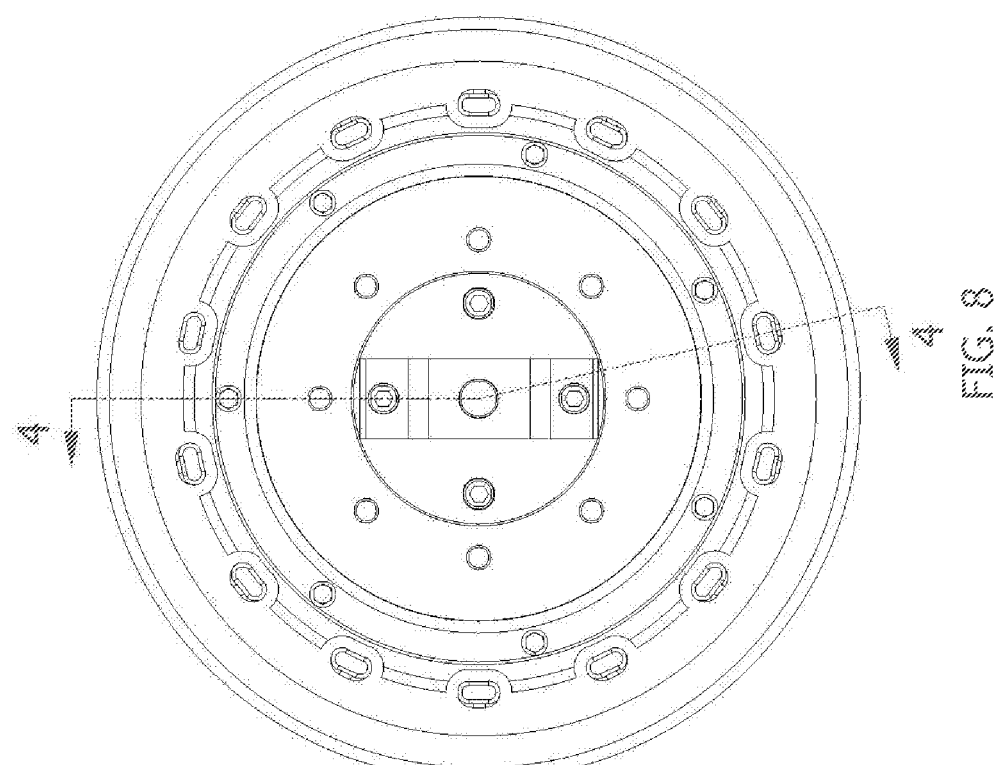
FIG. 8
8000

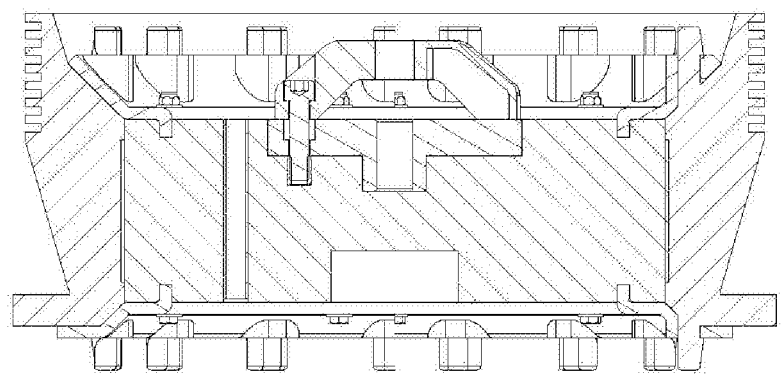
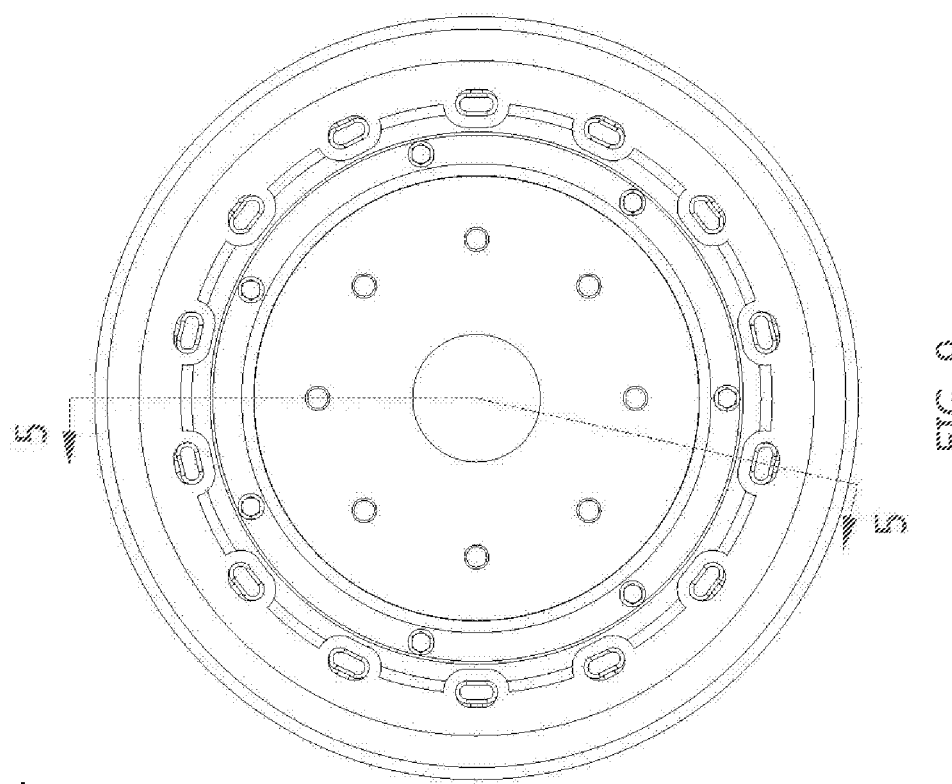
FIG. 9

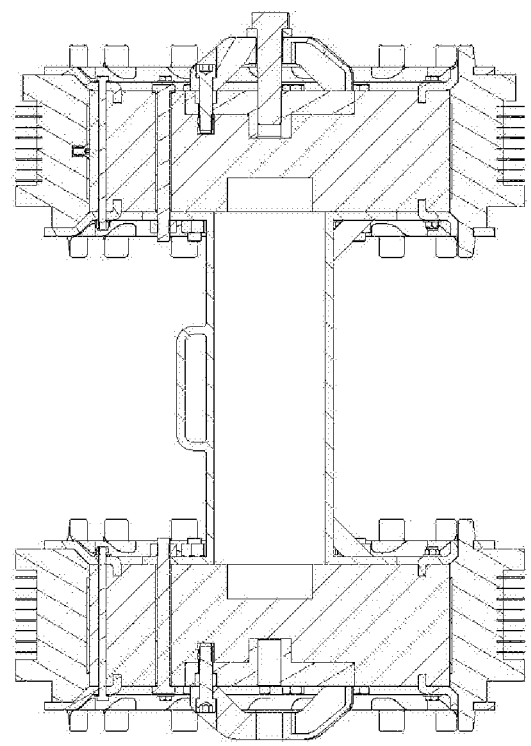
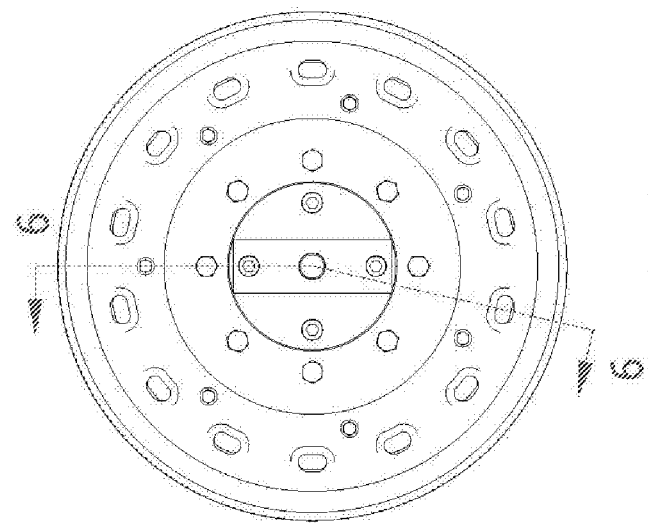
FIG. 12
12000
SECTION 6-6

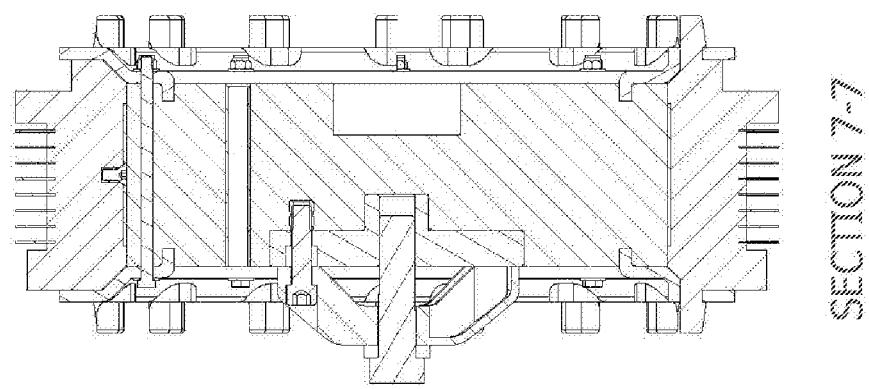
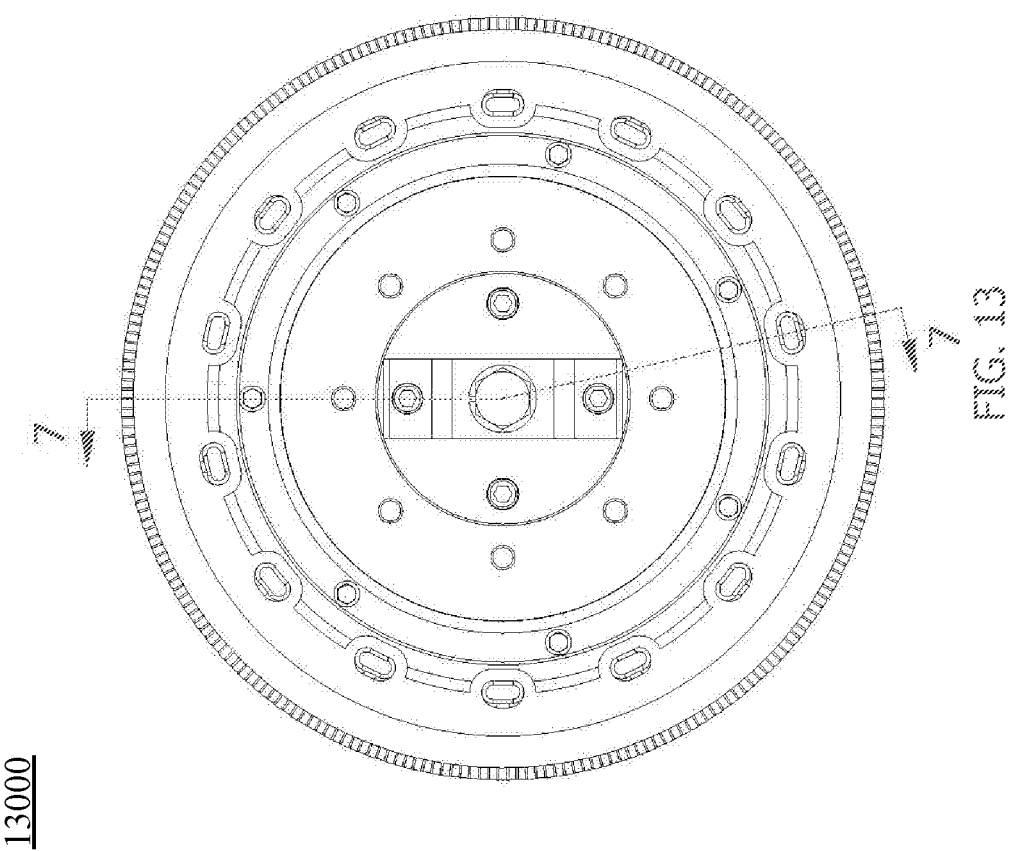

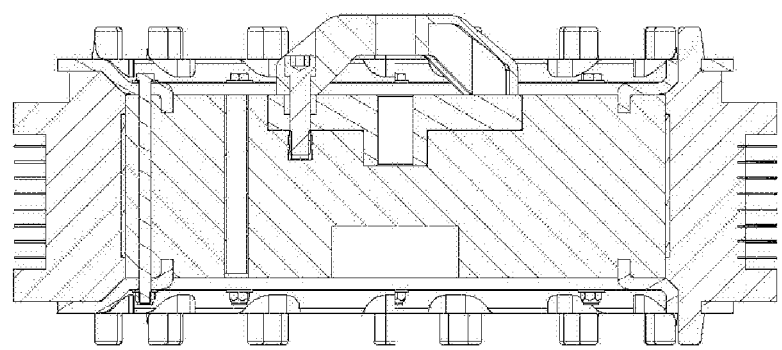
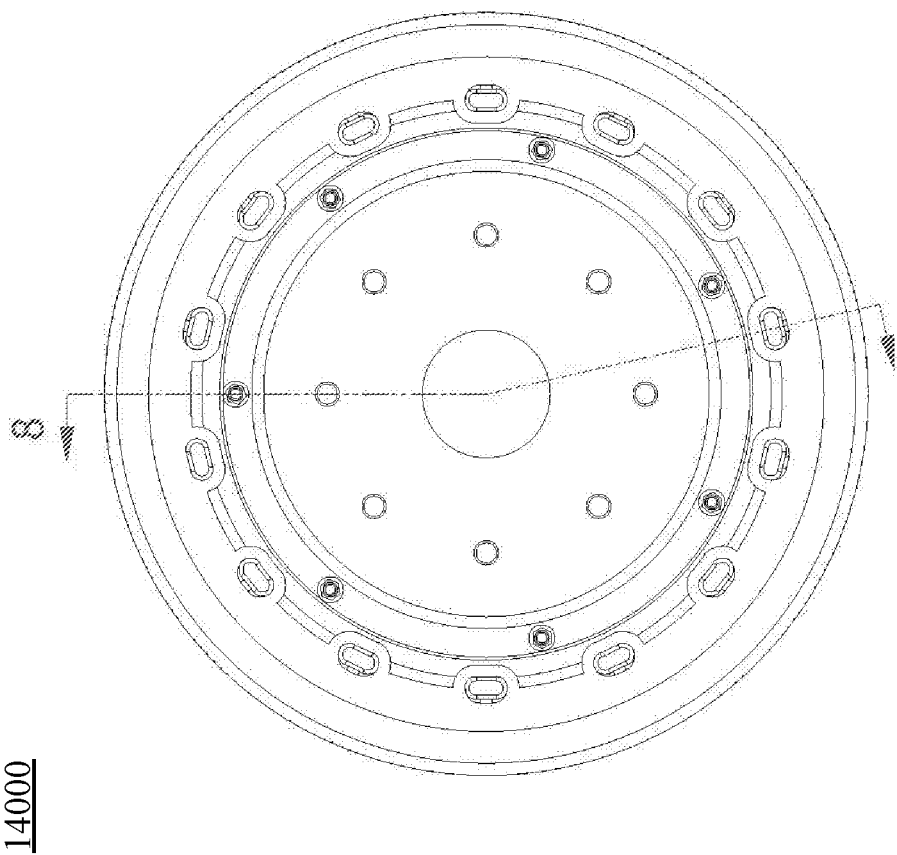
FIG. 14

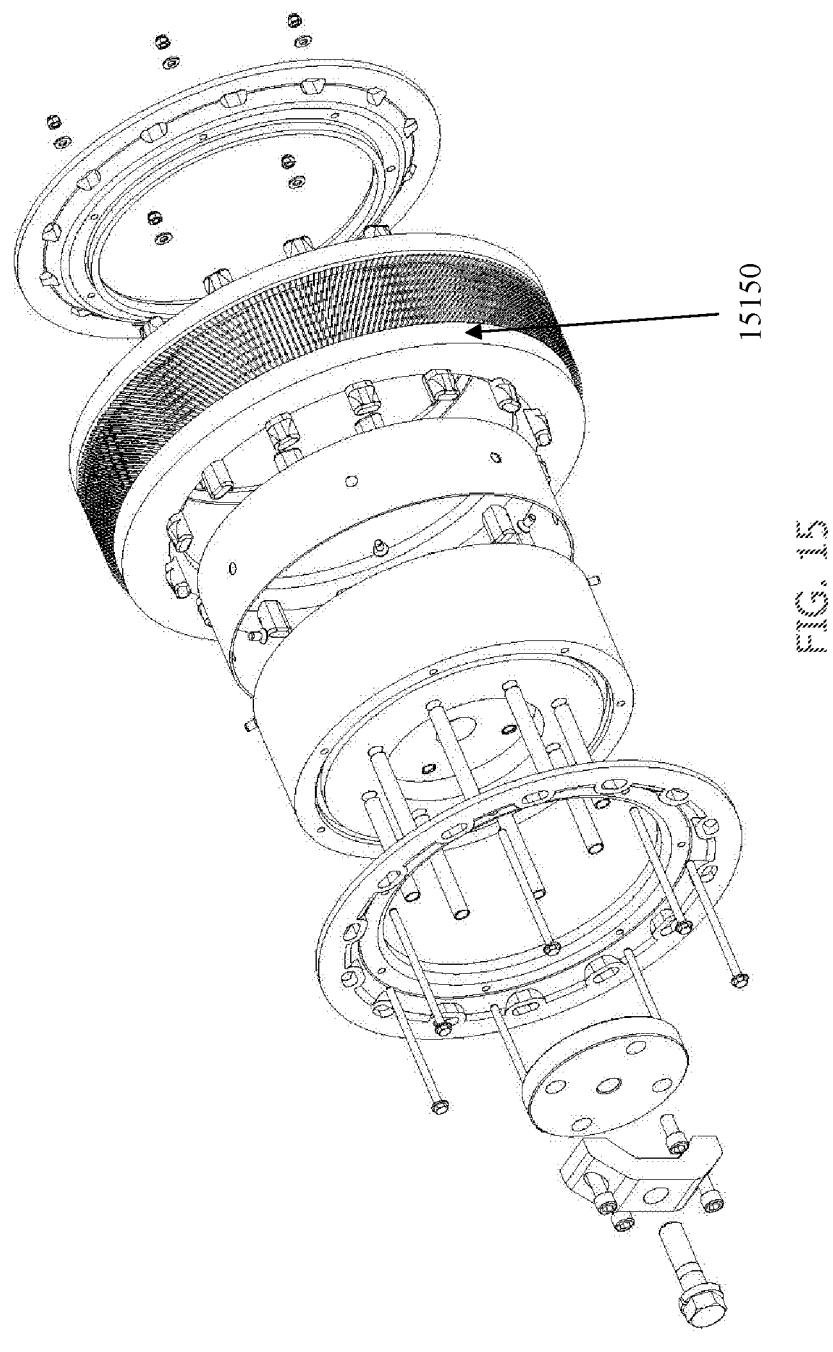

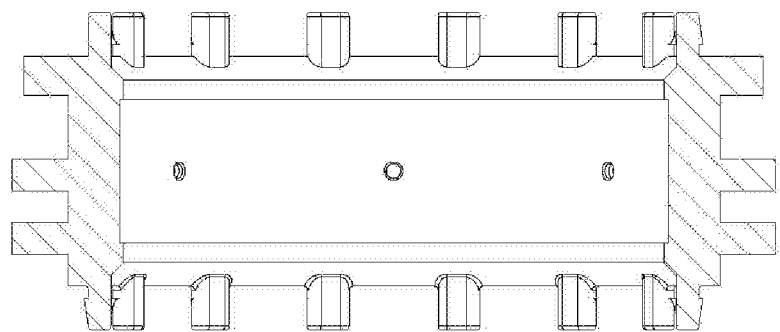
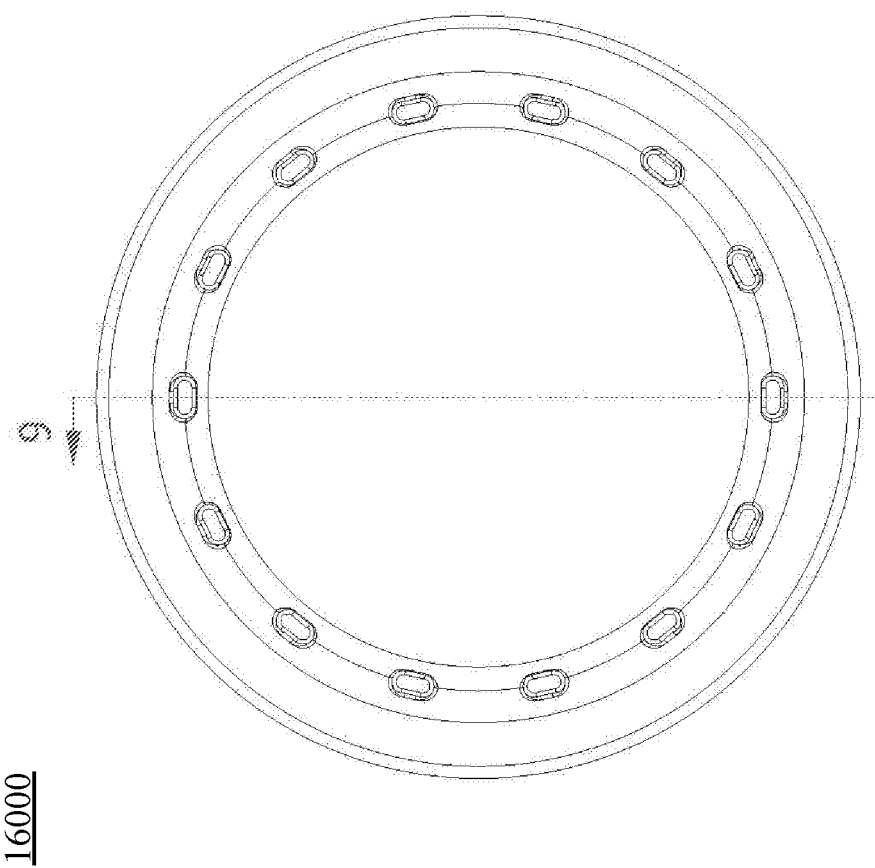

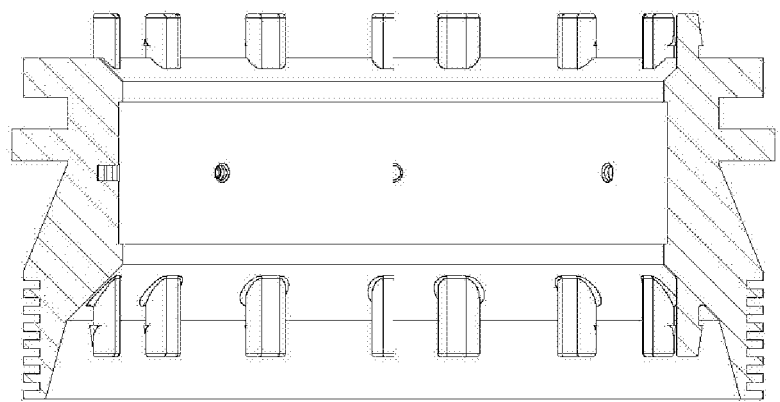
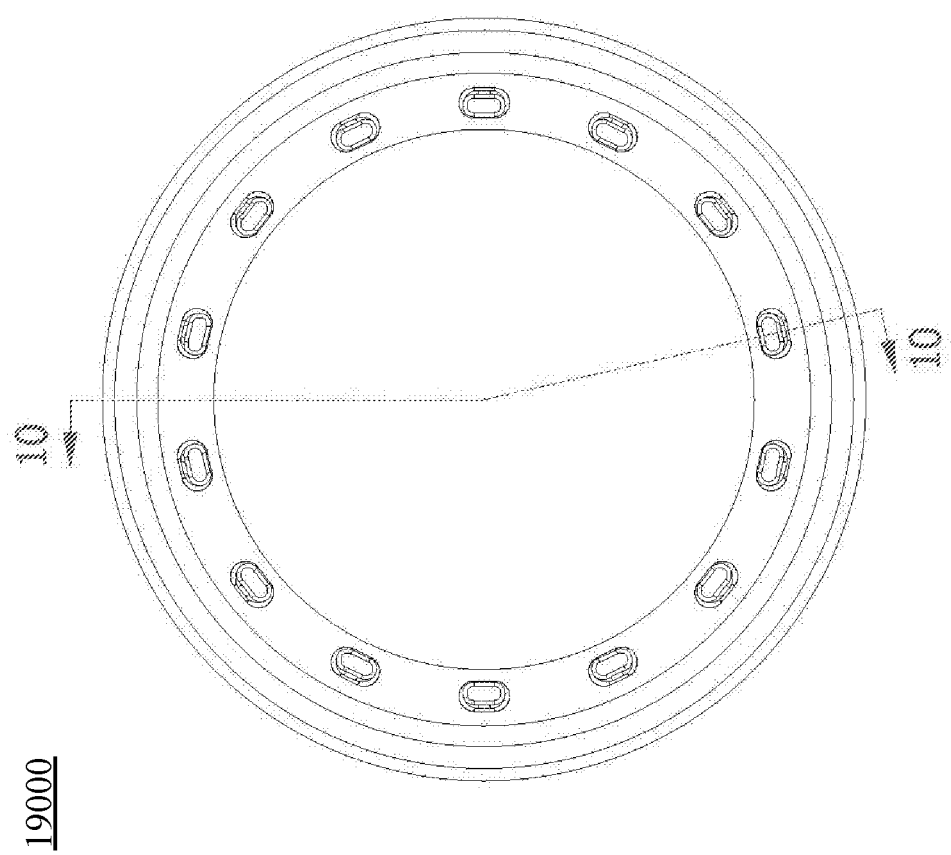

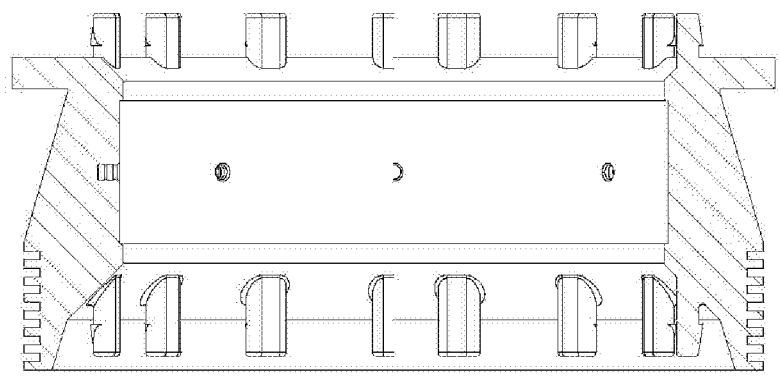
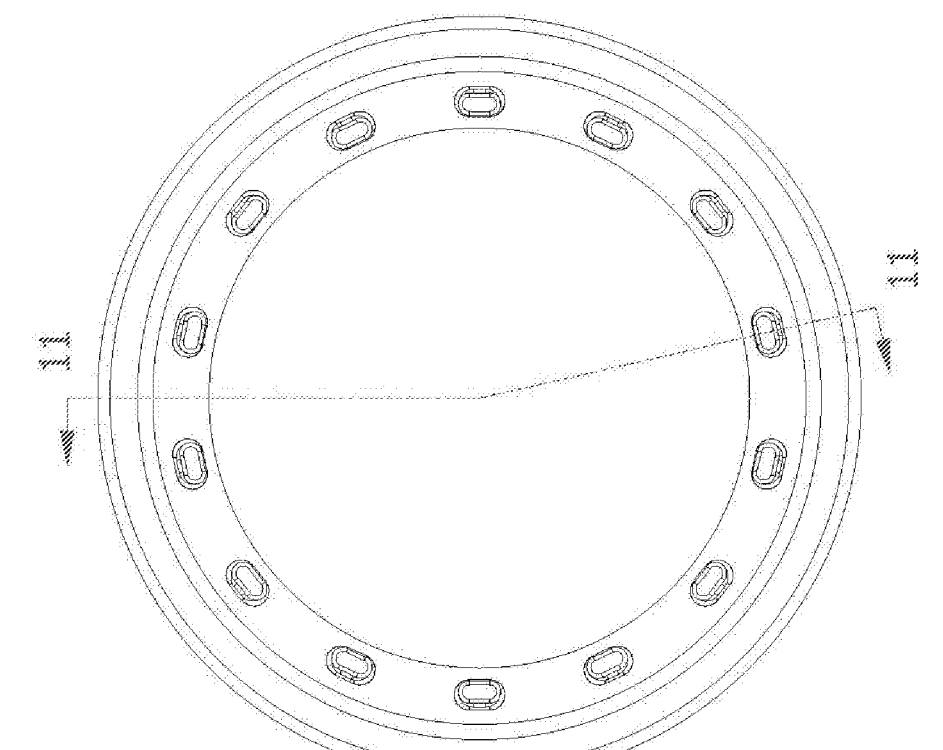
FIG. 22
22000

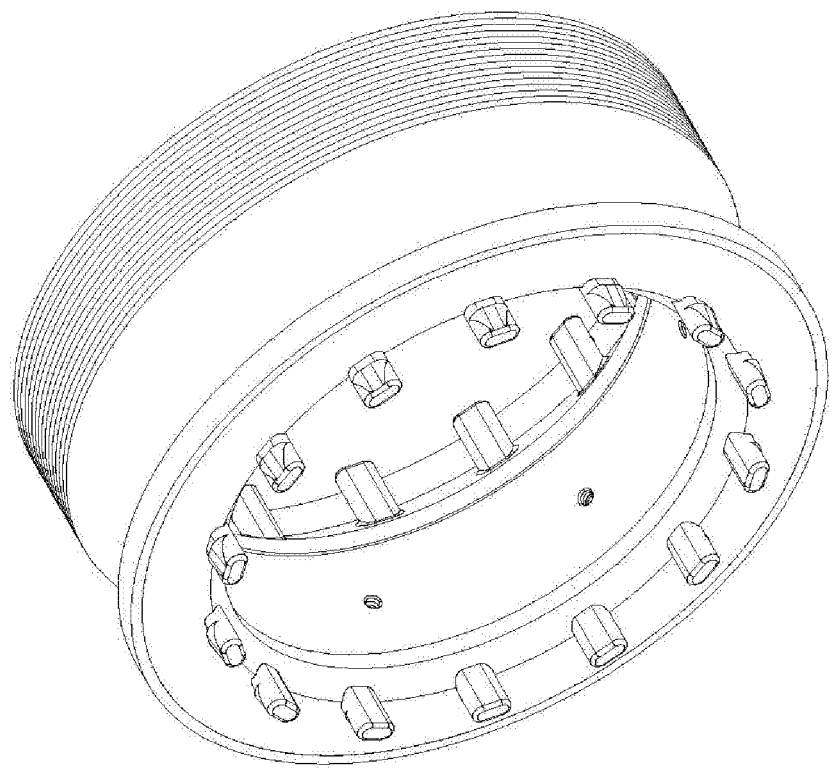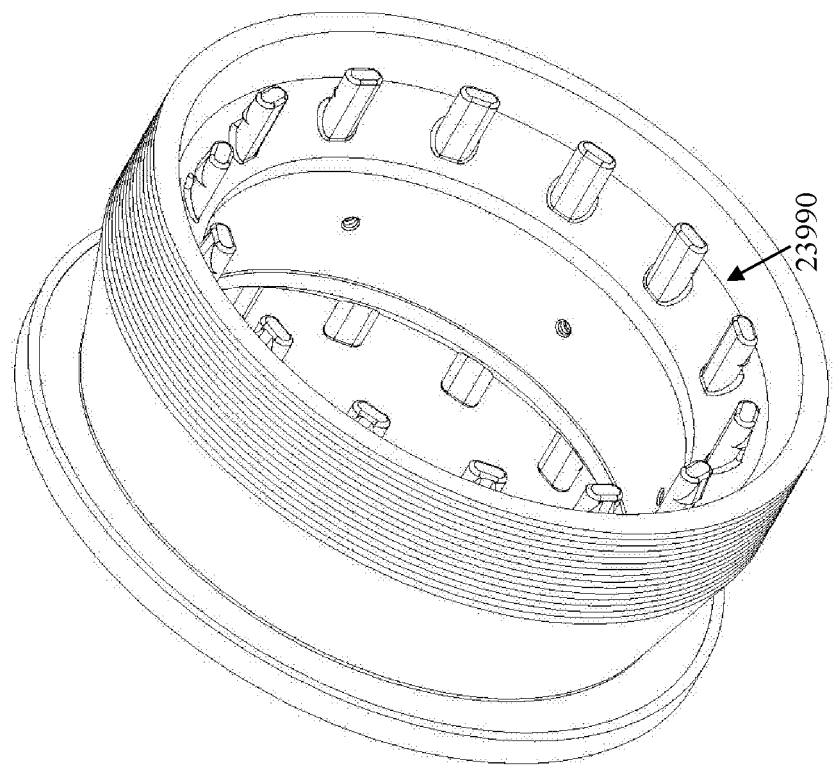

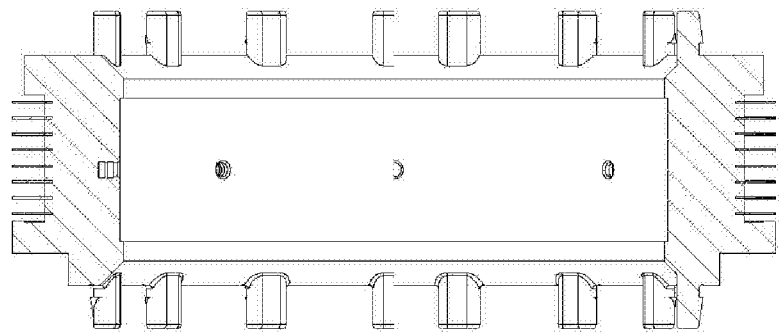
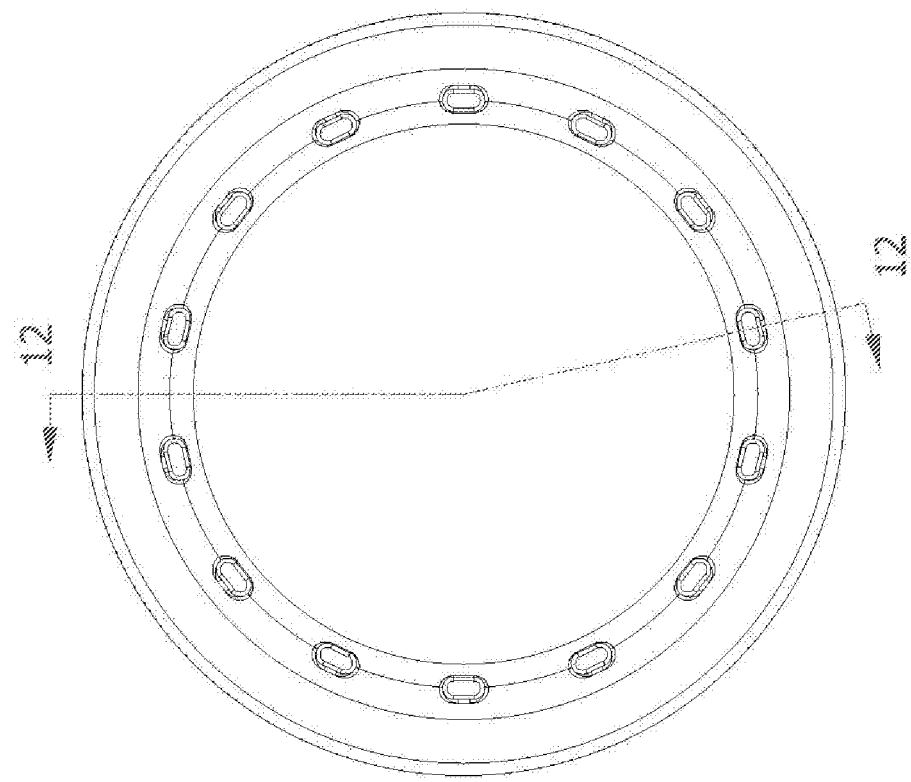

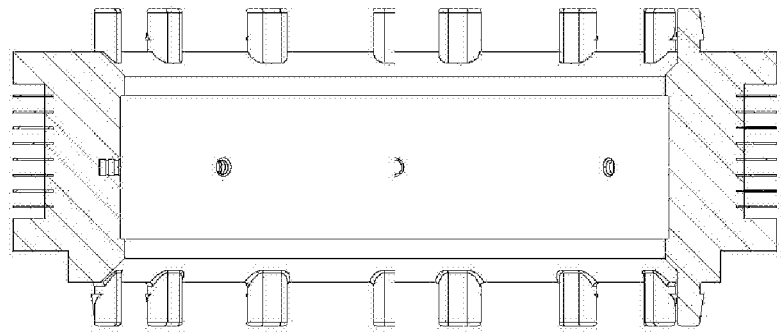
SECTION 13-13
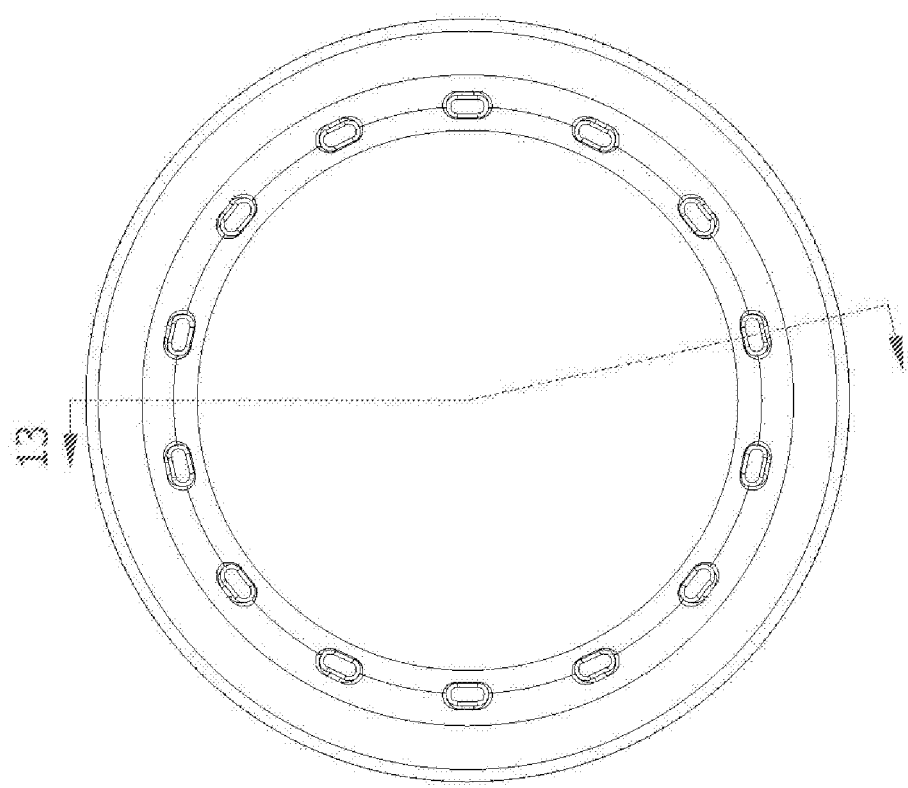
FIG. 28
28000

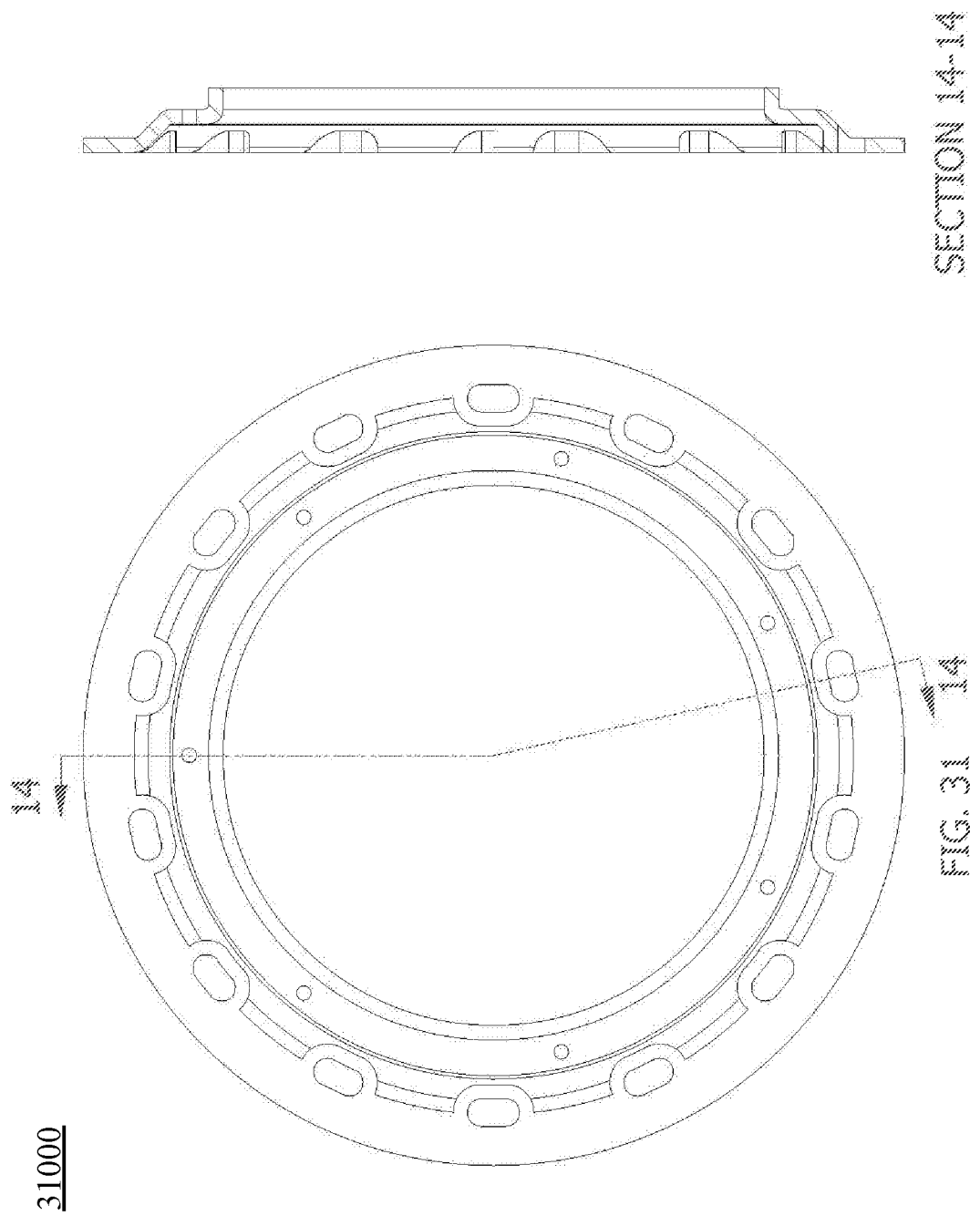

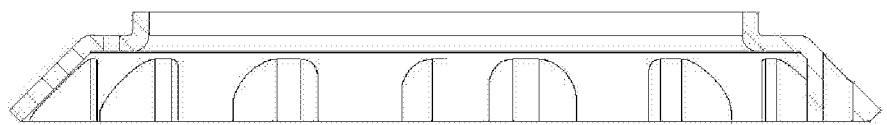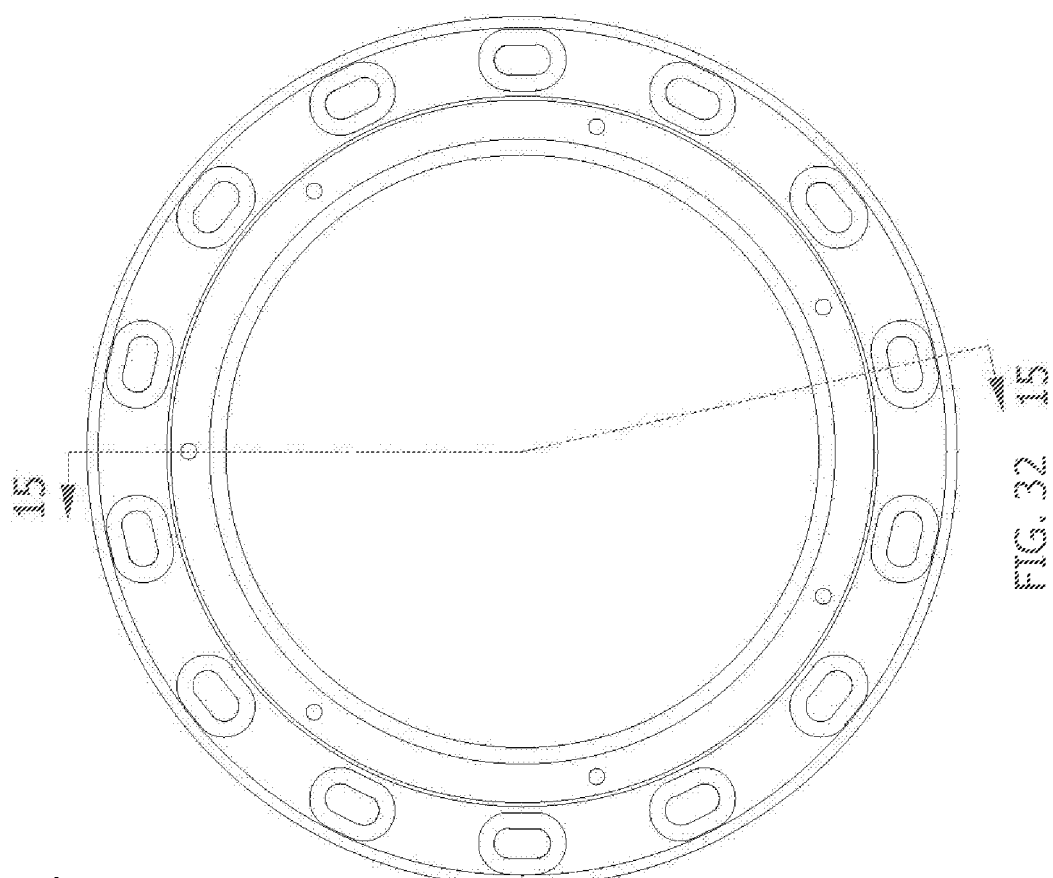

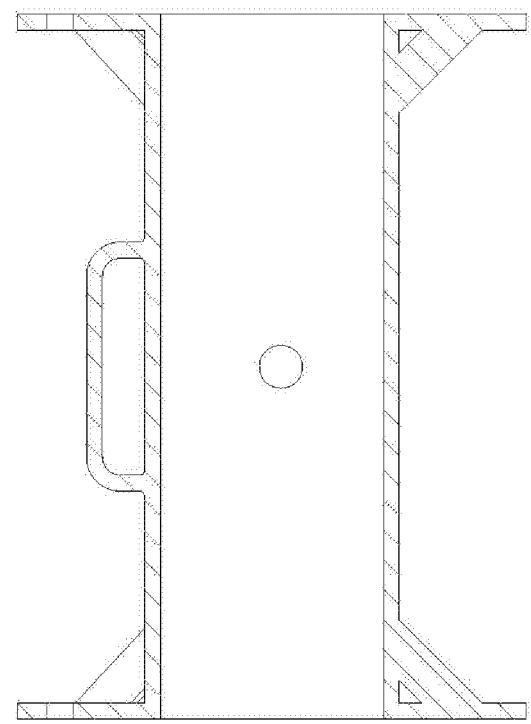
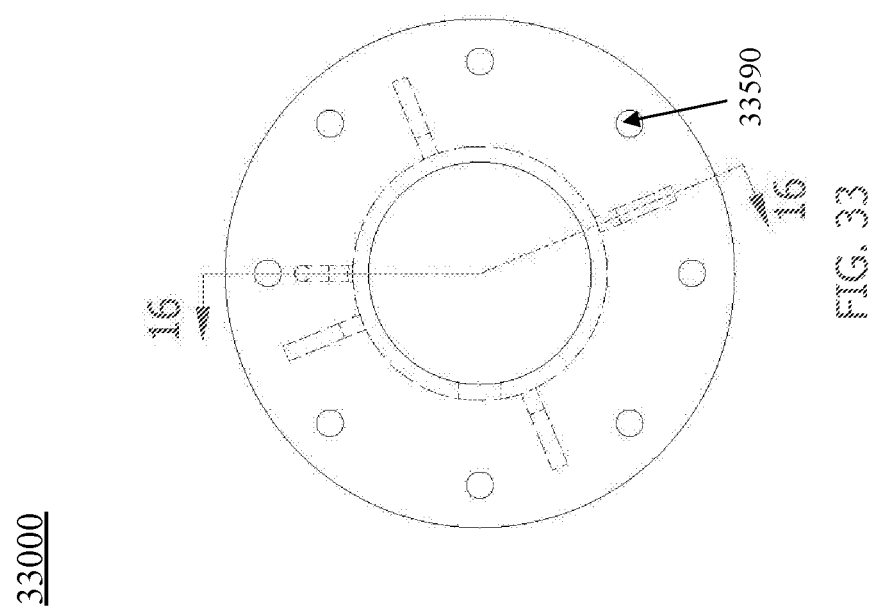
FIG. 33

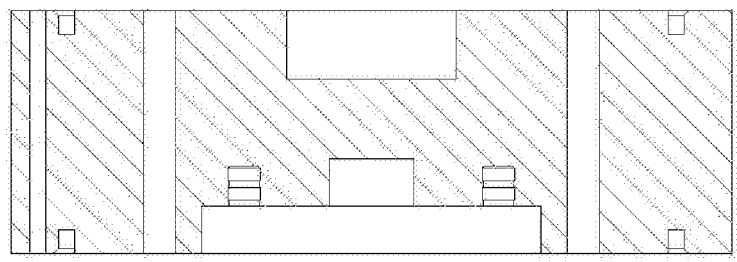
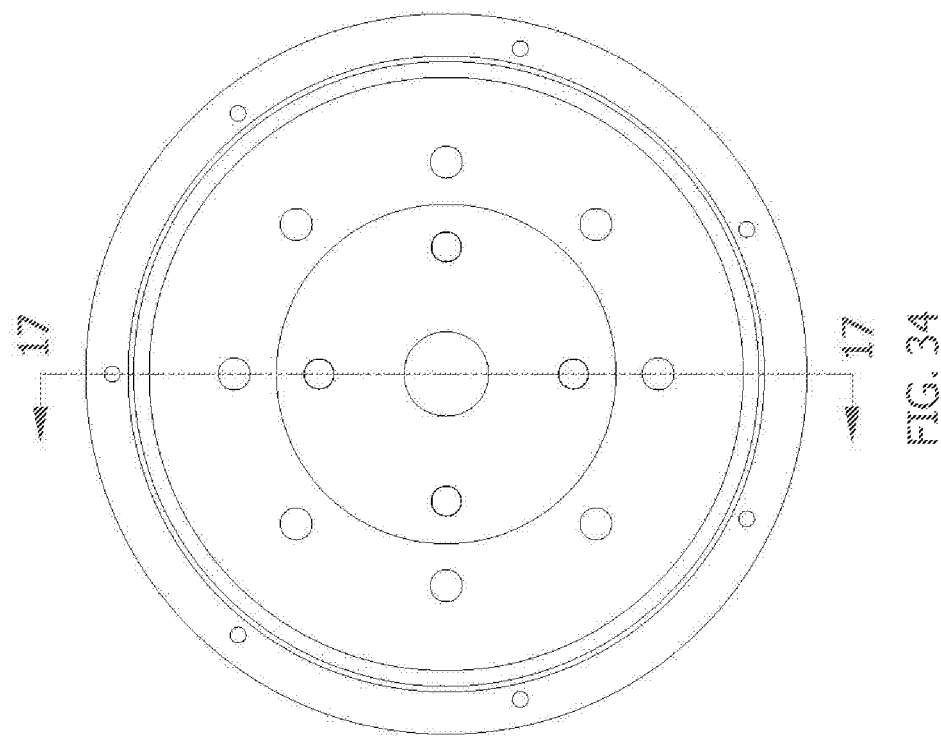
34000

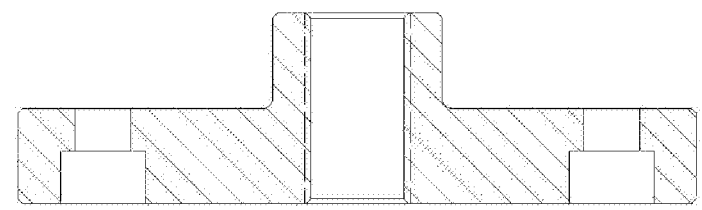
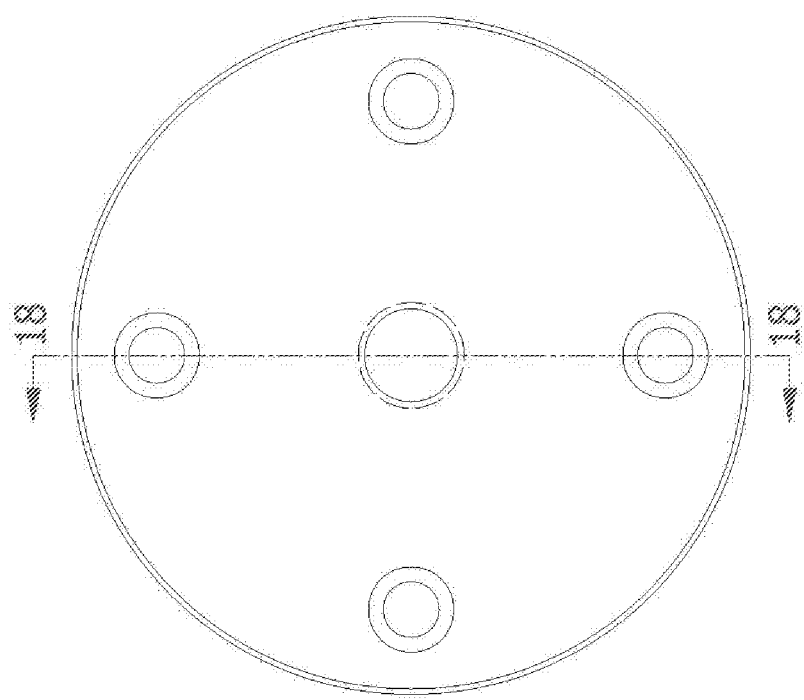
FIG. 37
37000

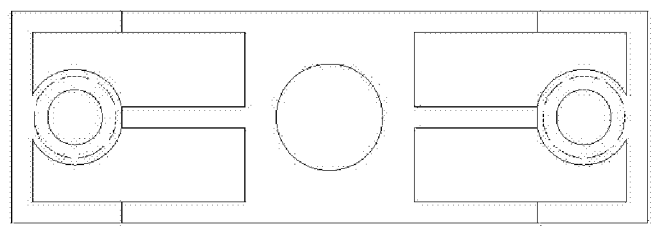
FIG. 39
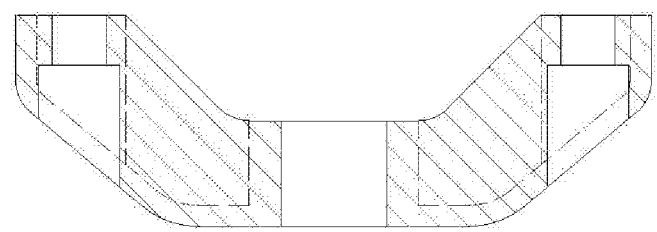
SECTION 19-19
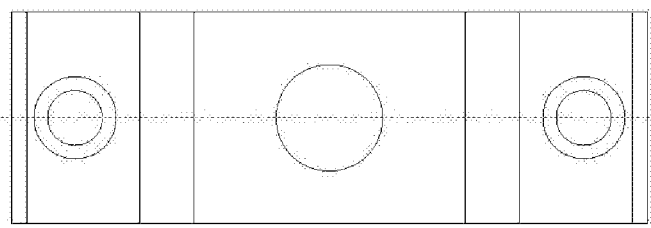
FIG. 38

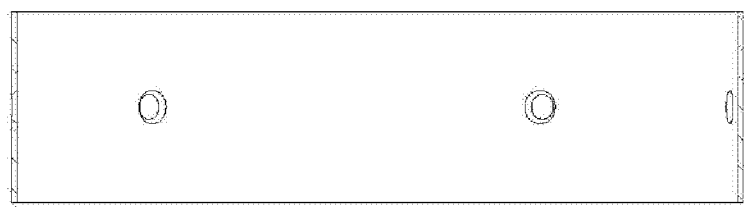
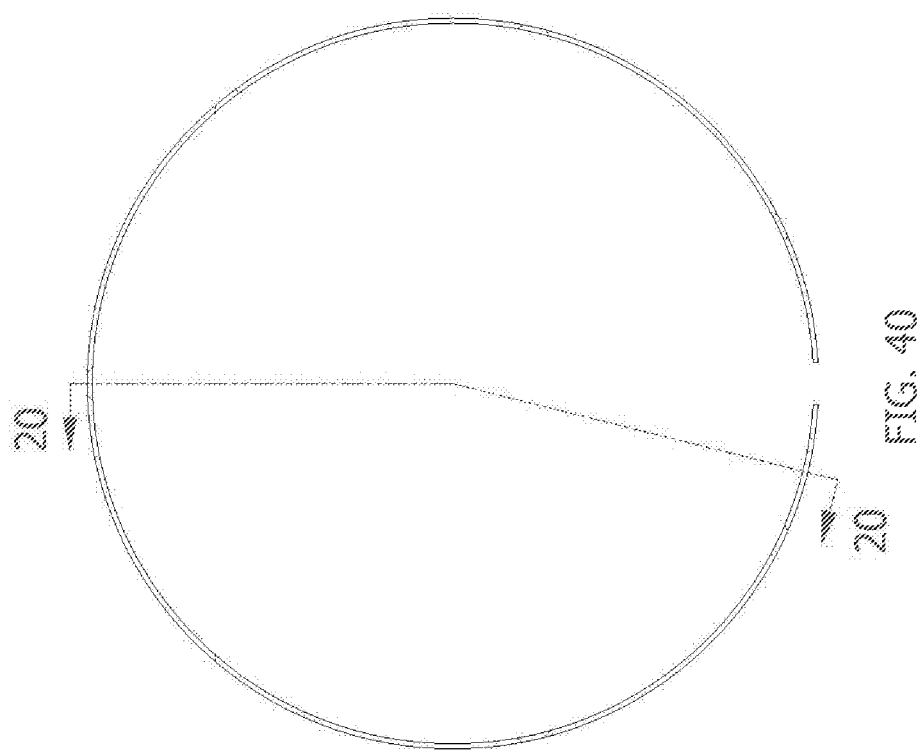
FIG. 40

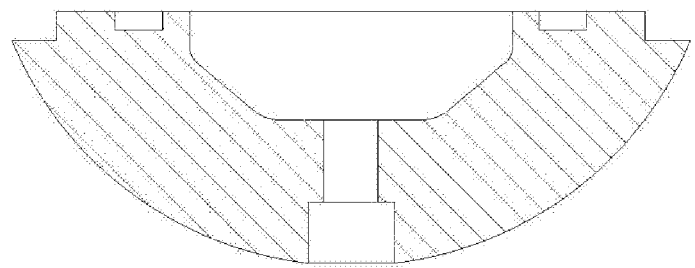
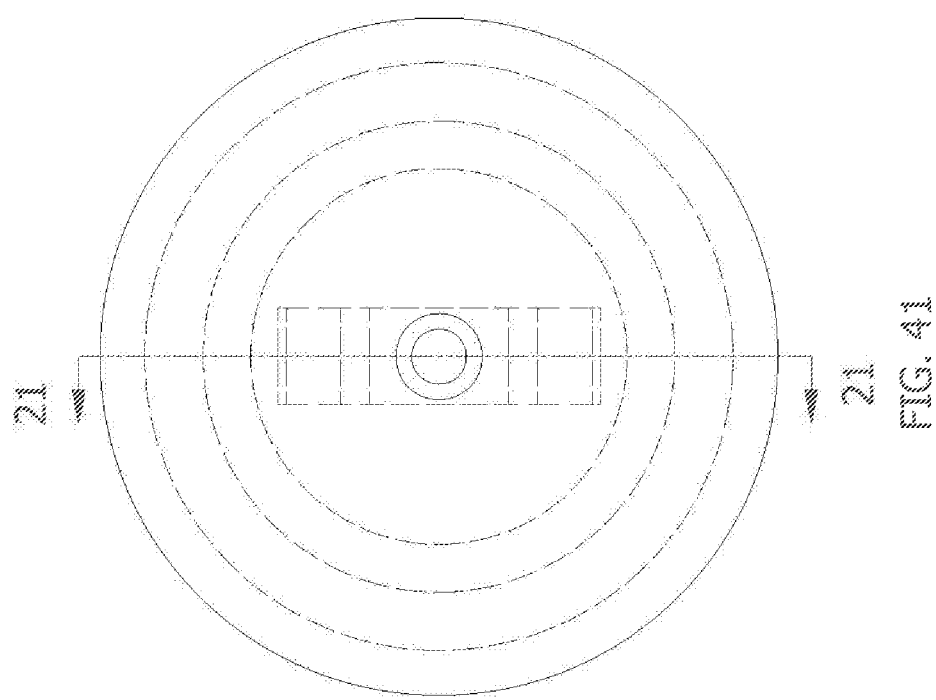
FIG. 41
41000
SECTION 21-21

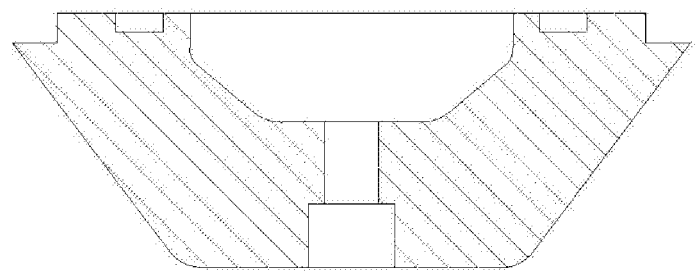
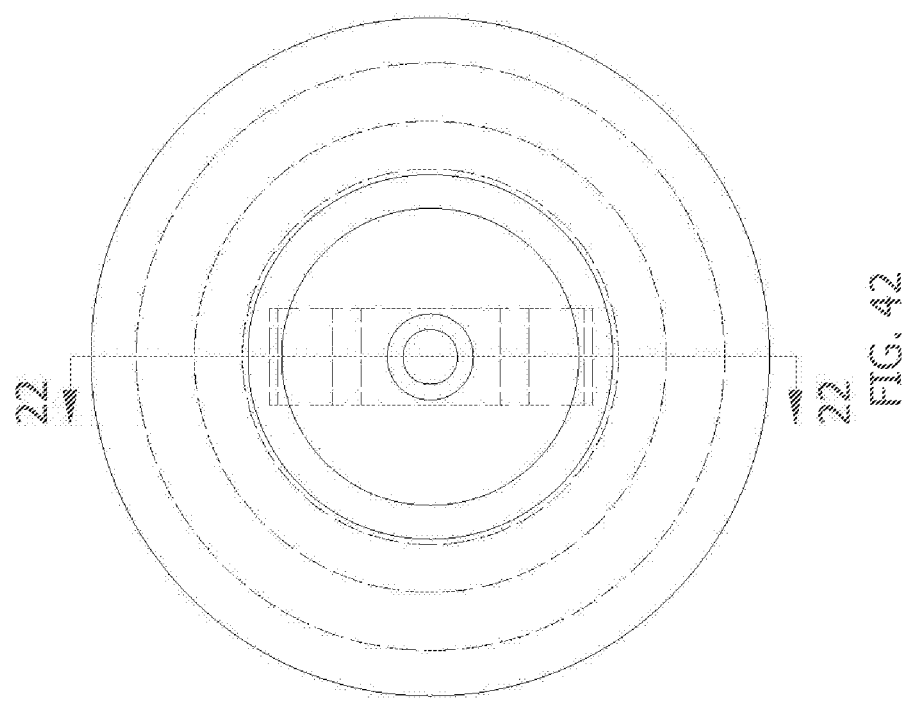
FIG. 42
SECTION 22-22
42000

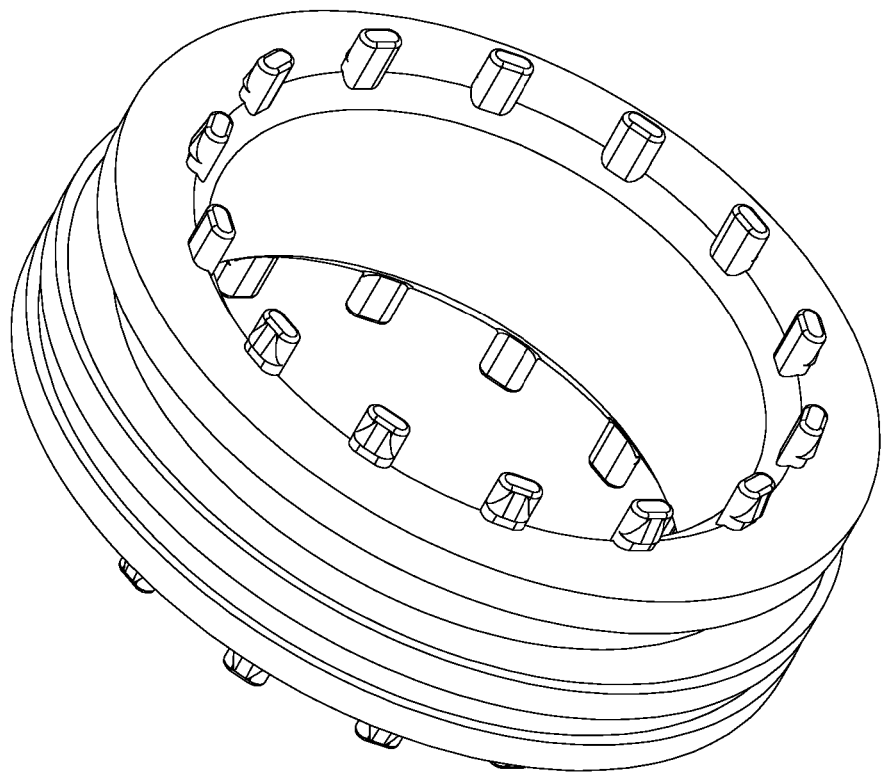
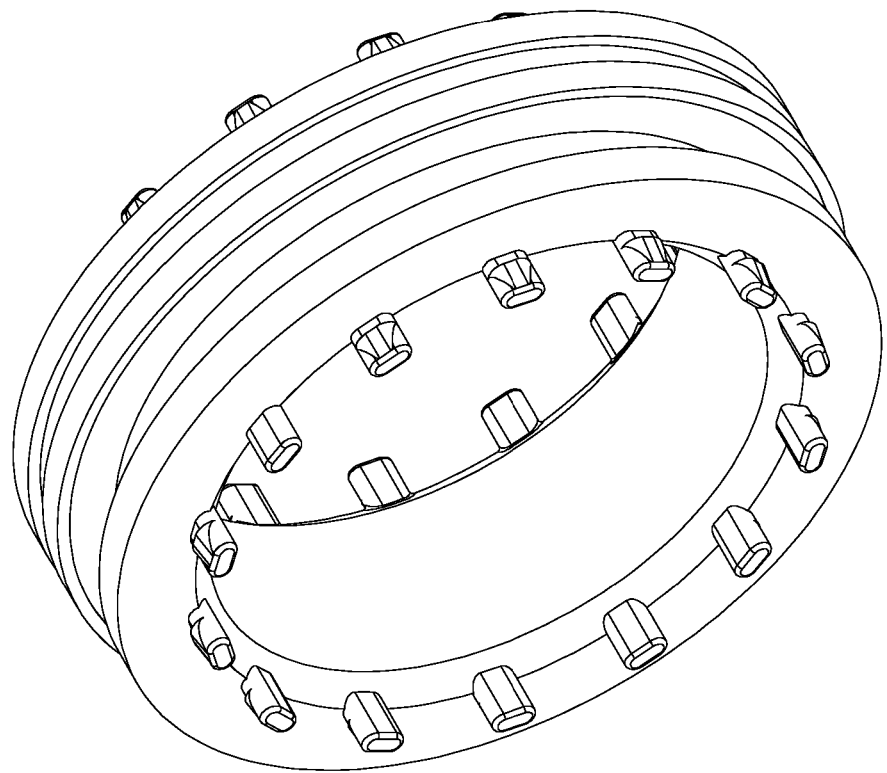
FIG. 44

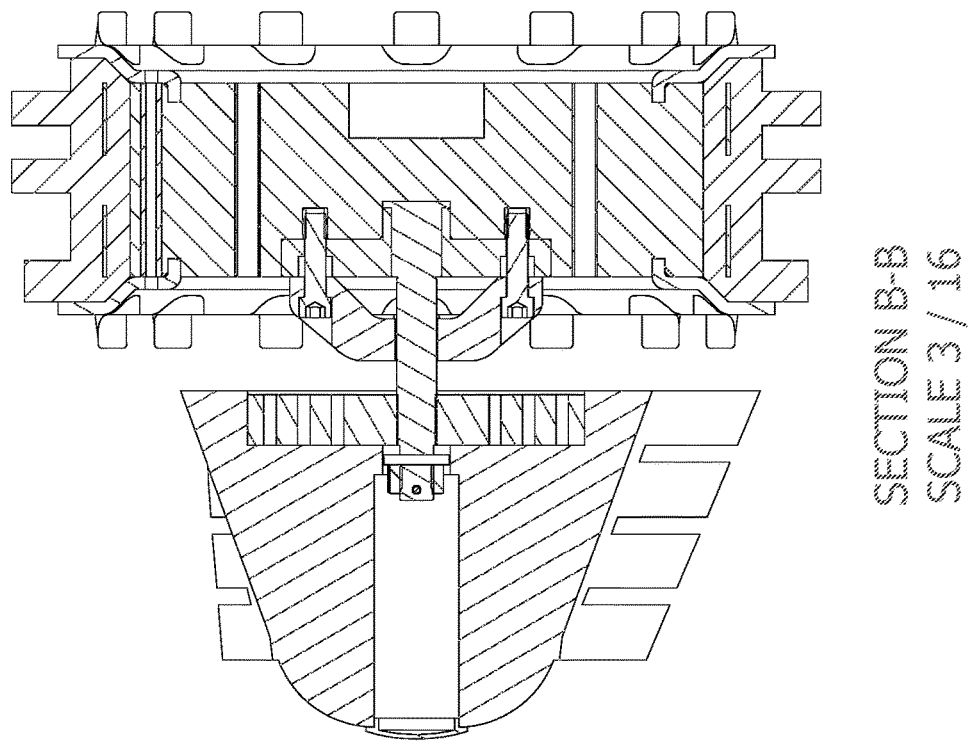
FIG. 46

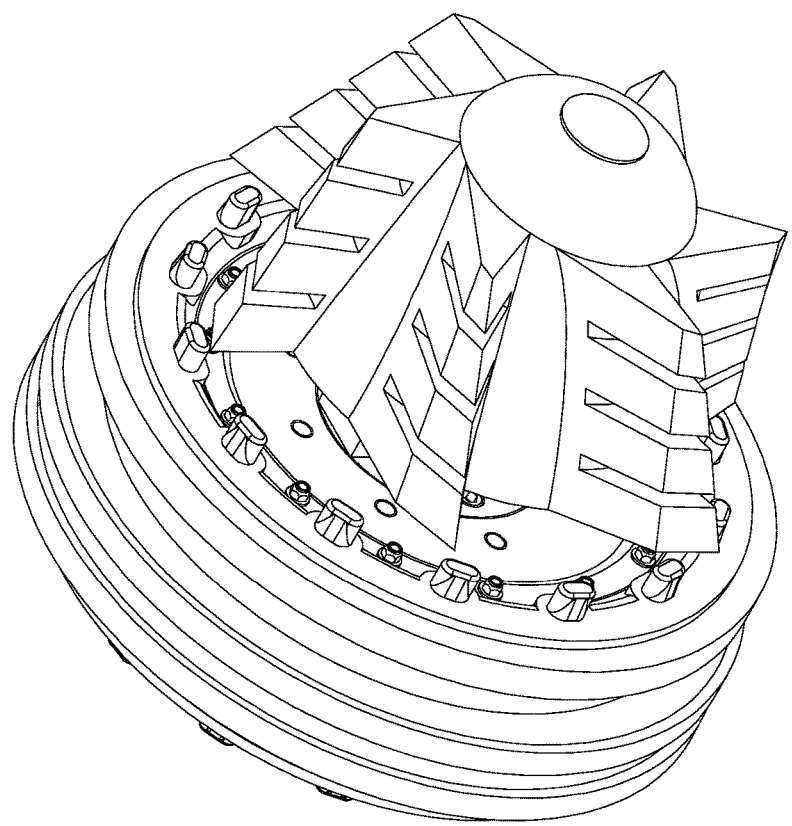
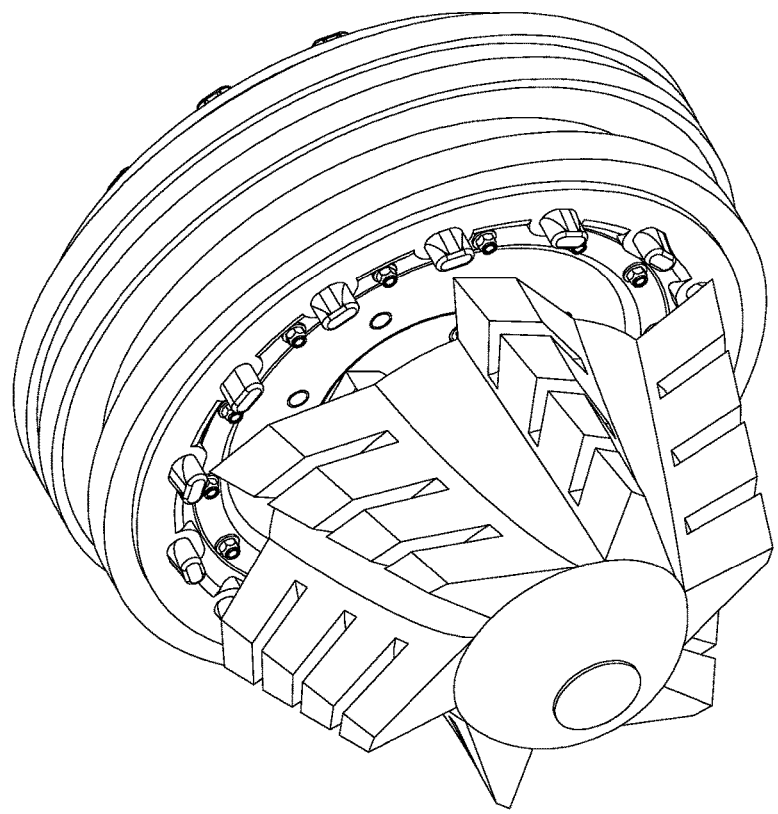
FIG. 47

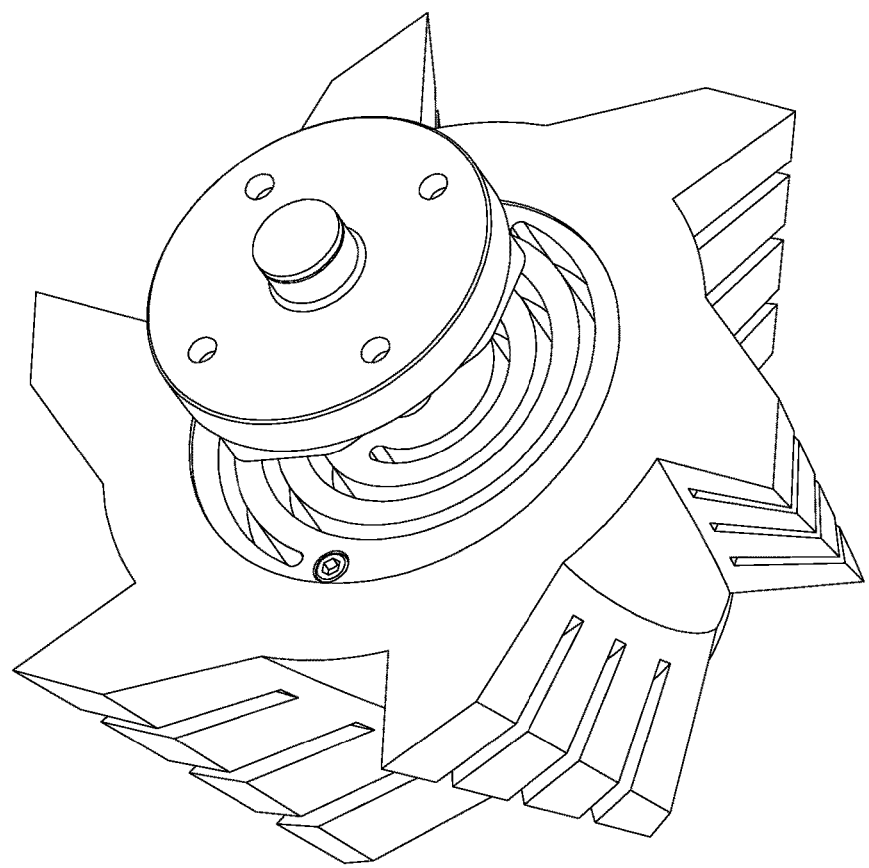
48000
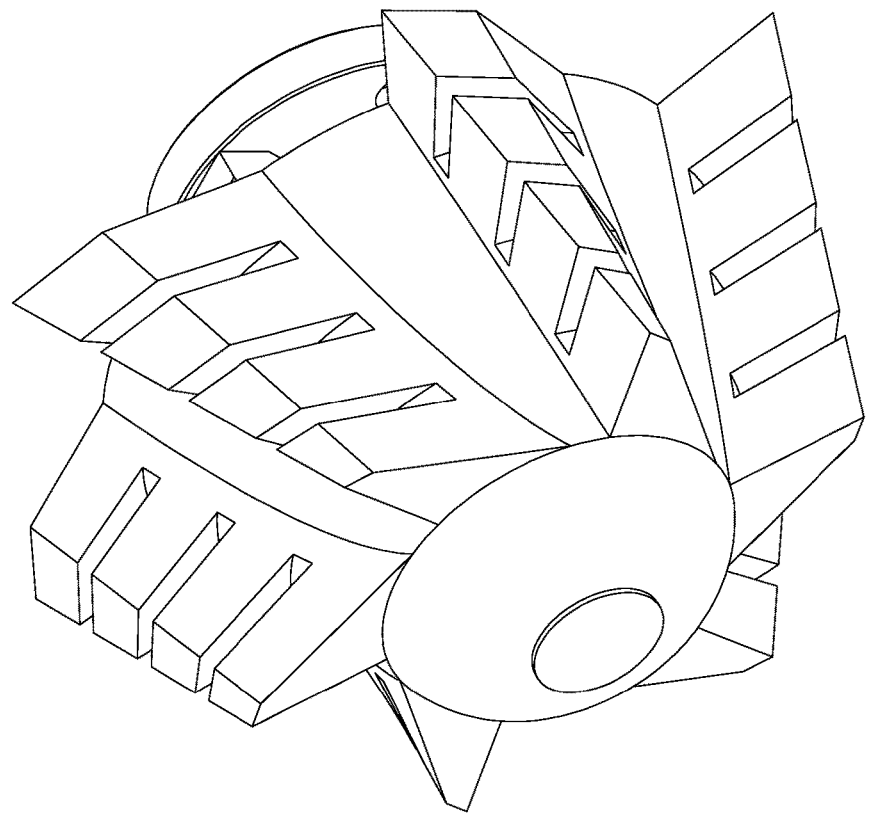
FIG. 48

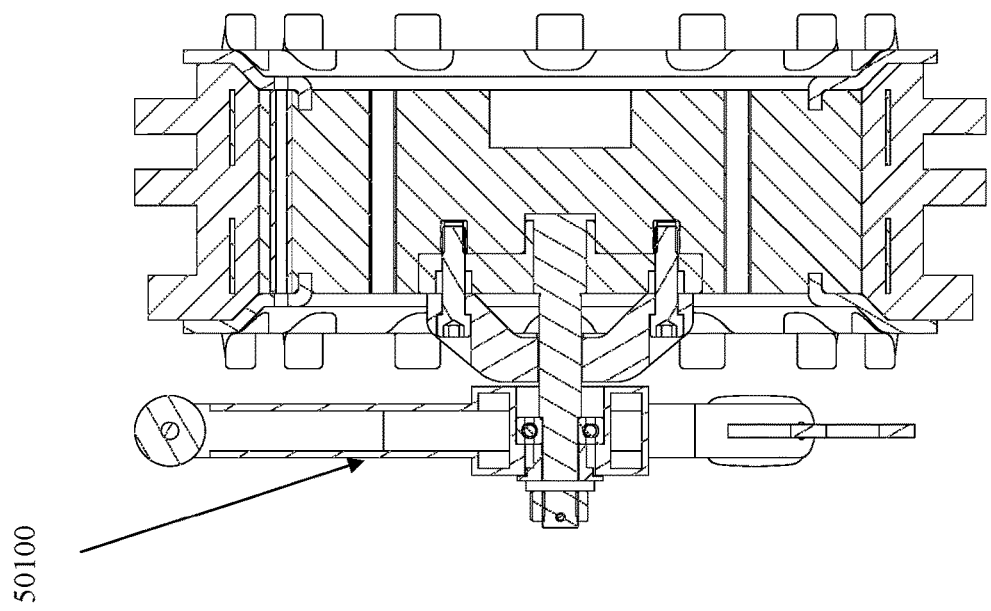
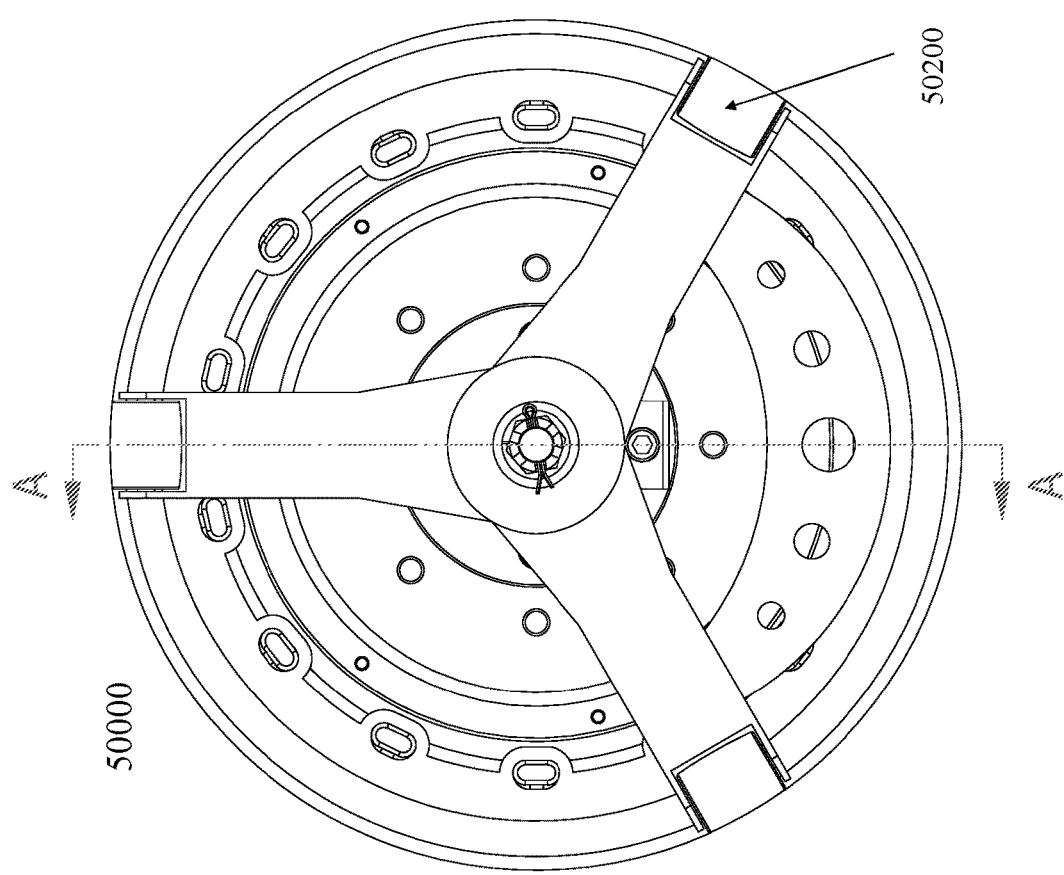
FIG. 50

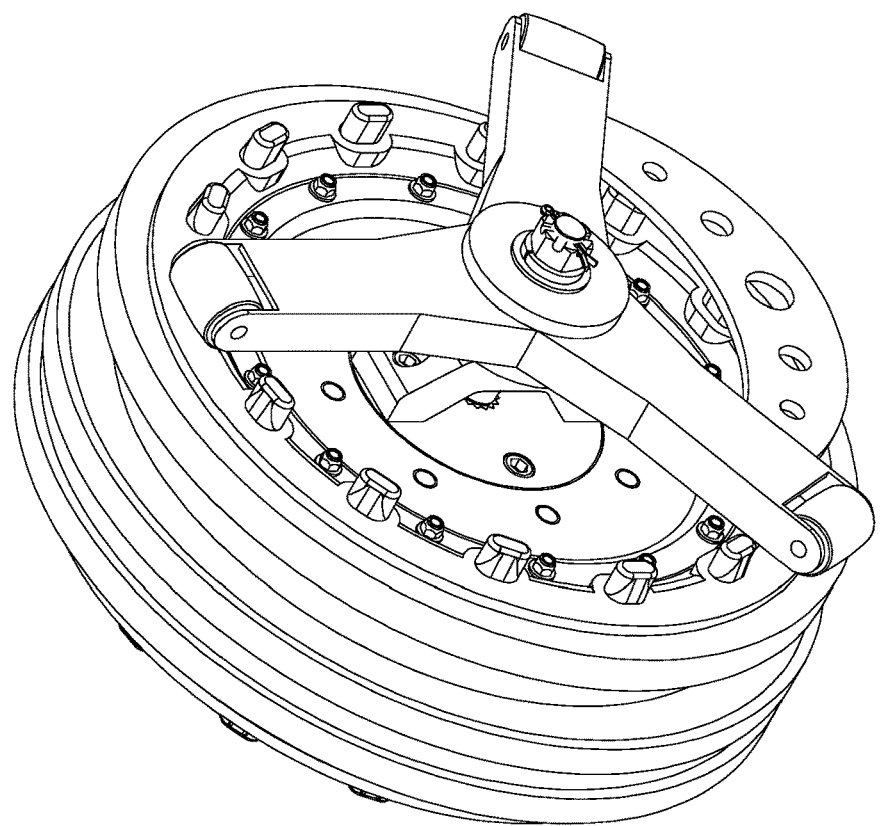
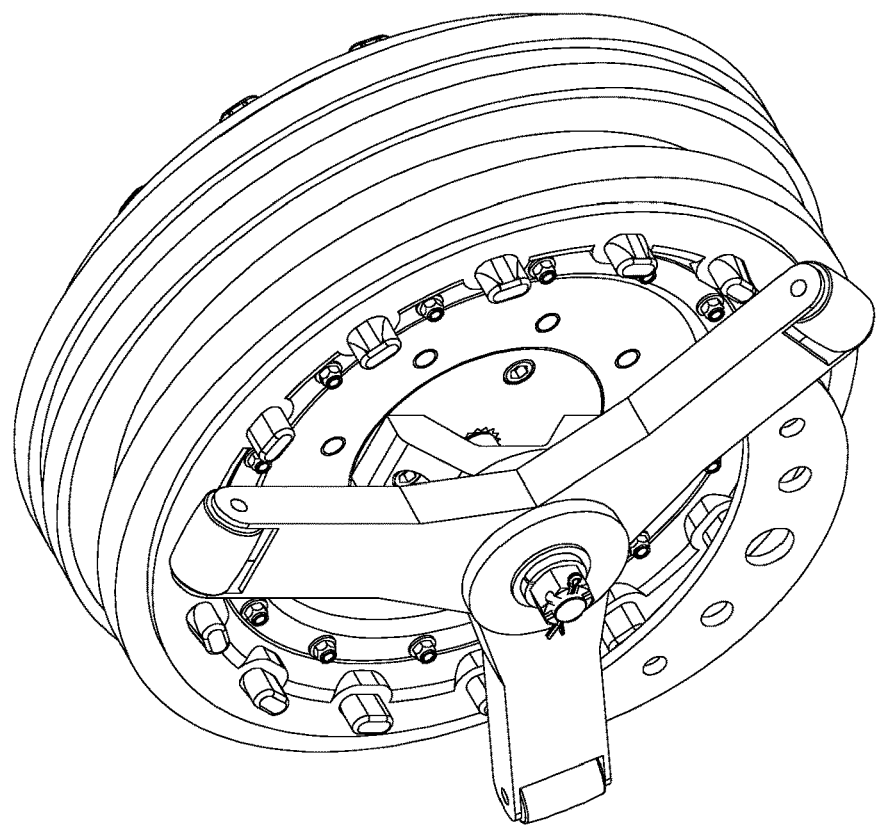
FIG. 52

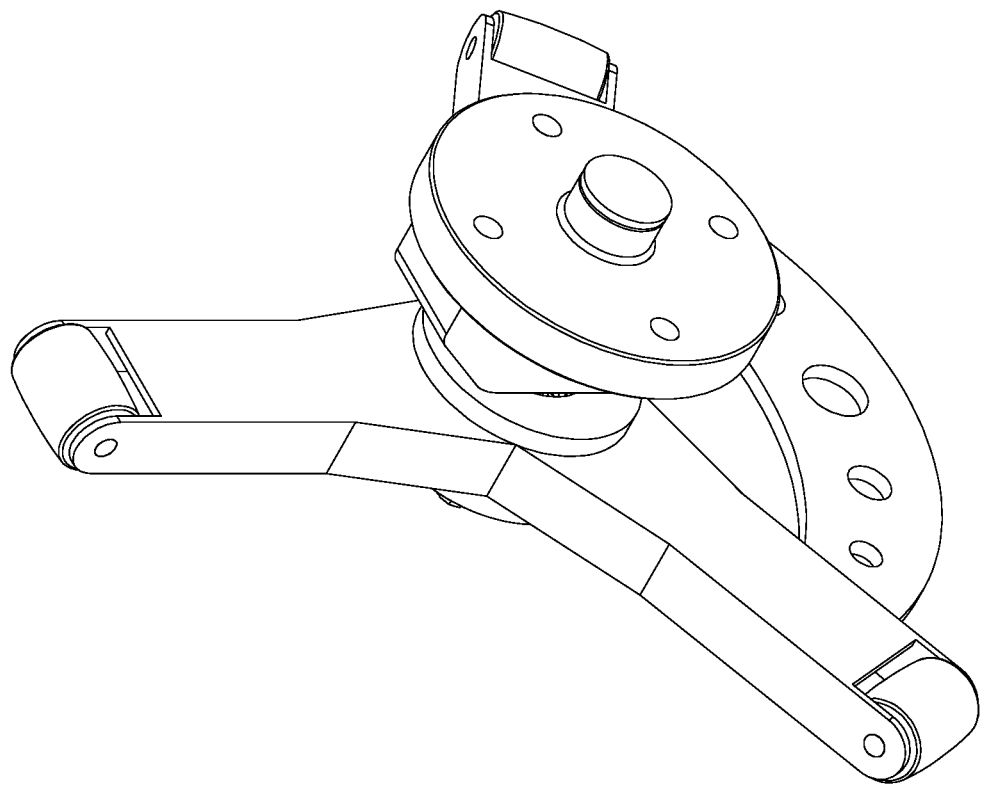
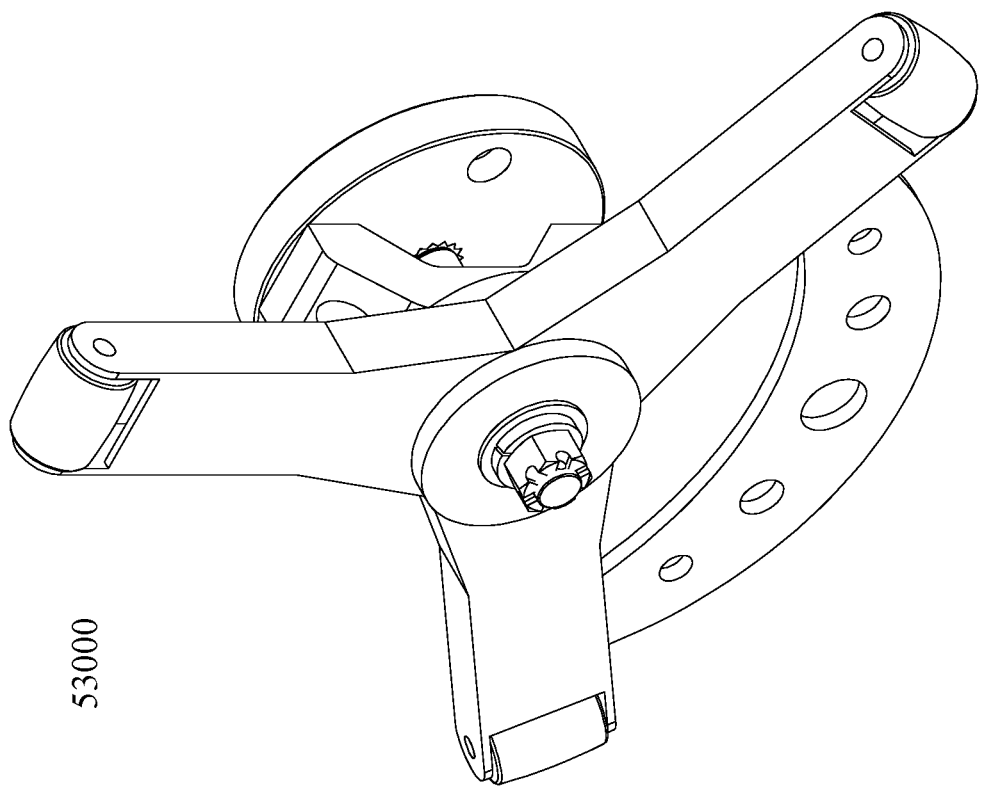
FIG. 53

SYSTEMS, DEVICES, AND/OR METHODS FOR PIPE PIGGING

CROSS-REFERENCES TO RELATED APPLICATIONS

This application claims priority to, and incorporates by reference herein in its entirety, U.S. Provisional Patent Application Ser. No. 62/354,794, filed Jun. 26, 2016.

BRIEF DESCRIPTION OF THE DRAWINGS

A wide variety of potential practical and useful embodiments will be more readily understood through the following detailed description of certain exemplary embodiments, with reference to the accompanying exemplary drawings in which:

FIG. 4 is a sectional view of an exemplary embodiment of a sealing ring system 4000 and a section 2-2 of system 4000;

FIG. 7 is a sectional view of an exemplary embodiment of a pipe pigging system 7000 and a section 3-3 of system 7000;

FIG. 8 is a sectional view of an exemplary embodiment of a sealing ring system 8000 and a section 4-4 of system 8000;

FIG. 9 is a sectional view of an exemplary embodiment of a sealing ring system 9000 and a section 5-5 of system 9000;

FIG. 12 is a sectional view of an exemplary embodiment of a bidirectional pipe pigging system 12000 and a section 6-6 of system 12000;

FIG. 13 is a sectional view of an exemplary embodiment of a sealing ring system 13000 and a section 7-7 of system 13000;

FIG. 14 is a sectional view of an exemplary embodiment of a sealing ring system 14000 and a section 8-8 of system 14000;

FIG. 15 is an exploded view of an exemplary embodiment of a pipe pigging system 15000;

FIG. 16 is a sectional view of an exemplary embodiment of a sealing ring system 16000 and a section 9-9 of system 16000;

FIG. 19 is a sectional view of an exemplary embodiment of a sealing ring system 19000 and a section 10-10 of system 19000;

FIG. 22 is a sectional view of an exemplary embodiment of a sealing ring system 22000 and a section 11-11 of system 22000;

FIG. 23 is a perspective view of an exemplary embodiment of a sealing ring system 23000;

FIG. 24 is a perspective view of an exemplary embodiment of a sealing ring system 24000;

FIG. 25 is a sectional view of an exemplary embodiment of a sealing ring system 25000 and a section 12-12 of system 25000;

FIG. 28 is a sectional view of an exemplary embodiment of a sealing ring system 28000 and a section 13-13 of system 28000;

FIG. 31 is a sectional view of an exemplary embodiment of a basic chassis system 31000 and a section 14-14 of system 31000;

FIG. 32 is a sectional view of an exemplary embodiment of a modified chassis system 32000 and a section 15-15 of system 32000;

FIG. 33 is a sectional view of an exemplary embodiment of a mandrel system 33000 and a section 16-16 of system 33000;

FIG. 34 is a sectional view of an exemplary embodiment of a mounting hub system 34000 and a section 17-17 of system 34000;

FIG. 37 is a sectional view of an exemplary embodiment of a mounting plate system 37000 and a section 18-18 of system 37000;

FIG. 38 is a sectional view of an exemplary embodiment of a lift lug system 38000 and a section 19-19 of system 38000;

FIG. 39 is a sectional view of an exemplary embodiment of a lift lug system 39000;

FIG. 40 is a sectional view of an exemplary embodiment of a support ring system 40000 and a section 20-20 of system 40000;

FIG. 41 is a sectional view of an exemplary embodiment of an end sphere system 41000 and a section 21-21 of system 41000;

FIG. 42 is a sectional view of an exemplary embodiment of an end assembly system 42000 and a section 22-22 of system 42000;

FIG. 44 is a set of views of an exemplary embodiment of sealing element system 44000;

FIG. 46 is a set of views of an exemplary embodiment of an end cap system 46000;

FIG. 47 is a set of views of an exemplary embodiment of an end cap system 47000;

FIG. 48 is a set of views of an exemplary embodiment of an end cap system 48000;

FIG. 50 is a set of sectional views of an exemplary embodiment of a pipe pigging system 50000;

FIG. 52 is a set of perspective views of an exemplary embodiment of a pipe pigging system 52000;

FIG. 53 is a set of perspective views of an exemplary embodiment of an end cap system 53000;

DETAILED DESCRIPTION

Figure 1:
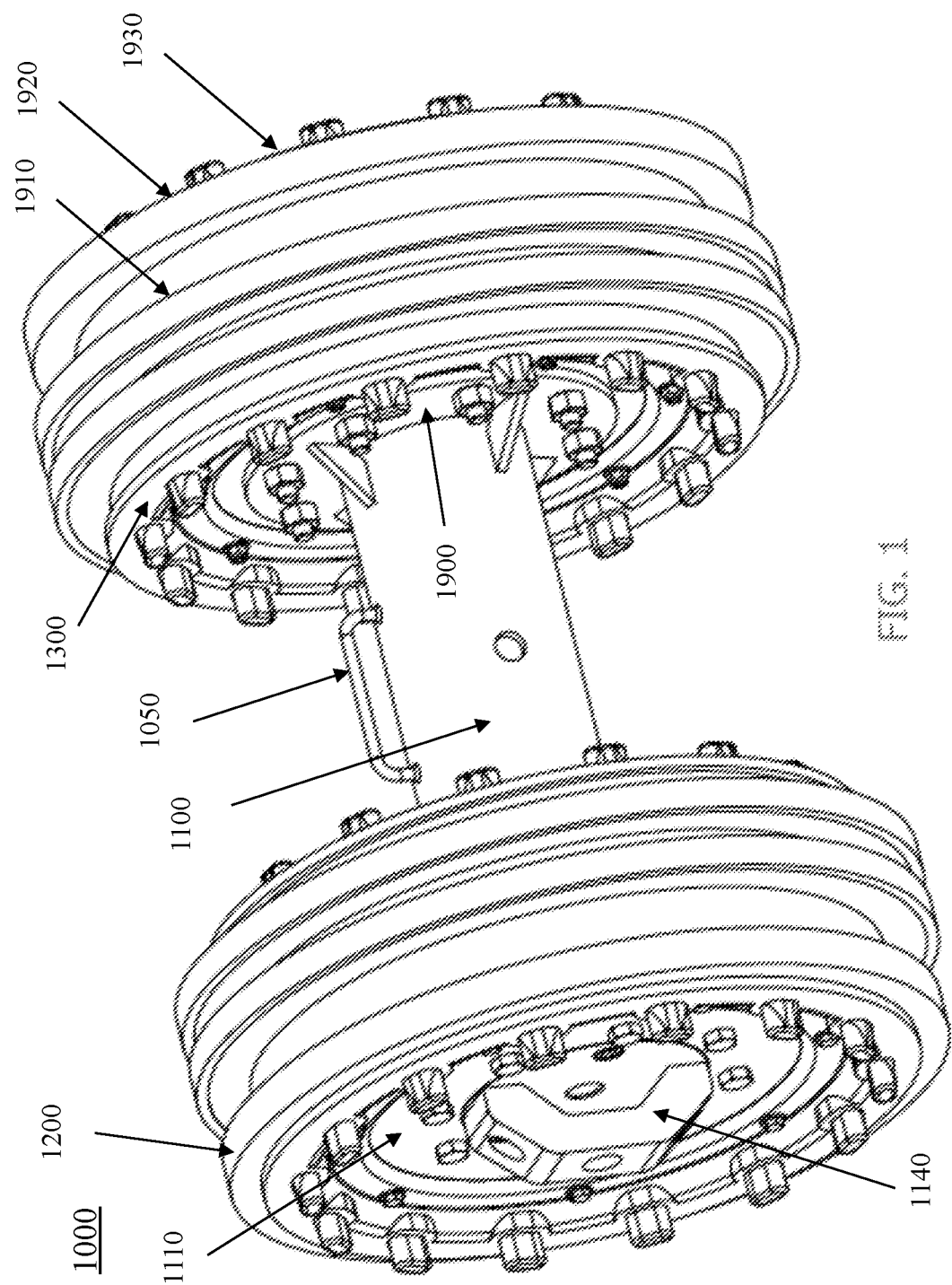
FIG. 1 is a perspective view of an exemplary embodiment of a bidirectional pipe pigging system 1000.

Certain exemplary embodiments can provide a pipe pig. The pipe pig comprises a first mounting hub coupled to a mandrel and a first sealing element. The pipe pig can further comprise a chassis A and a chassis B, each of which is coupled to the mounting hub and the sealing element.

Pipeline infrastructures have been constructed worldwide to facilitate the transportation of hydrocarbons in the petroleum and natural gas industries. Over time, debris can deposit in the pipeline and/or residual waste (e.g., scale, wax such as paraffin, and/or hydrates) can accumulate. This buildup can seriously affect pipeline efficiency and flow rates. For effective operations, pipelines can be cleaned to reduce risks and/or flow degradation. Proper cleaning and inspection can be important to safe and reliable pipeline operations. This can be done using a special device called a Pipeline Inspection Gauge ("PIG"), or conventional pig, which is often referred to as a Utility Pig.

Pigging (i.e., pipeline cleaning and/or inspection) is a common industry practice to deal with these emerging challenges throughout the service life of the pipeline to ensure pipeline integrity. Pigging is also a common practice during the construction phase in preparation for commissioning. Furthermore, it has become a widespread practice in many different industries. In municipalities, pigging is often used to maintain water distribution lines in water systems, including the distribution systems that connect sewer lines and fire hydrants. It is also used extensively to clean piping in many fluid handling operations and process industries such as food, dairy, beverage, biotech, soap, etc.

This growing demand for efficiency illustrates the need to manage challenging pipeline environments effectively. It also illustrates the need for robust and dependable pipeline pigging systems.

Pipeline pigging refers to the practice of using a device known as a "pig" to perform various maintenance operations. This is done without stopping the flow of the product in the pipeline. A "pig" is a tool that is sent down a pipeline and propelled by the pressure of the product flow in the pipeline itself.

In maintenance operations, a pig is launched into the pipe without stopping the flow of product (gas or liquid) in the pipeline. The pig is then propelled through the pipe by the pressure of fluid flow in the pipe itself. Utilization of pigging is common in:

The physical separation of fluids flowing through the pipeline for batch processing where more than one substance (e.g., hydrocarbons) is transported through the pipeline. Product pipelines may sequentially transport gasoline, diesel fuel, fuel oils, or other products, which are separated by batch pigs.

The internal cleaning of pipe (e.g., to remove solids, scale, wax buildup such as paraffin, and/or other debris from the pipe wall) to keep the pipeline flowing efficiently. Multiphase pipelines must be pigged frequently to limit liquid holdup and minimize the slug volumes of liquids that can be generated by the system.

To manage liquid accumulation and keep the pipeline free of liquid buildup in a wet gas system. Water and natural gas liquids can condense out of the gas stream as it cools and contacts the pipe wall in low places. This affects flow efficiency and creates corrosion issues.

Commissioning of newly constructed pipelines i.e., to remove any construction debris and/or scale left in the line from construction.

Thus, potential uses for pigs comprise:

Physical separation between different fluids flowing through the pipeline. Pigs are used in product pipelines to physically separate, or "batch" the variety of hydrocarbons that are transported through the line. Product pipelines may simultaneously transport gasoline, diesel fuel, fuel oils, and other products, which are kept separated by batching pigs.

Internal cleaning of pipelines. Operations may conduct pigging on a regular basis to clean solids, scale, wax buildup (paraffin), and other debris from the pipe wall to keep the pipeline flow efficiency high. In addition to general cleaning, natural-gas pipelines use pigs to manage liquid accumulation to help keep the pipe free of liquids. Water and natural gas liquids can condense out of the gas stream as it cools and contacts the pipe wall and pocket in low places, which affects flow efficiency and can lead to enhanced corrosion.

Prevention of solid accumulation and corrosion. Crude-oil pipelines are sometimes pigged to keep water and solids from accumulating in low spots and creating corrosion cells. This can be especially important when flow velocities are less than 3 ft/sec. Multiphase pipelines may have to be pigged frequently to limit liquid holdup and minimize the slug volumes of liquid, which can be generated by the system.

A pig is put into the line to perform a certain scope of work. The measure of success is more than just getting the pig to travel from one end of the line to the other. A pig design should be able to:

negotiate a pipeline without excessive nose down or wear of seals, and no metal contact with the pipe wall;

maintain a positive seal with pipe wall at all times;

negotiate bends, with a positive seal, and avoid metal contact with pipe wall;

provide adequate bumper nose protection front and rear to avoid metal to metal contact problems as the pig traverses the line; and/or avoid through body and bolt hole leakage.

A Bi-Directional Pig is a displacement type utility pig used to displace water, liquids, or air in a pipeline. It offers excellent batching qualities, and it can run in either direction within the pipeline. Certain exemplary configurations can be derived from a series of independent parts that allow for multiple configurations and replacement of individual parts.

Bi-Directional Pigs can comprise two or more replaceable discs, and options for scraping discs, or wire brushes. In certain exemplary embodiments, a Bi-Directional Pig can be assembled comprising the following components:
- a mandrel, which can comprise a steel body; the mandrel often comprises a main body tube, two steel retaining flanges (one for each end), and nuts and bolts for assembly;
- two guides, such as polyurethane discs on the ends; an outside diameter of each guide is very near the inside diameter of the pipeline, and they are extra-thick because they take the brunt of most impacts while traveling down the line;
- four seals, such as four middle polyurethane discs; the outside diameter is in close tolerance with an inside diameter of the pipeline. The purpose of the four seals is to maintain a good seal with the pipeline, to ensure that the pig is propelled efficiently and that a good fluid interface is maintained; and
- six spacers, which can be small discs between the guides and seals to space out the different discs so that they function separately.

The advantage of a mandrel pig design is that it can be dressed for cleaning or sealing, or a combination of both. The seals, cups, and brushes can be replaced to make the pig reusable. Disadvantages with certain pig designs can comprise:
- the cost associated with redressing a pig when the seal elements (disc, cup, etc.) reach the end of their useful service life;
- the excessive amount of waste material used in construction; and/or
- the use of a cylindrical body design where less than approximately 5% of the material used in construction actually ever comes in contact the inside surface of the pipe wall.

The growing desire for greater efficiency and reduced waste has renewed interest in pigging systems with improved capabilities. Certain exemplary pipeline pig designs offer pipeline engineers a new tool for maintaining pipelines, bringing a new dimension to pipeline pigging, since it can easily be configured for cleaning, batching, and corrosion protection on both bidirectional and unidirectional platforms.

Certain pigs are designed for cleaning and batching. The cup design is derived from the hydraulic piston seal and aggressively scrapes the pipeline bore while maintaining a relatively good seal.

What sets certain exemplary pigs apart from other pigs is a unique sealing element design. The idea is that a single molded sealing element has the ability to work and provide an equivalent seal, if not superior, to the conventional approach that uses a series of sealing disc. The benefits of this design, depending on the design variant chosen can comprise:
- to easily and inexpensively cast sealing elements into the desired shape, size, and configuration as a single body mold;
- to mitigate, or at least reduce, the amount of material used in the manufacture of sealing elements;
- to provide a novel anchoring system (anchor lugs) that securely support, strengthen, and attach the sealing element to the chassis;
- to attach and secure the chassis to the mounting hub using a novel design.
- to deploy multiple uses and or combinations of bidirectional and unidirectional mandrel pig designs; and/or
- to offer a scalable platform for all pipeline diameters.

Certain exemplary embodiments comprise a sealing element having a design that:
- are formed via casting to have a profile that resembles other pig designs configured with a series of discs (e.g., guide discs, spacer discs, and/or sealing discs, etc.); and
- resembles other pig designs with significantly less material in construction and/or disposable components thereof.

Certain exemplary embodiments provide a single molded sealing element that works over a wide range of pipe diameters on both bidirectional and unidirectional pigging platforms, which can provide a robust and flexible pig design.

A bi-directional pig is designed to be used for the displacement of water, liquids, or air in a pipeline. Bi-directional disc/scraper pigs offer excellent high sealing qualities.

A pig comprising a brush is designed to remove debris and deposits from the pipeline wall.

Typical elements used in a pig construction comprise: sealing discs, guide discs, cleaning brushes (both circular and spring mounted), cups (conical or basic) bumper noses, spacer discs.

Pig movement though a pipe can:
- remove debris;
- allow for separated batch conveyance of liquids;
- rotate in some embodiments as it passes through a pipe; and/or
- be used in many different industries: oil and gas, wastewater treatment, fire hydrants, and/or plumbing, etc.

Certain exemplary embodiments can be constructed for:
- multiple use and/or combination of elements can be deployed: such as cleaning, brush, cup, batch, and/or magnetic, etc.;
- scalable design, which allows for construction for a wide variety of pipeline diameters;
- static design, sized so that molded element performs specific function and purpose;
- compression design, which allows a cleaning element to contract or expand while moving through pipe;
- handles and lifting lug to facilitate lifting or positioning;
- nose design can comprise any of a variety of configurations, e.g., eye hook, cone, cup, sphere, disk, and/or guide wheels, etc.; and/or
- tail design can comprise any of a wide variety of design configurations, e.g., cone, disk, and/or inverted cup, etc.

FIG. 1 is a perspective view of an exemplary embodiment of a bidirectional pipe pigging system 1000. Certain exemplary embodiments replicate an exemplary bidirectional pig fitted with two guide discs, four sealing discs, and six spacer discs. Each guide disc centralizes the pig and supports its weight. The oversized seal discs scrape, seal, and clean the pipeline inner wall. They also provide a seal that facilitates propulsion of the pig through the pipe.

Certain exemplary bidirectional pigs can comprise two guide discs, four sealing discs, and six spacer discs. The guide discs centralize the pig and supports its weight. Oversized seal discs scrape, seal, and clean the pipeline inner wall. They also provide a seal that facilitates propulsion of the pig through the pipe.

Bidirectional pipe pigging system 1000 comprises two guide discs, four sealing discs, and six spacer discs. The guide discs centralize the bidirectional pipe pigging system 1000 and supports its weight. The oversized seal discs scrape, seal, and clean the pipeline inner wall. The oversized seal discs also provide a seal that facilitates propulsion of bidirectional pipe pigging system 1000 through the pipe. System 1000 comprises, inter alia, a lift handle 1050, a mandrel 1100, a sealing element 1200, a chassis A 1300, a mounting plate 1110, and a lift lug 1140. In certain exemplary embodiments, mandrel 1100 can be coated with an anti-corrosion coating to enhance durability.

Mandrel 1100 functions as a structural core of bidirectional pipe pigging system 1000 and other components of bidirectional pipe pigging system 1000 couple to it directly or indirectly. For example, a mounting hub 1900 is coupled directly to mandrel 1100 via a plurality of fasteners.

Lift handle 1050 allows a user to lift, carry, and/or align bidirectional pipe pigging system 1000 when in use and/or when not in use performing pipe pigging. Lift lug 1140 can be selected as a component to allow bidirectional pipe pigging system 1000 to be coupled to a lifting device such as, for example, a crane, hand chain hoist, and/or boom truck, etc. Different end components can be utilized in bidirectional pipe pigging system 1000 in accordance with user preferences and/or needs.

Figure 2:
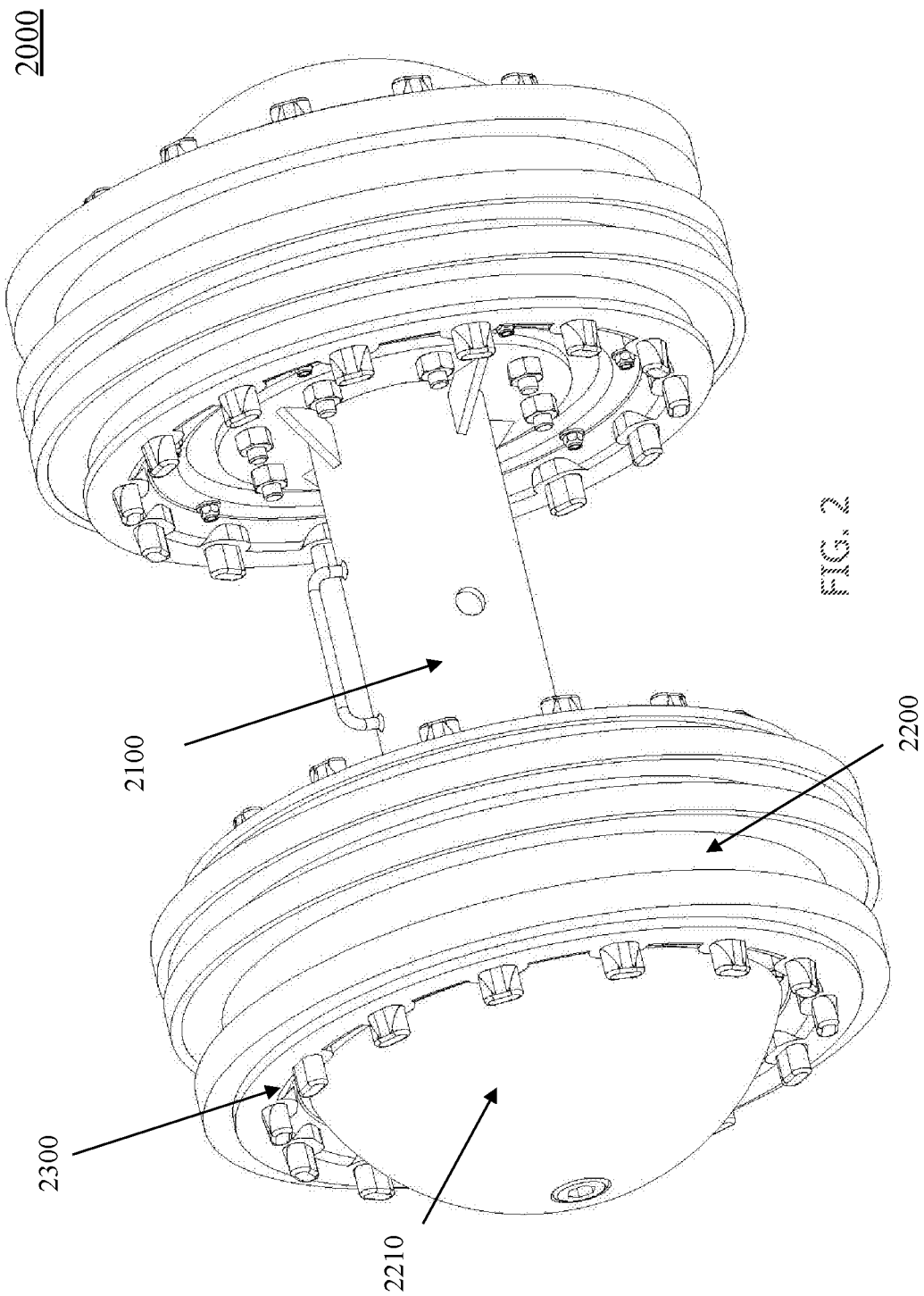
FIG. 2 is a perspective view of an exemplary embodiment of a bidirectional pipe pigging system 2000.

FIG. 2 is a perspective view of an exemplary embodiment of a bidirectional pipe pigging system 2000. Certain exemplary embodiments replicate an exemplary bidirectional pig fitted with two guide discs, four sealing discs, and six spacer discs. System 2000 comprises two guide discs, four sealing discs, and six spacer discs. System 2000 comprises end cap sphere 2210 (bumper) fitted on the face of system 2000. End cap sphere 2210 helps protect the pig and prevent damage inside the pipeline during pigging operations. End cap sphere 2210 can be a molded object of distinctive shape and size mounted on the face of the pig and secured at the mounting plate. System 2000 comprises, inter alia, a mandrel 2100, a sealing element 2200, and a chassis A 2300.

End cap sphere 2210 can be selected for bidirectional pipe pigging system 2000 to allow for improved hydrodynamics. End cap sphere 2210 can, compared to certain alternate designs, reduce drag on bidirectional pipe pigging system 2000 as it travels through a piping system.

Figure 3:
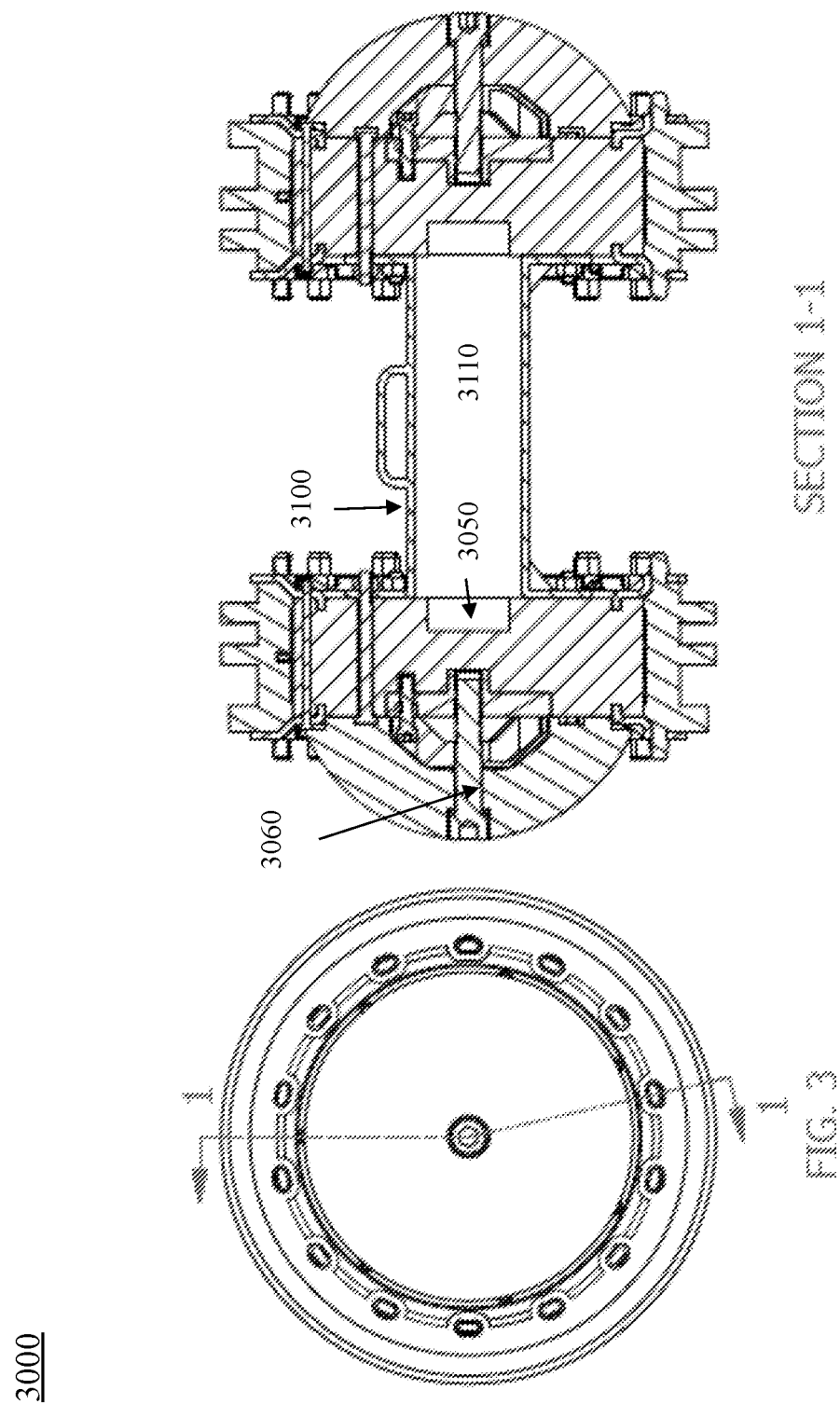
FIG. 3 is a sectional view of an exemplary embodiment of a bidirectional pipe pigging system 3000 and a section 1-1 of system 3000.

FIG. 3 is a sectional view of an exemplary embodiment of a bidirectional pipe pigging system 3000 and a section 1-1 of system 3000. System 3000 comprises end caps on both front and rear mounting hubs. The front mounting hub comprises one guide disc, two sealing discs, four spacer discs, and an end cap. The rear mounting hub comprises one guide disc, two sealing discs, four spacer discs, and an end cap. An irregular cavity fashioned at a base of the end cap acts as a keyway to allow mounting over the lift lug and attachment to the mounting plate with a fastener 3060.

System 3000 defines a cavity 3050, which can be used to house components. Cavity 3050 can be substantially contiguous with a cavity 3110 defined by a mandrel 3100. Cavity 3050 and/or cavity 3110 can house a subsystem comprising one or more batteries, an electric motor, and bearings that can cause an end attachment to spin in a pipeline to facilitate pipeline cleaning. In certain exemplary embodiments, cavity 3050 and/or cavity 3110 can house one or more instruments that wirelessly communicate information about the pipeline to one or more information devices.

FIG. 4 is a sectional view of an exemplary embodiment of a sealing ring system 4000 and a section 2-2 of system 4000.

Figure 5:
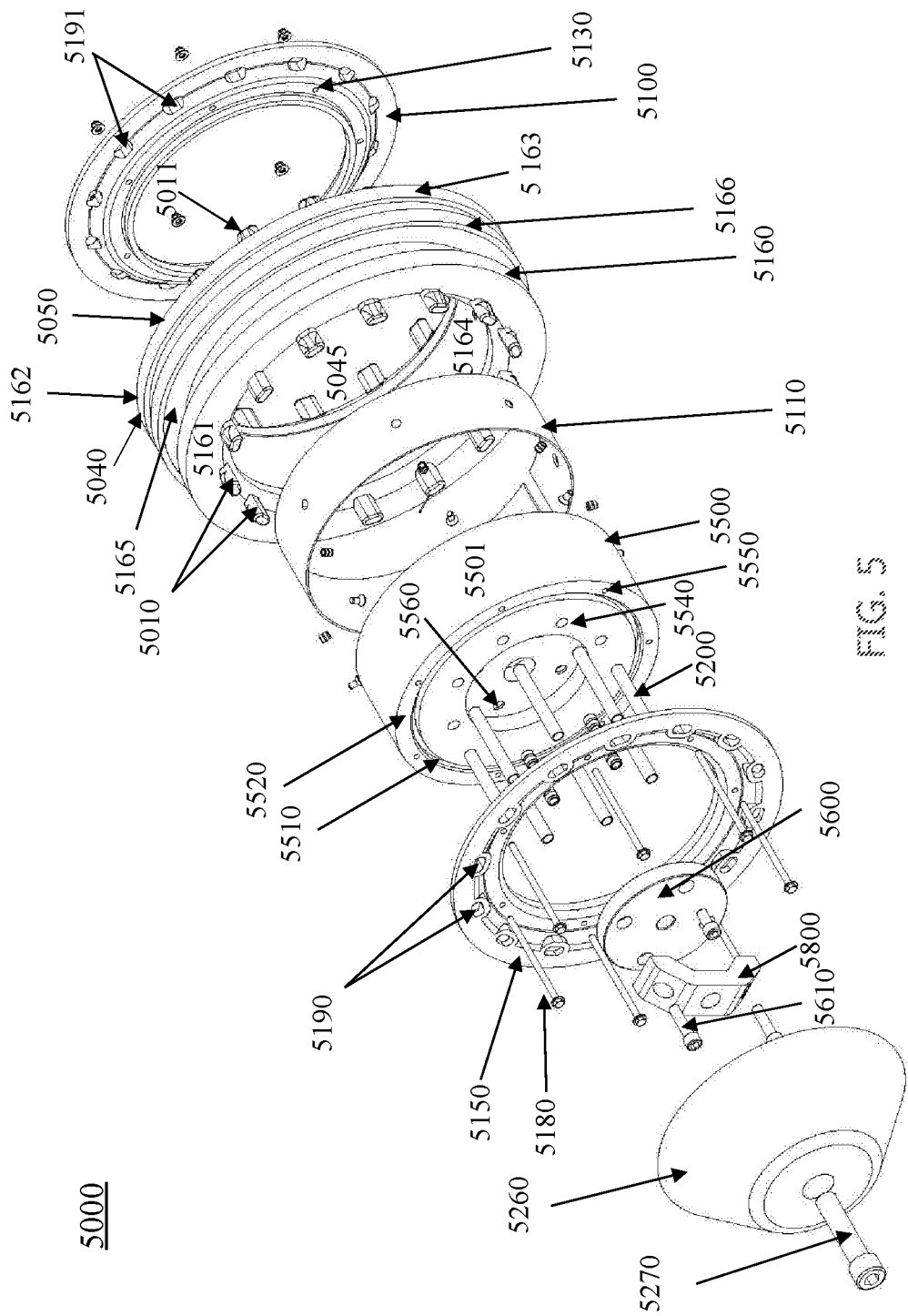
FIG. 5 is an exploded view of an exemplary embodiment of a pipe pigging system 5000.

FIG. 5 is a exploded view of an exemplary embodiment of a pipe pigging system 5000. System 5000 comprises a first chassis A 5100, a first plurality of fasteners 5200, a mounting hub 5500, a mounting plate 5600, a lift lug 5800, a support ring 5110, a second chassis A 5150, a sealing element 5160, and an end cap 5260.

The exploded view in FIG. 5 shows the relationship and order of assembly for a hub assembly, less the mandrel body. The key to understanding this multi-layered configuration is to realize that the baseline assembly remains the same and sealing element changes for a specific application. Certain exemplary embodiments utilize a sealing disc arrangement. Certain exemplary embodiments can be configured in any combination of guide discs and sealing discs for almost any pigging application. A counter-bored hole at the end of end cap 5260 can position the head of a connecting bolt 5270 below a face of end cap 5260. When inserted through the center-hole on the end cap and lift lug, connecting bolt 5270 (fastener) couples end cap 5260 to mounting plate 5600.

System 5000 illustrates how a portion of an exemplary pipe pigging system is constructed. The mandrel is omitted for clarity purposes. In a fully functional system, system 5000 would be coupled to a first side of a mandrel and certain other components would be fastened to a second side of the mandrel. The components fastened to the second side of the mandrel can vary depending upon whether the fully assembled pipe pigging system is unidirectional or bidirectional.

Mounting hub 5500 is coupled to the mandrel (e.g., mandrel 1100 of FIG. 1) via first plurality of fasteners 5200 that extend through a plurality of mandrel apertures 5540 defined by mounting hub 5500 and a corresponding plurality of apertures (e.g., plurality of apertures 33590 of mandrel system 33000 of FIG. 33) defined by the mandrel. Chassis 5100 and Chassis 5150 are coupled to mounting hub 5500 via a second plurality of fasteners 5180 that extend through a plurality of chassis apertures 5550 defined by mounting hub 5500. Corresponding apertures 5130 defined by each of Chassis 5100 and Chassis 5150 are constructed to receive the second plurality of fasteners to couple them to mounting hub 5500.

Chassis 5100 and Chassis 5150 couple directly to sealing element 5160 via engagement of anchor lugs 5010 with a plurality of apertures 5190 defined by each of Chassis 5100 and Chassis 5150.

In certain exemplary embodiment, mounting hub 5500 can comprise one or more of a variety of materials that provide adequate strength and rigidity e.g., plastic, steel, and/or aluminum, etc. Plastics allow for the use of molded-in, press-in, expansion, or self-tapping metal threaded inserts. Metal allows for the use of permanent weld-on assemblies e.g., inner chassis frame. Mounting hub 5500 can define lateral grooves on each side that receives and secures chassis frames. A central bolt hole pattern defined by mounting hub 5500 allows the mounting hub to be coupled to a flange of a mandrel via a plurality of fasteners and/or metal sleeves. Threaded inserts can be used to secure accessories e.g., a mounting plate.

Support ring 5110 resists deformation or buckling of system 5000 during use of system 5000. Certain exemplary embodiments might not comprise support ring 5110, but instead might have the functional equivalent of support ring 5110 fabricated integral to sealing element 5160. In embodiments where support ring 5110 is fabricated integral to sealing element 5160, sealing element 5160 can comprise metal tabs that engage with each of chassis 5100 and chassis 5150 help to restrain motion of sealing element 5160.

Mounting plate 5600 can be a solid piece of material with enough strength and sturdiness to serve as a surface to which other components can be attached and secured. Mounting plate 5600 is attached to mounting hub 5500 via a third plurality of fasteners 5610. In certain exemplary embodiments, third plurality of fasteners 5610 can engage with threaded apertures 5560 defined by mounting hub 5500, which threaded apertures might not extend completely through mounting hub 5500.

Mounting plate 5600 serves as an attachment to accept: a lift lugs, end cap, cone, or eye hook, etc. In certain exemplary embodiments, a blade can be attached to mounting plate 5600 to facilitate pipe cleaning; or a wheel can be attached to mounting plate 5600 to provide support or assist in travel as the pig traverses pipeline.

Lift lug 5800 is a handle or projection used as a hold or support for transportation and lifting purposes. Lift lug 5800 also serves as a mounting bracket to which an object (e.g., a cover, blank plate, or any one of a plurality of noses) can be attached and secured to prevent lateral movement of the connected object e.g., an end cap. In certain exemplary embodiments, a pair of third plurality of fasteners 5610 can couple lift lug 5800 to system 5000.

Sealing element 5160 can be a solid cast molded object configured out of an easily manipulated material with a distinctive shape and footprint that touches the inner surface of a pipe. Sealing element 5160 is easy to install, handle, and clean. Sealing element 5160 can comprise anchor lugs 5010, which anchor lugs 5010 are a series of protruding knobs that connect, support, and secure the sealing element in place. Anchor lugs 5010 can each comprise a nipple tip, which can engage tightly with apertures 5190 of first chassis 5100 and first chassis 5150. Anchor lugs 5010 can have substantially any shape or configuration so long as they perform the functions described herein. Any count of anchor lugs can be used so long as the count is sufficient to perform the functions described herein. In addition, lengths of anchor lugs 5010 can vary. For example, lengths of anchor lugs 5010 engaging with first chassis 5100 can have a different length than anchor lugs 5010 engaging with chassis 5150. Anchor lugs 5010 can act as bumpers that interact with obstructions and/or line scaling as a system comprising system 5000 moves in a pipeline. Sealing element 5160 can comprise a molded-in wear indicator 5040 (e.g., colored ring, line, or mark), which indicates when sealing element 5160 should be repaired and/or replaced. Molded-in wear indicator 5040 has a close dimensional tolerance to an inside pipe diameter in which system 5000 is designed to operate. Certain exemplary embodiments can use replaceable snap rings as molded-in wear indicator 5040.

Certain exemplary embodiments provide a pipe pigging system 5000, which can comprise:
first mounting hub 5500 coupled to a first sealing element 5160, wherein first sealing element 5160 comprises a flange face 5050 with a series of anchor lugs 5011;
first chassis 5100 is coupled to flange face 5050 of first sealing element 5160 by inserting anchor Lugs 5010 through apertures 5190;
first chassis 5150 coupled to a face 5520 of first mounting hub 5500 via second plurality of fasteners 5180, each of first chassis 5100 and first chassis 5150 engaging with anchor lugs 5010 on opposing ends of first sealing element 5160 such that pipe pigging system 5000 is substantially impervious to liquid entering an interior of the first sealing element after pipe pigging system 5000 is assembled; 5200 are sleeves for second plurality of fasteners 5180;
support ring 5110 disposed between first mounting hub 5500 and first sealing element 5160;
mounting plate 5600 coupled to first mounting hub 5500; and
lift lug 5800 coupled to mounting plate 5600 via plurality of fasteners 5610, wherein lift lug 5800 is used to couple pipe pigging system 5000 to a lifting apparatus such that pipe pigging system 5000 is placed in, or removed from, a pipe;
an end cap 5260 coupled to first mounting hub 5500, end cap 5260 engaging with chassis 5150 such that pipe pigging system 5000 is substantially impervious to liquid entering the interior of sealing element 5160 after pipe pigging system 5000 is assembled;
a mandrel (e.g., mandrel 1100 of FIG. 1) coupled to first sealing element 5160 via first mounting hub 5500 and/or a second mounting hub (e.g., second mounting hub 1900 of FIG. 1);
a second sealing element (e.g., second sealing element 1910 of FIG. 1) coupled to the second mounting hub, the second sealing element comprising a second sealing element flange (e.g., second sealing element flange 1920 of FIG. 1);
a second chassis (e.g., chassis 1300 of FIG. 1) coupled to the second sealing element flange face of the second sealing element;
a second chassis (e.g., chassis 1930 of FIG. 1) coupled to a face of the second mounting hub via a second plurality of sleeves, each of the second chassis A and the second chassis B engaging with an opposing end of the second sealing element such that the pipe pig is substantially impervious to liquid entering an interior of the second sealing element after the pipe pig is assembled;
an electric motor that is housed within a cavity (e.g. cavity 3050 of system 3000 illustrated in FIG. 3) at least partially defined by first mounting hub 5500; wherein the electric motor causes system 48000 and any other components coupled thereto to rotate in a pipe traversed by system 5000; and/or
a measuring instrument that is housed within a cavity (e.g. cavity 3050 of system 3000 illustrated in FIG. 3) at least partially defined by first mounting hub 5500; wherein the measuring instrument transmits information concerning the pipe traversed by system 5000 and any other components coupled thereto.

First sealing element 5160 can be coupled to pipe pigging system 5000 via anchor lugs 5010 secured through apertures 5190 defined by the first chassis, and via anchor lugs 5011 secured through apertures 5191 defined by the second chassis. First sealing element 5160 can be coupled to pipe pigging system 5000 without threaded fasteners. Certain exemplary pigging discs are secured to the mandrel with a series of bolts surrounding the center axis on the disc. In this configuration the mounting hub is connected to the mandrel around its central axis with a plurality of bolts. In certain preferred embodiments, the sealing element is secured to chassis cavities with anchor lugs 5010 near the outer diameter of the configuration. This allows for more connection points with less torque or force at those points—hence the lack of a threaded fastener to secure the sealing element in this design. In certain exemplary embodiments, pipe pigging system 5000 can be unidirectional. In certain exemplary embodiments, pipe pigging system 5000 can be bidirectional. First sealing element 5160 can be a single molded element.

Figure 11:
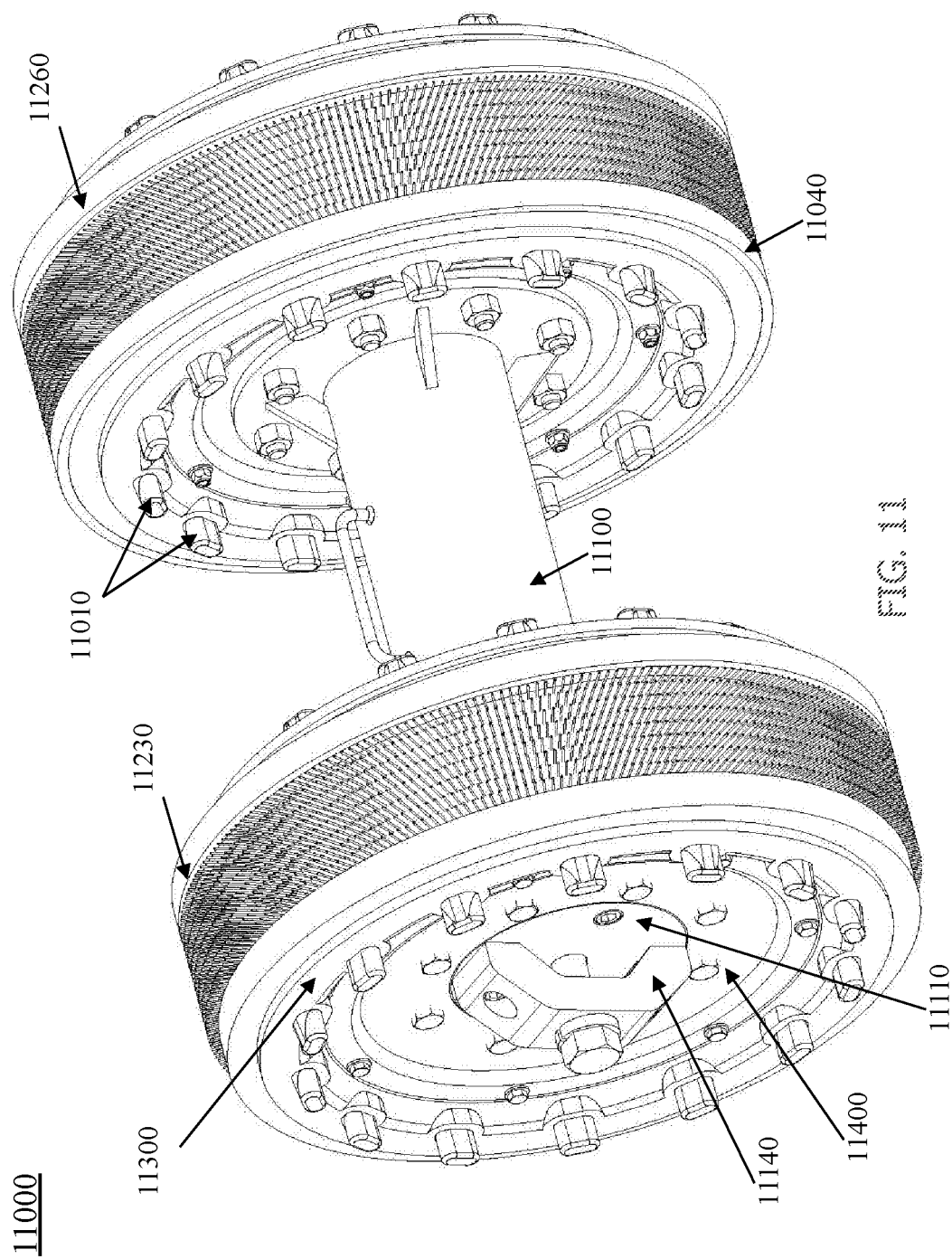
FIG. 11 is a perspective view of an exemplary embodiment of a bidirectional pipe pigging system 11000.

Certain exemplary pipe pig systems can comprise:
a substantially unitary anterior sealing element (e.g., sealing element 5160), the anterior sealing element defining a core hole 5045 that extends through a body of the anterior sealing element, anterior sealing element 5160 can have a molded body of a deformable material (for example, sealing rings of the pipe pig can be oversized by approximately two percent as compared to the inner diameter of the pipe such that sealing takes place as a result of the sealing ring conforming substantially to the inner surface of the pipe), anterior sealing element 5160 can be molded as a single unit, the anterior sealing element can comprise:
- an anterior end 5161 and a posterior end 5162, anterior end 5161 of anterior sealing element comprising a plurality of anterior anchor lugs 5010, posterior end 5162 of the anterior sealing element comprising a plurality of posterior anchor lugs 5011;
- at least one anterior sealing element sealing ring 5163, at least one anterior sealing element sealing ring 5163 deformable to substantially conform to a shape of a pipe through which the pipe pig traverses, at least one anterior sealing element sealing ring 5163 constructed to substantially prevent fluid flow between at least one anterior sealing element sealing ring 5163 and the pipe;
- a surface that defines a cup (see, e.g., cup 23990 illustrated in FIG. 23); and/or
- a brush (e.g., first brush element 11230 of FIG. 11);

a first anterior sealing element chassis 5150, first anterior sealing element chassis 5150 being a Chassis A design, first anterior sealing element chassis 5150 defining a plurality of first anterior sealing element chassis apertures 5190, each of the plurality of first anterior sealing element chassis apertures 5190 engaged with a corresponding one of the plurality of anterior anchor lugs 5010 to restrain movement of first anterior sealing element chassis 5150 relative to sealing element 5160 when engaged with corresponding anterior anchor lugs 5010 of first anterior sealing element 5160, wherein second anterior sealing element chassis 5100 can have a Chassis B design in embodiments where sealing element 5160 defines a cup;

a second anterior sealing element chassis 5100, second anterior sealing element chassis 5100 defining a plurality of second anterior sealing element chassis apertures 5191, each of plurality of second anterior sealing element chassis apertures 5191 engaged with a corresponding one of the plurality of posterior anchor lugs 5011 to restrain movement of second anterior sealing element chassis 5100 relative to sealing element 5160 when engaged with corresponding posterior anchor lugs 5011 of anterior sealing element 5160; and a first mounting hub 5500 coupled directly to first anterior sealing element chassis 5150 and second anterior sealing element chassis 5100 via a plurality of second mounting hub fasteners 5180, wherein core hole 5045 of anterior sealing element 5160 is sized and shaped so as to tightly fit over a mating surface of the first mounting hub 5500, first mounting hub 5500 providing circumferential support to anterior sealing element 5160 when coupled to anterior sealing element 5160; and a mandrel (see, e.g., mandrel 2100 of FIG. 2) coupled to first mounting hub 5500;

a support ring 5110 disposed between first mounting hub 5500 and first sealing element 5160;

a support ring (see, e.g., support ring 43110 of FIG. 43) molded with the anterior sealing element (see, e.g., anterior sealing element 43160 of FIG. 43), wherein the support ring defines a plurality of apertures (see, e.g., plurality of apertures 43111 of FIG. 43) via which material comprised by the anterior sealing element flows to form the anterior sealing element;

a mounting plate 5600 coupled to first mounting hub 5500;

a lift lug 5800 coupled to mounting plate 5600 via a plurality of lift lug fasteners 5610, wherein lift lug 5800 is used to couple the pipe pig to a lifting apparatus such that the pipe pig is placed in, or removed from, the pipe;

an end cap 5260 coupled to first mounting hub 5500, end cap 5260 constructed to be in direct contact with materials encountered anterior to the pipe pig as the pipe pig traverses the pipe;

an end cap coupled to the first mounting hub, the end cap comprising a cutting head (see, e.g., end cap with a cutting head of FIG. 46) that assists in penetrating blockages in the pipe;

an end cap coupled to the first mounting hub, the end cap comprising a plurality of rollers (see, e.g., end cap with a plurality of rollers illustrated in FIG. 52) that assist in aligning and/or supporting the system as it traverses the pipe;

an electric motor that is housed within a sealed cavity (e.g. cavity 3050 of system 3000 illustrated in FIG. 3) either at least partially defined by the first mounting hub or defined by the mandrel, the electric motor causing an attachment to the system to rotate relative to the pipe pig;

an fuel cell or battery pack that is housed within a sealed cavity (e.g. cavity 3050 of system 3000 illustrated in FIG. 3) at least partially defined by the mounting hub or defined by the mandrel, the battery pack providing sufficient energy to power an electric motor or a measuring instrument;

a measuring instrument that is housed within a sealed cavity (e.g. cavity 3050 of system 3000 illustrated in FIG. 3) at least partially defined by the mounting hub or defined by the mandrel, the measuring instrument transmitting information concerning the pipe; and/or a substantially unitary 2 sealing element (a mirror image of sealing element 5160 that is used in bidirectional systems such as illustrated in FIG. 1), the posterior sealing element comprising:
- an anterior end and a posterior end, the anterior end of the posterior sealing element comprising a plurality of anterior anchor lugs, the posterior end of the posterior sealing element comprising a plurality of posterior anchor lugs; and
- at least one posterior sealing element sealing ring, the at least one posterior sealing element sealing ring deformable to substantially conform to the shape of the pipe, the at least one posterior sealing element sealing ring constructed to substantially prevent fluid flow between the at least one anterior sealing element sealing ring and the pipe.

The pipe pig can be substantially impervious to liquid entering an interior of the anterior sealing element after the pipe pig is assembled. First mounting hub 5500 can be coupled to anterior sealing element 5160 such that movement therebetween is restrained. First mounting hub 5500 has a circumferential support surface that supports an interior surface 5164 of anterior sealing element 5160. In certain exemplary embodiments, first mounting hub 5500 is of a more rigid construction than anterior sealing element 5160.

An outer face 5165 of sealing element 5160 defines a profile of raised regions 5166, profile of raised regions 5166 can comprise at least one anterior sealing element sealing ring 5163, wherein each raised region of the profile of raised regions is constructed to deform as the pipe traverses a pipeline to conform to a contour of the pipe.

Certain exemplary embodiments provide a pipe pig, the pipe pig comprising:

first mounting hub 5500;
an attachment (see, e.g., the illustrated cutting head of FIG. 46), the attachment can be directly coupled to first mounting hub 5500, wherein, via a powered shaft (see, e.g., the shaft of FIG. 55), the attachment rotates relative to the mounting hub;
substantially unitary anterior sealing element 5160, the anterior sealing element defining core hole 5045 that extends through a body of anterior sealing element 5160, anterior sealing element 5160 comprising at least one anterior sealing element sealing ring 5163, the at least one anterior sealing element sealing ring 5163 deformable to substantially conform to a shape of a pipe through which the pipe pig traverses, at least one anterior sealing element sealing ring 5163 constructed to substantially prevent fluid flow between at least one anterior sealing element sealing ring 5163 and the pipe, wherein an interior surface 5164 of anterior sealing element 5160 is substantially in contact with an outer radial surface 5501 of first mounting hub 5500, wherein anterior sealing element 5160 comprises an anterior end 5161 and a posterior end 5162, anterior end 5161 of anterior sealing element 5160 comprising a plurality of anterior anchor lugs 5010, posterior end 5162 of anterior sealing element 5160 comprising a plurality of posterior anchor lugs 5011;
first anterior sealing element chassis 5100, first anterior sealing element chassis 5100 being a Chassis A design, first anterior sealing element chassis 5100 defining a plurality of first anterior sealing element chassis apertures 5191, each of plurality of first anterior sealing element chassis apertures 5191 can be engaged with a corresponding one of the plurality of posterior anchor lugs 5011 to restrain movement of first anterior sealing element chassis 5100 relative to anterior sealing element 5160 when engaged with corresponding posterior anchor lugs 5011 of anterior sealing element 5160; and/or
second anterior sealing element chassis 5150, the second anterior sealing element chassis defining a plurality of second anterior sealing element chassis apertures 5190, each of the plurality of second anterior sealing element chassis apertures 5190 can be engaged with a corresponding one of the plurality of anterior anchor lugs 5010 to restrain movement of second anterior sealing element chassis 5150 relative to sealing element 5160 when engaged with corresponding anterior anchor lugs 5010 of anterior sealing element 5160.

Figure 6:
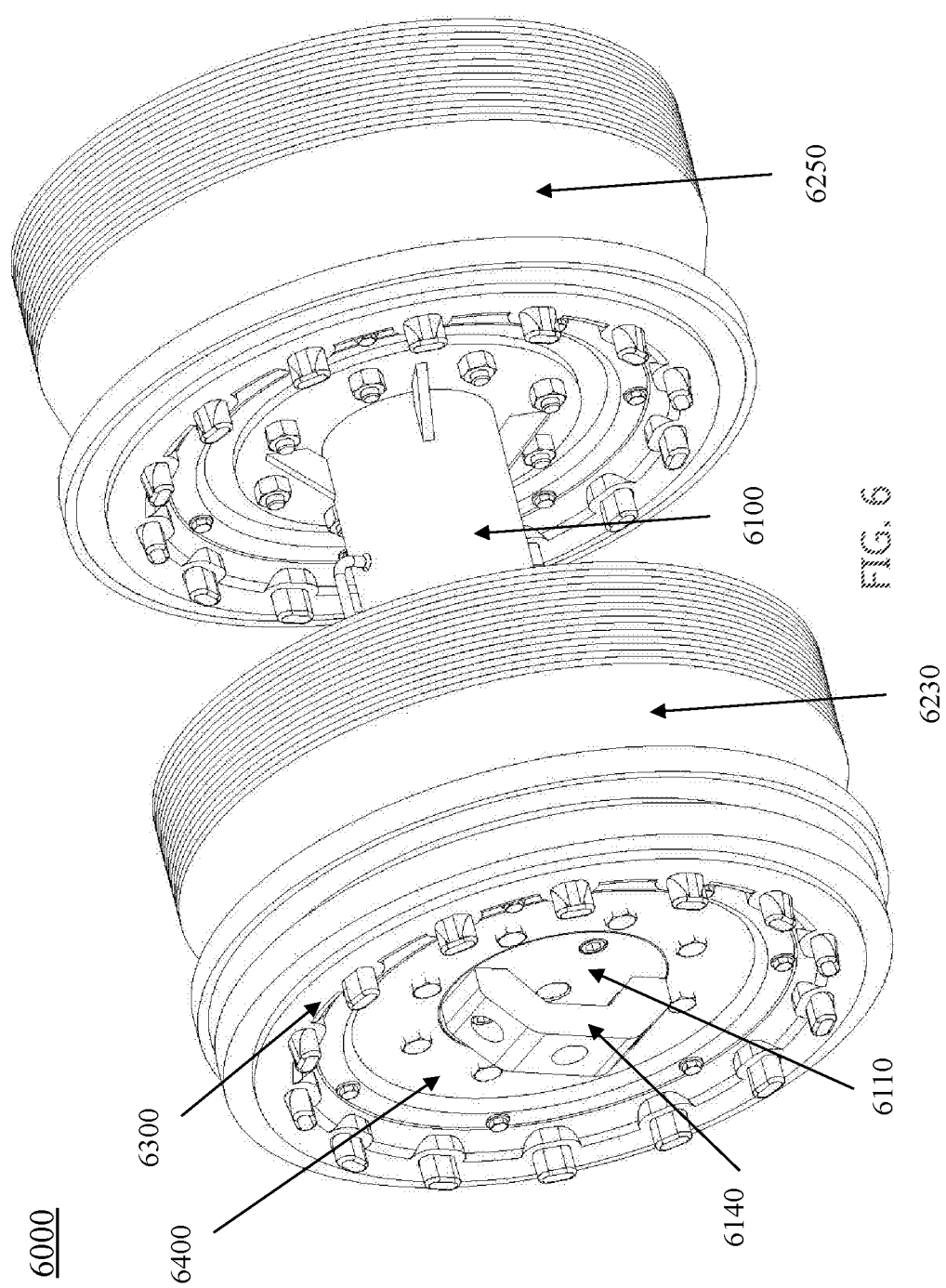
FIG. 6 is a perspective view of an exemplary embodiment of a pipe pigging system 6000.

FIG. 6 is a perspective view of an exemplary embodiment of a pipe pigging system 6000. System 6000 comprises, inter alia, a mandrel 6100, a chassis 6300, a mounting hub 6400, a mounting plate 6110, a lift lug 6140, a sealing element front cup 6230, and a sealing element rear cup 6250. Cup ends of the sealing elements will be on the downstream end of the sealing element relative to a direction of travel of system 6000 in a pipe.

FIG. 7 is a sectional view of an exemplary embodiment of a pipe pigging system 7000 and a section 3-3 of system 7000.

FIG. 8 is a sectional view of an exemplary embodiment of a sealing ring system 8000 and a section 4-4 of system 8000. Conically cupped pigs resemble cone shaped cups, with the outer diameter sized to a pipe's outer diameter, and the inner diameter sized to the nominal pipe bore. Such pigs easily conform to the ovality of a pipe due to its shape.

FIG. 9 is a sectional view of an exemplary embodiment of a sealing ring system 9000 and a section 5-5 of system 9000. The conical sealing element shown is derived from a hydraulic piston seal. The conical sealing element aggressively scrapes the inside pipe wall and provides a good positive seal with maximum flexibility for liquid batching. The configuration can be changed to replicate conical pigs on a unidirectional platform. Certain exemplary embodiments can be used in a front hub assembly, which can comprise one guide disc, one sealing disc, and a conical cup. Certain exemplary embodiments provide substantially equally spaced ribs on the cup lip. These can provide additional sealing capability and more abrasive qualities than a smoothed faced cup. The batching or cleaning ability of certain designs can be further enhanced with the addition of an additional cup. Certain exemplary embodiments are configured for a rear hub assembly, which can comprise one sealing disc and a conical cup.

Figure 10:
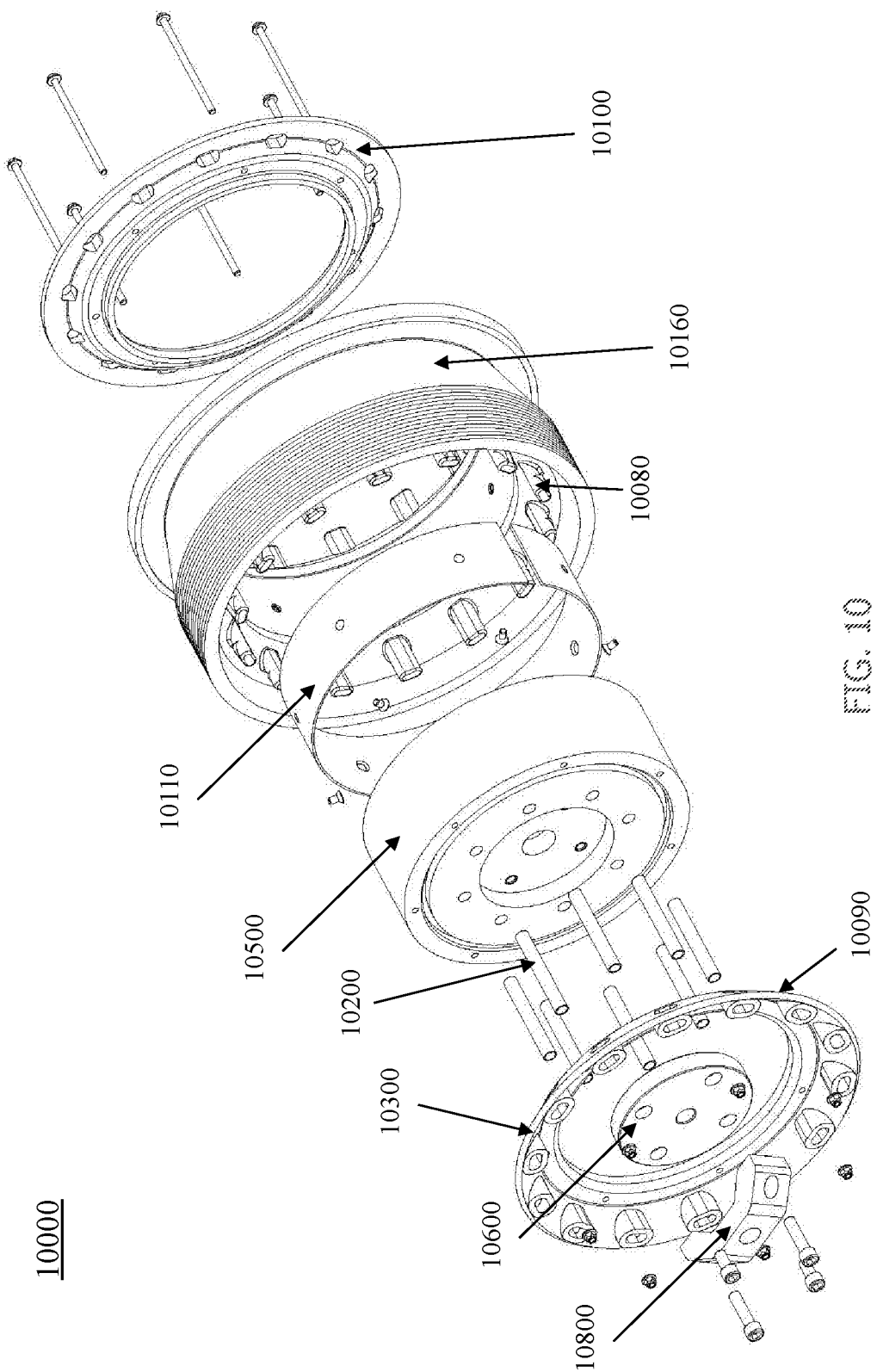
FIG. 10 is an exploded view of an exemplary embodiment of a pipe pigging system 10000.

FIG. 10 is an exploded view of an exemplary embodiment of a conical cup pipe pigging system 10000. System 10000 illustrates a plurality of anchor lugs 10080 comprised by sealing element 10160. Chassis 10300 of system 10000 defines a plurality of cavities 10090. When system 10000 is assembled, the anchor lugs 10080 embodied on sealing element 10160 engage tightly with cavities 10090 of chassis 10300 and 10100 to restrain motion of chassis 10300 and 10100 relative to sealing element 10160. System 10000 further comprises, a plurality of sleeves 10200, a mounting hub 10500, a mounting plate 10600, a lift lug 10800, and a support ring 10110.

FIG. 11 is a perspective view of an exemplary embodiment of a brush bidirectional pipe pigging system 11000. A brush element can be a solid cast molded object configured out of easily manipulated material with a distinctive shape and footprint with abrasive bristles that clean the internal walls of the pipeline and remove debris such as scale, wax, and sludge. The brush element is easy to install, handle, and clean. The brush element can comprise a guide disc, a sealing disc, and an aggressive abrasive bristle brush pattern. The brush element can be configured in any combination of guide discs and sealing discs to accommodate most pigging applications. The brush element can comprise:

anchor lugs—a series of protruding knobs that connect, support, and secure the sealing element in place; and/or
a molded-in wear point (colored ring, line, or mark) on the seal disc, which indicates when the element should be replaced.

Brush elements can be used to clean the internal walls of the pipeline and remove debris such as scale, wax, and sludge. The quantity and arrangement of the brushes can provide substantially 360-degree coverage on an internal pipe wall. Certain bidirectional configurations can comprise one guide disc, one sealing disc, and a brush. The sealing disc can maintains a tight seal with the pipe wall and facilitate relatively efficient propulsion of the pig through the pipe.

System 11000 comprises, inter alia, a plurality of anchor lugs 11010, a colored wear ring 11040, a mandrel 11100, a chassis A 11300, a mounting hub 11400, a mounting plate 11110, a lift lug 11140, a first brush element 11230, and a second brush element 11260. Colored wear ring 11040 can provide an indication to a user when system 11000 has been used in a manner in which system 11000 has worn to a point where repair and/or replacement of first brush element 11230 and second brush element 11260 should be considered.

The inclusion of brushes can facilitate removal of wax and/or scale on a pipeline's internal surface.

First brush element 11230 and/or second brush element 11260 are used to clean internal walls of a pipeline and remove debris such as scale, wax, and/or sludge, etc. The quantity and arrangement of the brushes provide 360-degree coverage on internal pipe walls. Sealing discs maintain a tight seal with the pipeline wall and allow a pig to be propelled through the pipe. First brush element 11230 and/or second brush element 11260 can comprise materials and/or configurations that provide different abrasive properties tailored to the nature of materials likely present in a pipeline.

FIG. 12 is a sectional view of an exemplary embodiment of a bidirectional pipe pigging system 12000 and a section 6-6 of system 12000.

FIG. 13 is a sectional view of an exemplary embodiment of a sealing ring system 13000 and a section 7-7 of system 13000.

FIG. 14 is a sectional view of an exemplary embodiment of a sealing ring system 14000 and a section 8-8 of system 14000.

FIG. 15 is an exploded view of an exemplary embodiment of a brush pipe pigging system 15000. System 15000 comprises, inter alia, a brush element 10150. Pipe pigging system 15000 is a unidirectional pigging system with a full wrap-around wire brush. System 15000 can also be readily modified to function as a bidirectional pig by simply changing its sealing element design. The inclusion of brushes can facilitate the removal of wax and scale on pipeline internal surfaces.

Brushes can be used to clean the internal walls of the pipeline and remove debris such as scale, wax, and/or sludge, etc. The quantity and arrangement of brush pixels can provide substantially 360-degree coverage on the internal pipe wall. Unidirectional brush elements can comprise a brush arrangement fitted between two sealing discs.

FIG. 16 is a sectional view of an exemplary embodiment of a sealing ring system 16000 and a section 9-9 of system 16000.

Figure 17:
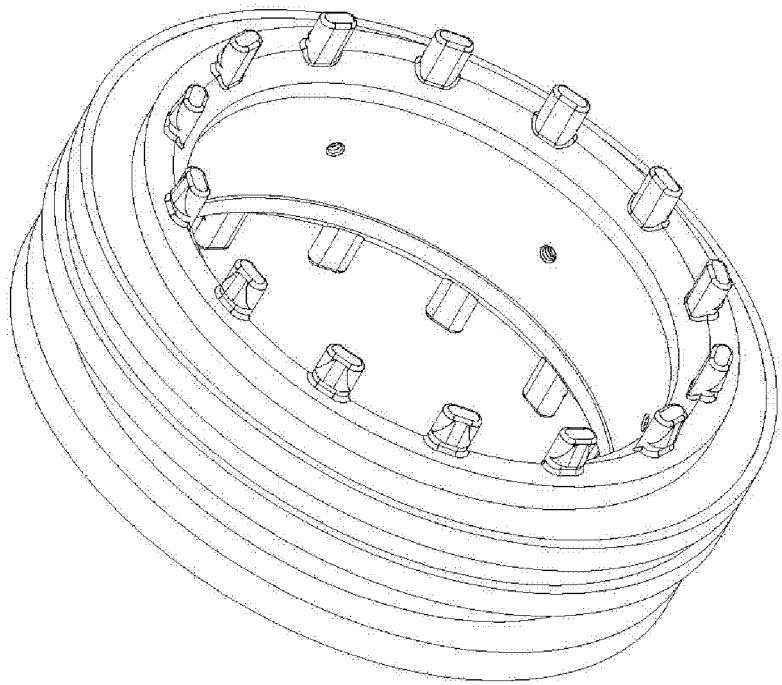
FIG. 17 is a perspective view of an exemplary embodiment of a sealing ring system 17000.

FIG. 17 is a perspective view of an exemplary embodiment of a sealing ring system 17000.

Figure 18:
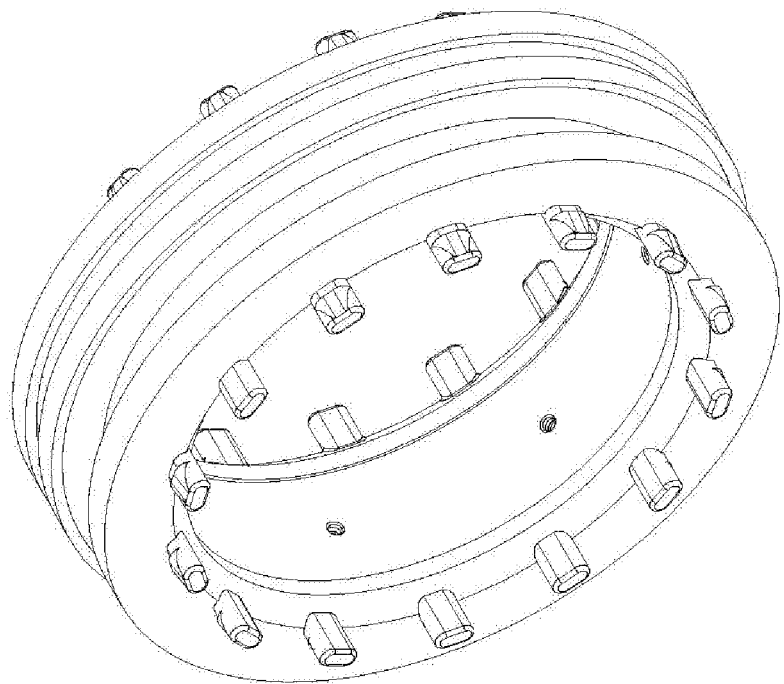
FIG. 18 is a perspective view of an exemplary embodiment of a sealing ring system 18000.

FIG. 18 is a perspective view of an exemplary embodiment of a sealing ring system 18000.

FIG. 19 is a sectional view of an exemplary embodiment of a cup sealing ring system 19000 and a section 10-10 of system 19000.

Figure 20:
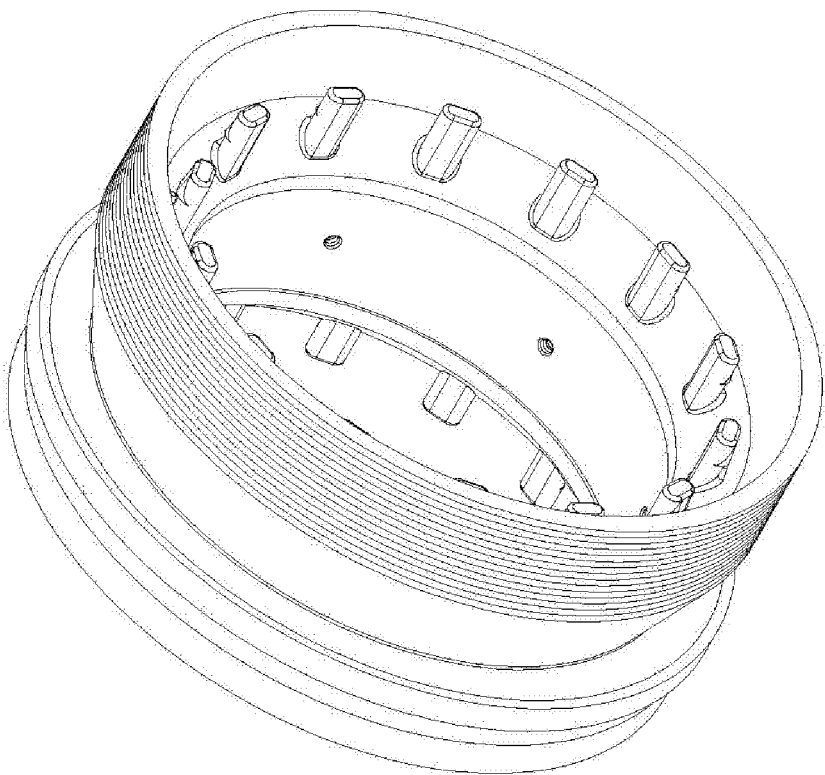
FIG. 20 is a perspective view of an exemplary embodiment of a sealing ring system 20000.

FIG. 20 is a perspective view of an exemplary embodiment of a cup sealing ring system 20000.

Figure 21:
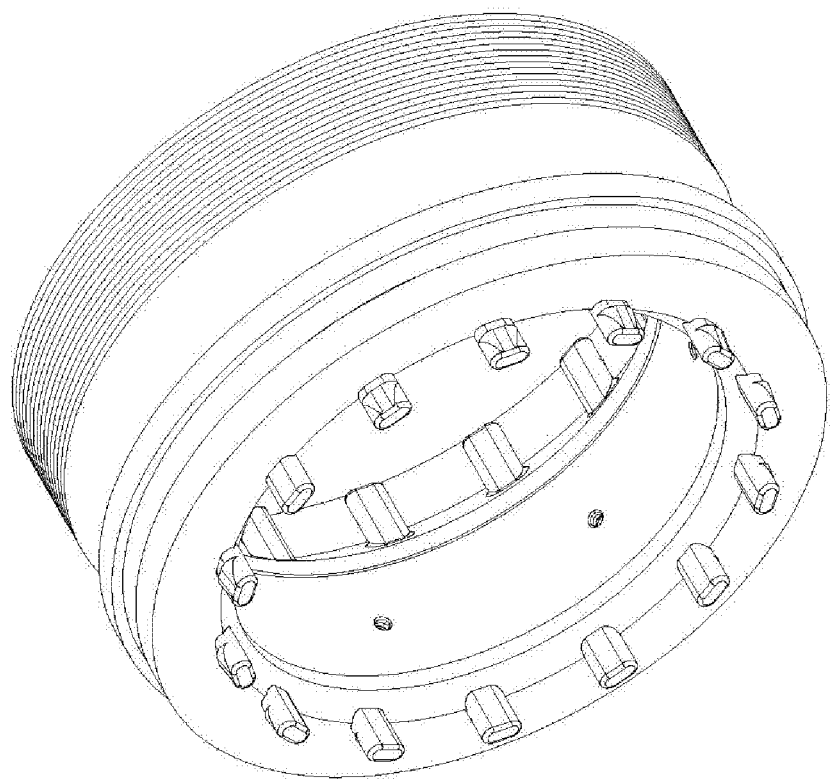
FIG. 21 is a perspective view of an exemplary embodiment of a sealing ring system 21000.

FIG. 21 is a perspective view of an exemplary embodiment of a cup sealing ring system 21000. The distinctive shape of the conical cup formation at the rear of the element allow for greater flexibility in pipes.

FIG. 22 is a sectional view of an exemplary embodiment of a cup sealing ring system 22000 and a section 11-11 of system 22000.

FIG. 23 is a perspective view of an exemplary embodiment of a cup sealing ring system 23000.

FIG. 24 is a perspective view of an exemplary embodiment of a cup sealing ring system 24000.

FIG. 25 is a sectional view of an exemplary embodiment of a sealing ring system 25000 and a section 12-12 of system 25000.

Figure 26:
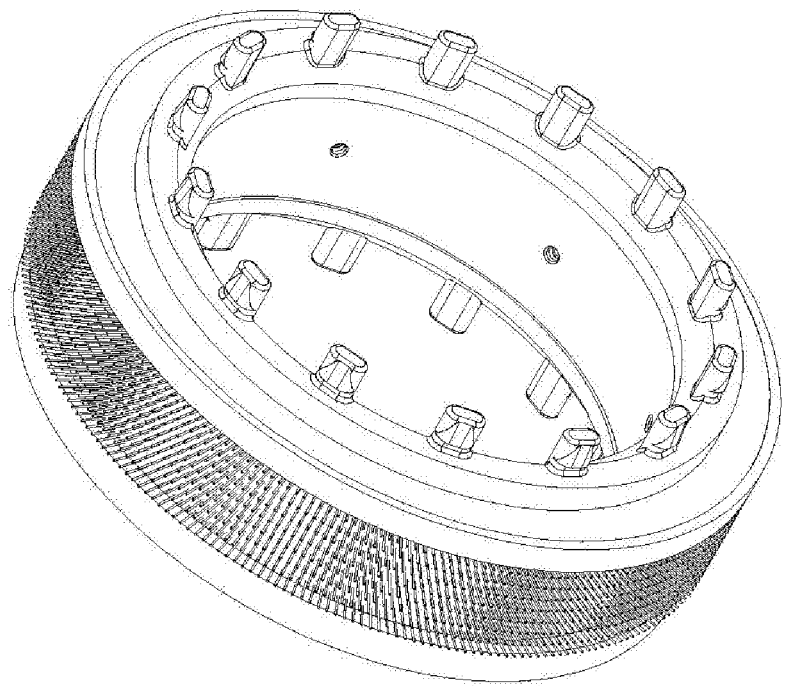
FIG. 26 is a perspective view of an exemplary embodiment of a sealing ring system 26000.

FIG. 26 is a perspective view of an exemplary embodiment of a brush sealing ring system 26000.

Figure 27:
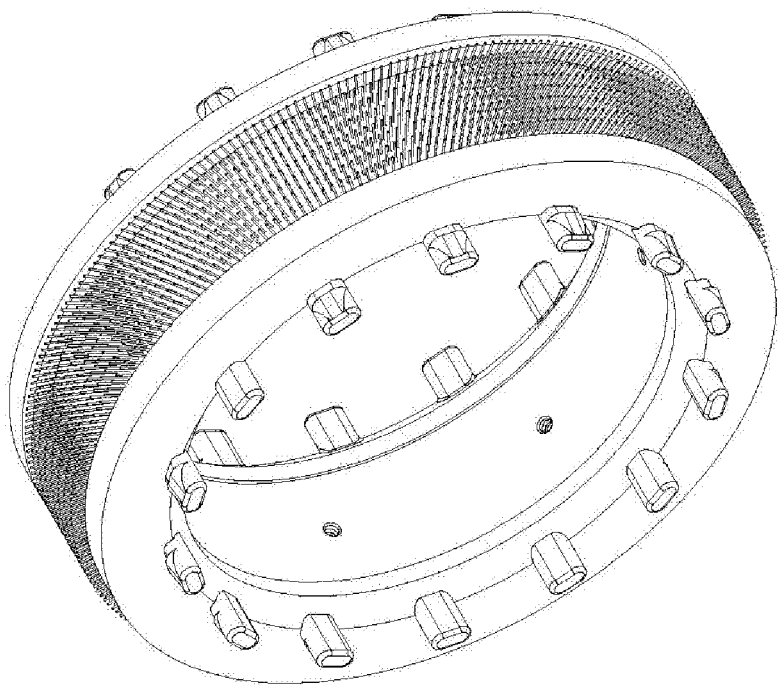
FIG. 27 is a perspective view of an exemplary embodiment of a sealing ring system 27000.

FIG. 27 is a perspective view of an exemplary embodiment of a brush sealing ring system 27000.

FIG. 28 is a sectional view of an exemplary embodiment of a brush sealing ring system 28000 and a section 13-13 of system 28000.

Figure 29:
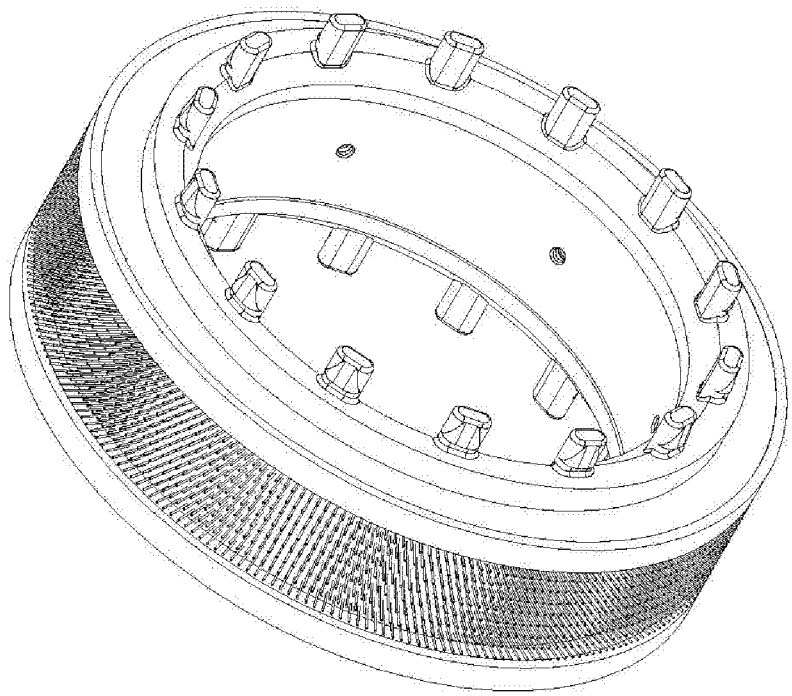
FIG. 29 is a perspective view of an exemplary embodiment of a sealing ring system 29000.

FIG. 29 is a perspective view of an exemplary embodiment of a brush sealing ring system 29000.

Figure 30:
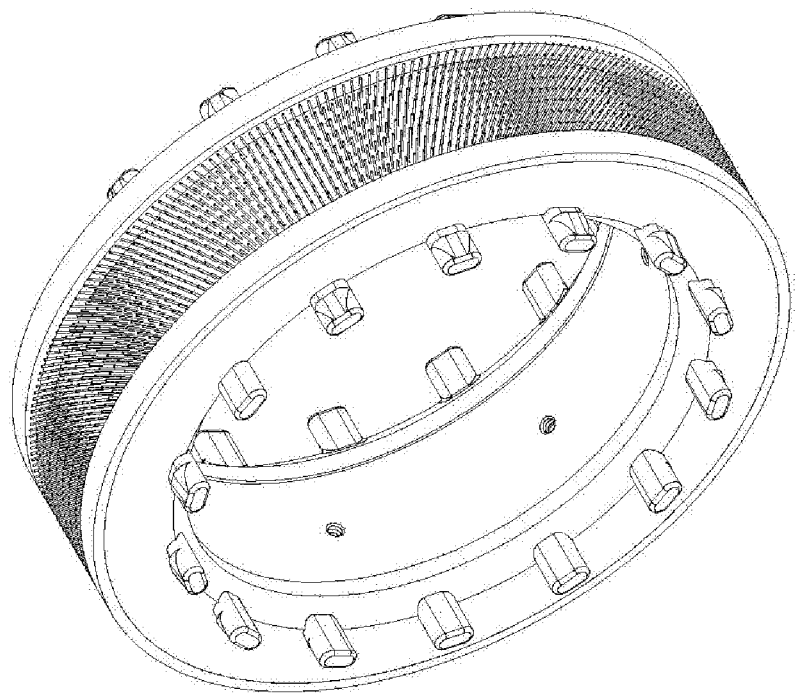
FIG. 30 is a perspective view of an exemplary embodiment of a sealing ring system 30000.

FIG. 30 is a perspective view of an exemplary embodiment of a brush sealing ring system 30000.

FIG. 31 is a sectional view of an exemplary embodiment of a basic chassis system 31000 and a section 14-14 of system 31000. This design anchors the element securely in place. The support ring (molded into the sealing element or secured in place with metal threaded inserts) provides additional structural support to the element.

The basic chassis system 31000 can be a precast cylindrical steel hub structure that surrounds and encloses the sealing element serving to support and strengthen it, and provide a tight seal between surfaces.

- Two chassis can be utilized to secure the sealing element in place.
- Chassis can be secured onto the mounting hub and held in position with lateral grooves and bolts—see, e.g., FIG. 5.
- The basic chassis system 31000 is cast with moderate angles and sharp corners to accommodate a sealing element without cups—see Section 14-14.
- Chassis cavities, which surround the outer portion of the part, restrain movement of joined parts. They provide a series of receptors to which anchor lugs hold and secure the sealing element in place.

FIG. 32 is a sectional view of an exemplary embodiment of a modified chassis system 32000 and a section 15-15 of system 32000.

The modified Chassis system 32000 can be a precast cylindrical steel hub structure that surrounds and encloses the sealing element serving to support and strengthen it, and provide a tight seal between surfaces.

- Two chassis can be utilized to secure the sealing element in place.
- Chassis can be secured onto the mounting hub and held in position with lateral grooves and bolts—see, e.g., FIG. 5.
- The modified Chassis system 32000 is cast with moderate angles and moderate corners to accommodate a sealing element with cups—see Section 15-15.
- Chassis cavities, which surround the outer portion of the part, restrain movement of joined parts. They provide a series of receptors to which anchor lugs hold and secure the sealing element in place.

FIG. 33 is a sectional view of an exemplary embodiment of a mandrel system 33000 and a section 16-16 of system 33000. Mandrel system 33000 is the central part of a pig assembly. It can be configured into a cleaning pig, sealing pig, or a combination of both on either a bidirectional or unidirectional platform. The mandrel can comprise a hollow metal body, solid center rod, or other rigid shaft fitted with two flanged ends to which front and rear-mounting hubs are attached with bolts. Mandrel system 33000 can be coated with an anti-corrosion protective coating to enhance durability.

FIG. 34 is a sectional view of an exemplary embodiment of a mounting hub system 34000 and a section 17-17 of system 34000.

Mounting hub system 34000 is the central point of interconnection that serves to connect components that define a bidirectional or unidirectional pig. Two are utilized (front and rear) in assembly. Mounting hub system 34000 can be constructed out of a variety of materials that provide adequate strength and rigidity e.g., plastic, steel, and/or aluminum, etc. Plastics allow for the use of molded-in, press-in, expansion, or self-tapping metal threaded inserts. Metal allows for the use of substantially permanent weld-on assemblies e.g., inner chassis frame. Mounting hub system 34000 can define:

- lateral grooves on each side of the mounting hub, which provide a long narrow cut or depression to receive and secure chassis frames;
- a central bolt hole pattern can secures mounting hub system 34000 to a mandrel body flange via a plurality of fasteners and/or metal sleeves; and
- threaded inserts, which can be utilized to secure accessories e.g., a mounting plate.

Section 17-17 of system 34000 details construction of mounting hub system 34000, e.g., through-holes (bolt/sleeve), and/or threaded inserts, etc.

Figure 35:
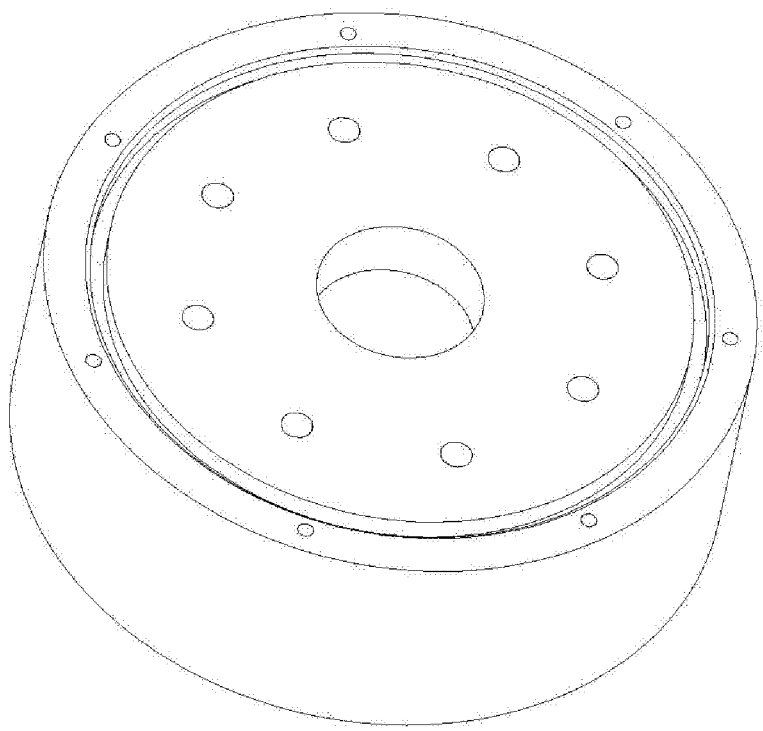
FIG. 35 is a perspective view of an exemplary embodiment of a mounting hub system 35000.

FIG. 35 is a rear perspective view of an exemplary embodiment of a mounting hub system 35000.

Figure 36:
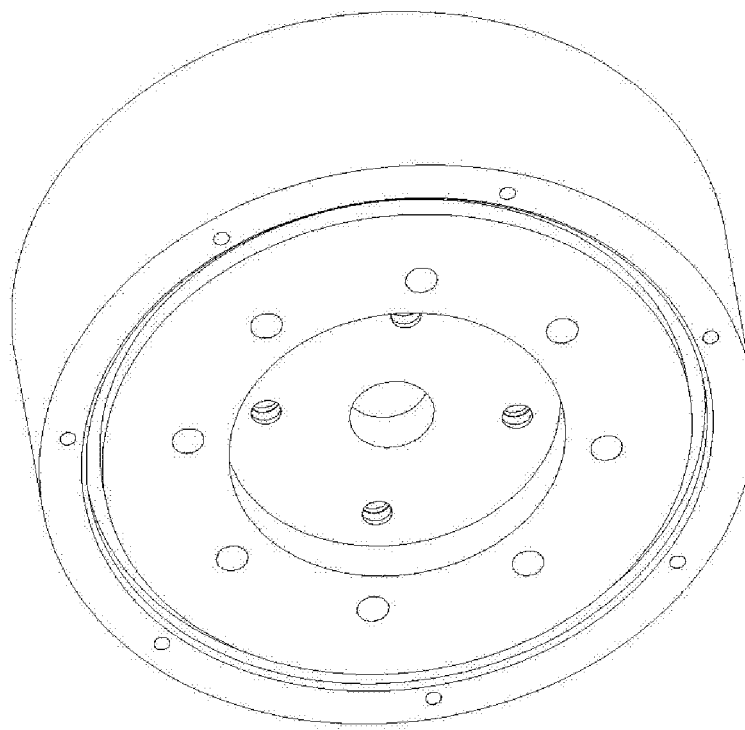
FIG. 36 is a perspective view of an exemplary embodiment of a mounting hub system 36000.

FIG. 36 is a front perspective view of an exemplary embodiment of a mounting hub system 36000.

FIG. 37 is a sectional view of an exemplary embodiment of a mounting plate system 37000 and a section 18-18 of system 37000. Mounting plate system 37000 can comprise a solid piece of material with enough strength and sturdiness to serve as a surface to which other things can be attached and secured. Mounting plate system 37000 is attached to the mounting hub via metal threaded inserts. Mounting plate system 37000 serves as an attachment to accept components such as lift lugs, end caps, or eye hooks, etc.

FIG. 38 is a sectional view of an exemplary embodiment of a lift lug system 38000 and a section 19-19 of system 38000. Lift lug system 38000 can be a handle or projection used as a hold or support for transportation and lifting purposes. Lift lug system 38000 can also serve as a mounting bracket to which an object can be attached and secured to prevent lateral movement of the connected object, e.g., an end cap.

FIG. 39 is a sectional view of an exemplary embodiment of a lift lug system 39000.

FIG. 40 is a sectional view of an exemplary embodiment of a support ring system 40000 and a section 20-20 of system 40000. Support ring system 40000 can be cast into the sealing element or mounted on the inside cavity of a symmetrical sealing element via a plurality of metal threaded inserts. It prevents deformation or buckling of the element during operation.

FIG. 41 is a sectional view of an exemplary embodiment of an end sphere system 41000 and a section 21-21 of system 41000.

FIG. 42 is a sectional view of an exemplary embodiment of an end assembly system 42000 and a section 22-22 of system 42000.

Figure 43:
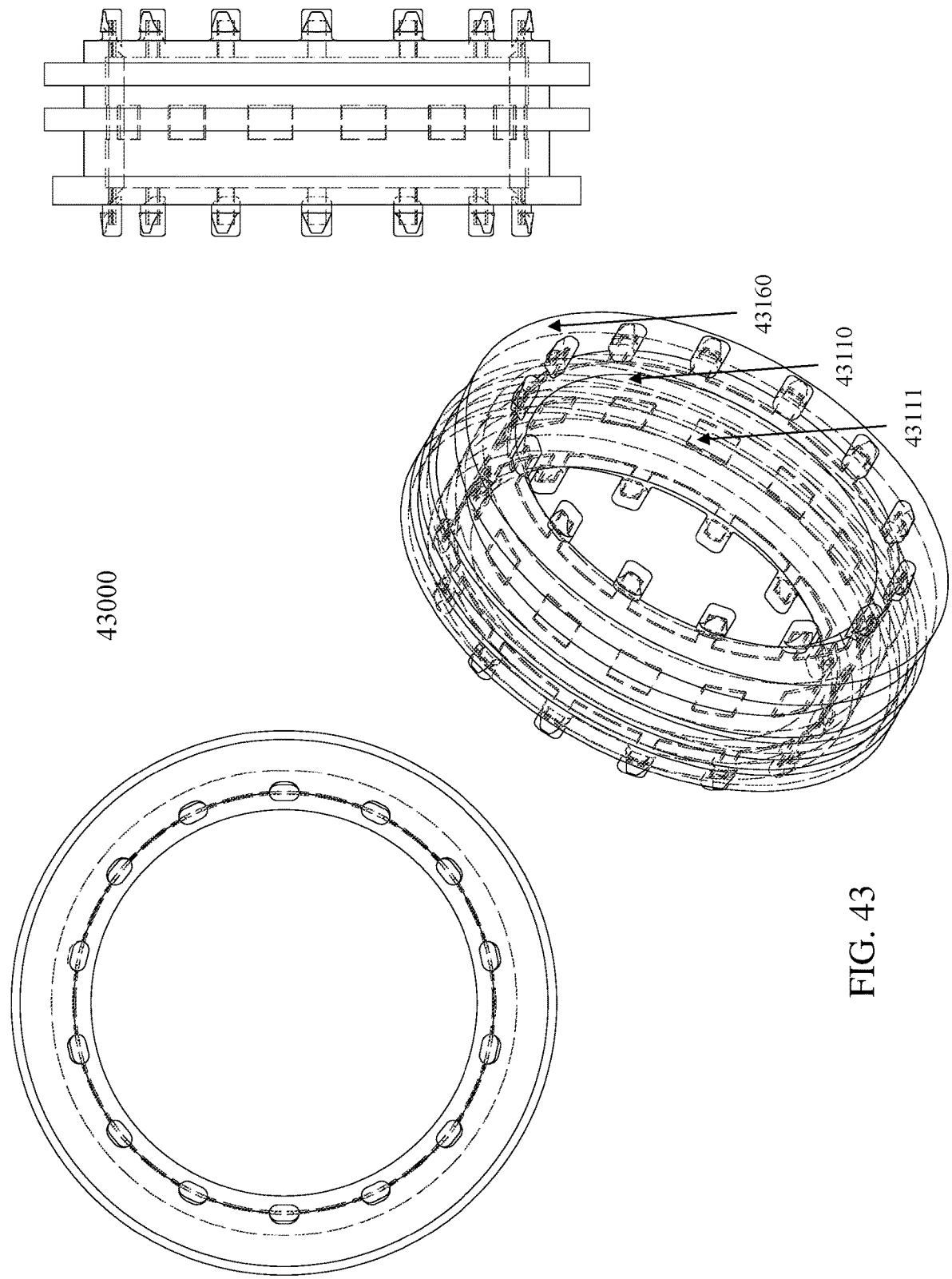
FIG. 43 is a set of views of an exemplary embodiment of sealing element system 43000.

FIG. 43 is a set of views of an exemplary embodiment of support ring molded into the sealing element system 43000, which can be utilized in exemplary pipe pigging systems (e.g., system 1000 of FIG. 1).

FIG. 44 is a set of views (front and rear) of an exemplary embodiment of sealing element system 44000, which can be utilized in exemplary pipe pigging systems (e.g., system 1000 of FIG. 1).

Figure 45:
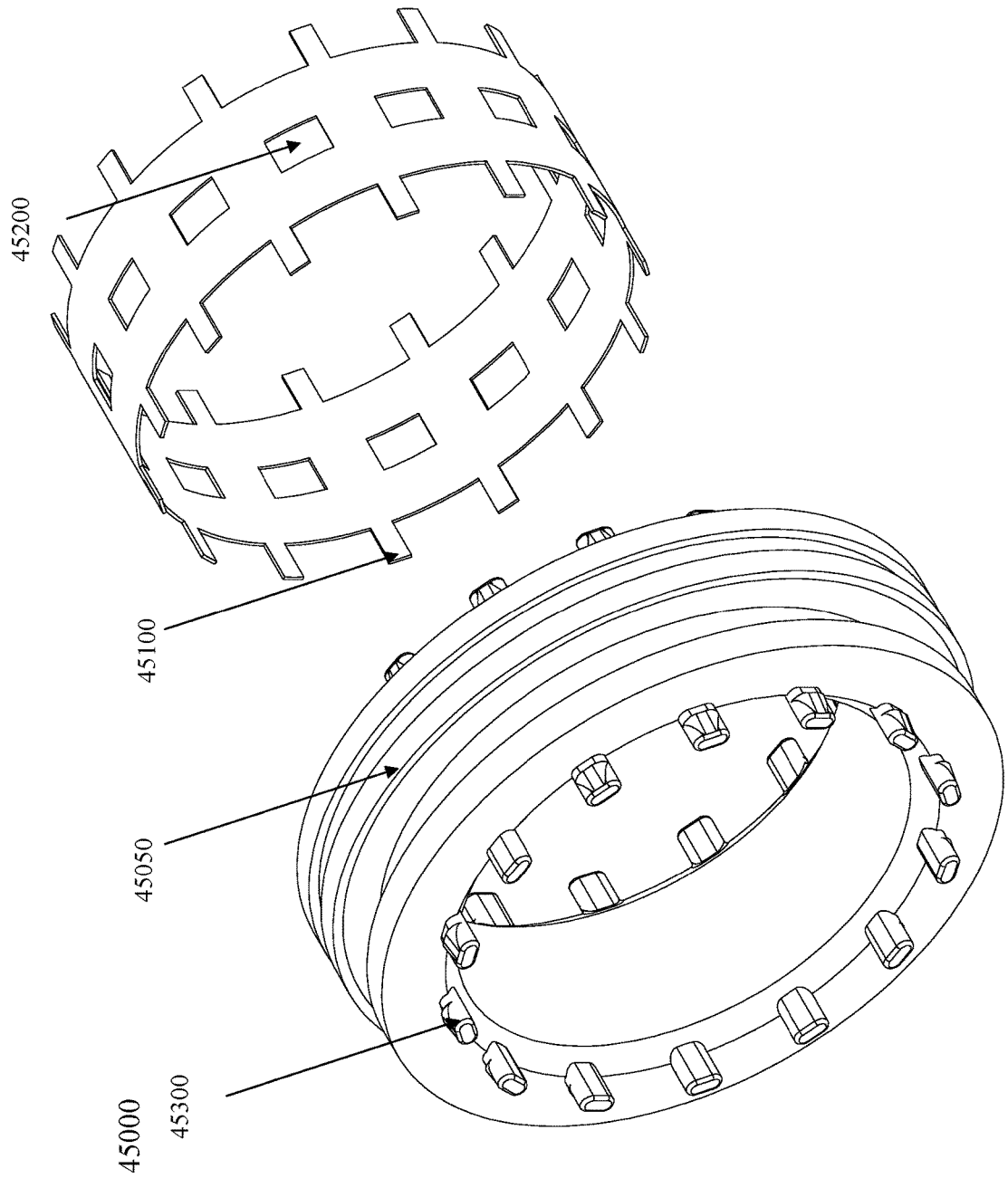
FIG. 45 is a set of views of an exemplary embodiment of sealing element system 45000.

FIG. 45 is a set of views of an exemplary embodiment of sealing element system 45000 with a mold in support ring, which can be utilized in exemplary pipe pigging systems (e.g., system 1000 of FIG. 1). The illustrated embodiment comprises a support ring 45100 that defines a plurality of apertures 45200 that readily accept liquid transfer during the molding process. The plurality of apertures correspond with the anchor lug projections 45300 on sealing element 45050 thereby providing a fastenerless coupling of support ring 45100 to sealing element 45050.

FIG. 46 is a set of views of an exemplary embodiment of an end cap system 46000, which can be utilized in exemplary pipe pigging systems (e.g., system 1000 of FIG. 1). Via utilization of end cap system 46000, the illustrated cutting heads can assist in penetrating blockages in a pipe.

FIG. 47 is a set of views of an exemplary embodiment of an end cap system 47000, which can be utilized in exemplary pipe pigging systems (e.g., system 1000 of FIG. 1). Via utilization of end cap system 47000, the illustrated cutting heads can assist in penetrating blockages in a pipe.

FIG. 48 is a set of views of an exemplary embodiment of an end cap system 48000, which can be utilized in exemplary pipe pigging systems (e.g., system 1000 of FIG. 1). Via utilization of end cap system 48000, the illustrated cutting heads can assist in penetrating blockages in a pipe.

Figure 49:
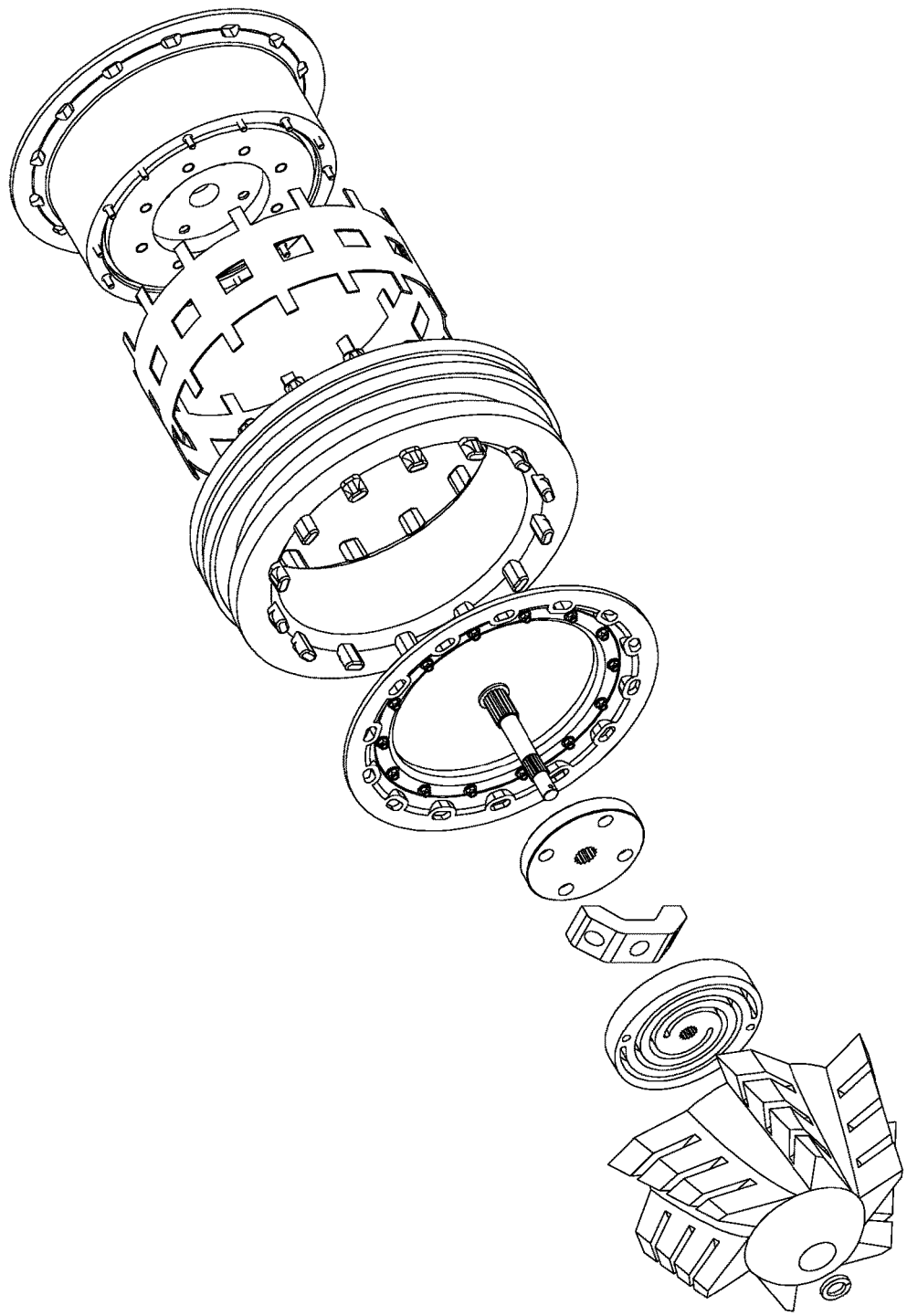
FIG. 49 is an exploded view of an exemplary embodiment of a pipe pigging system 49000.

FIG. 49 is an exploded view of an exemplary embodiment of a pipe pigging system 49000 that comprises an end cap with a cutting head.

FIG. 50 is a set of sectional views of an exemplary embodiment of a pipe pigging system 50000, which comprises a rotating head 50100 on the end cap assembly that comprises a set of rollers 50200. Set of rollers 50200 can assist in support and maintaining alignment of a pipe pigging system as it traverses a pipe.

Figure 51:
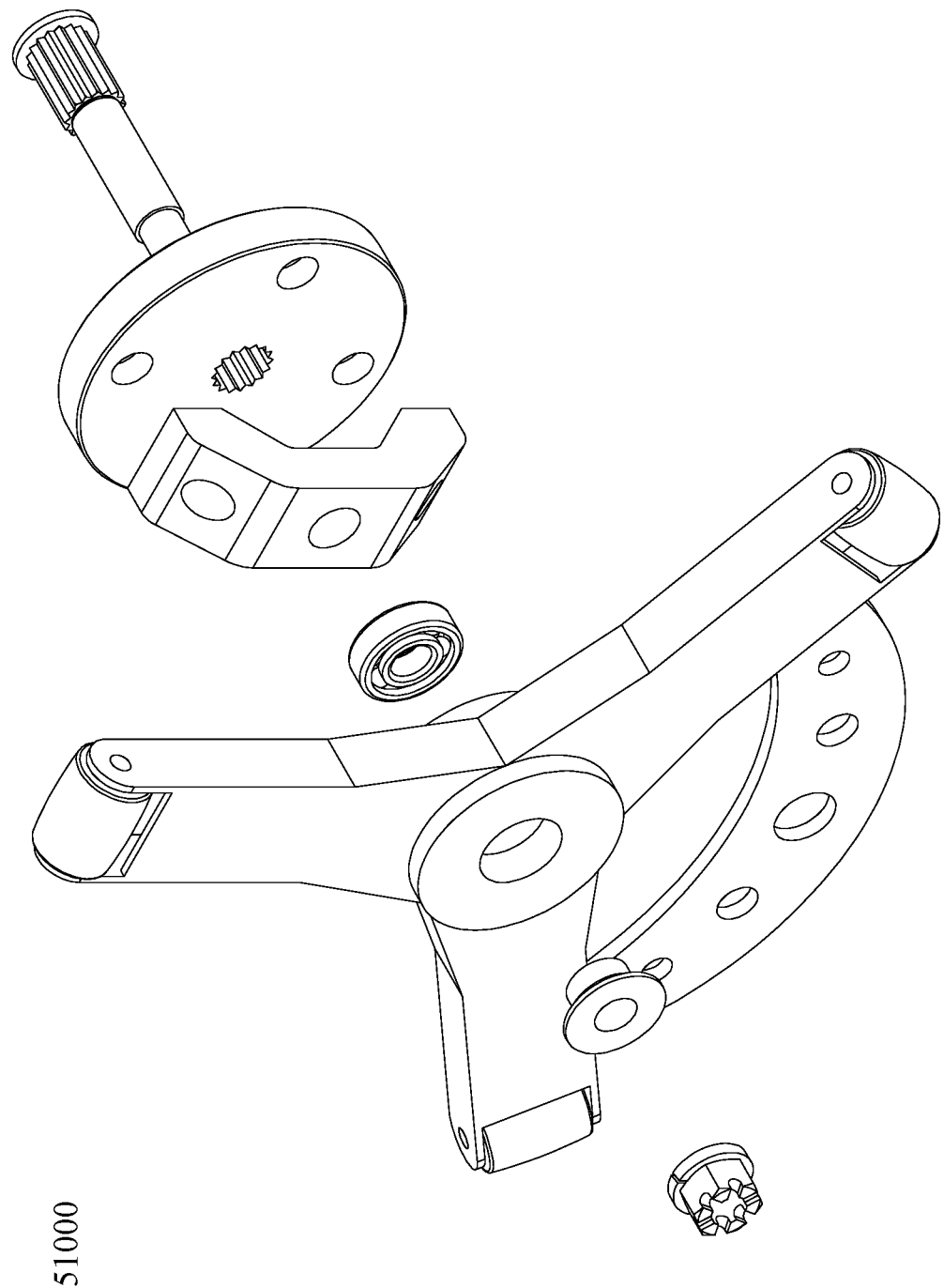
FIG. 51 is an exploded view of an exemplary embodiment of an end cap system 51000.

FIG. 51 is an exploded view of an exemplary embodiment of an end cap system 51000, which comprises a rotating head 50100 of FIG. 50.

FIG. 52 is a set of perspective views of an exemplary embodiment of a pipe pigging system 52000.

FIG. 53 is a set of perspective views of an exemplary embodiment of an end cap system 53000.

Figure 54:
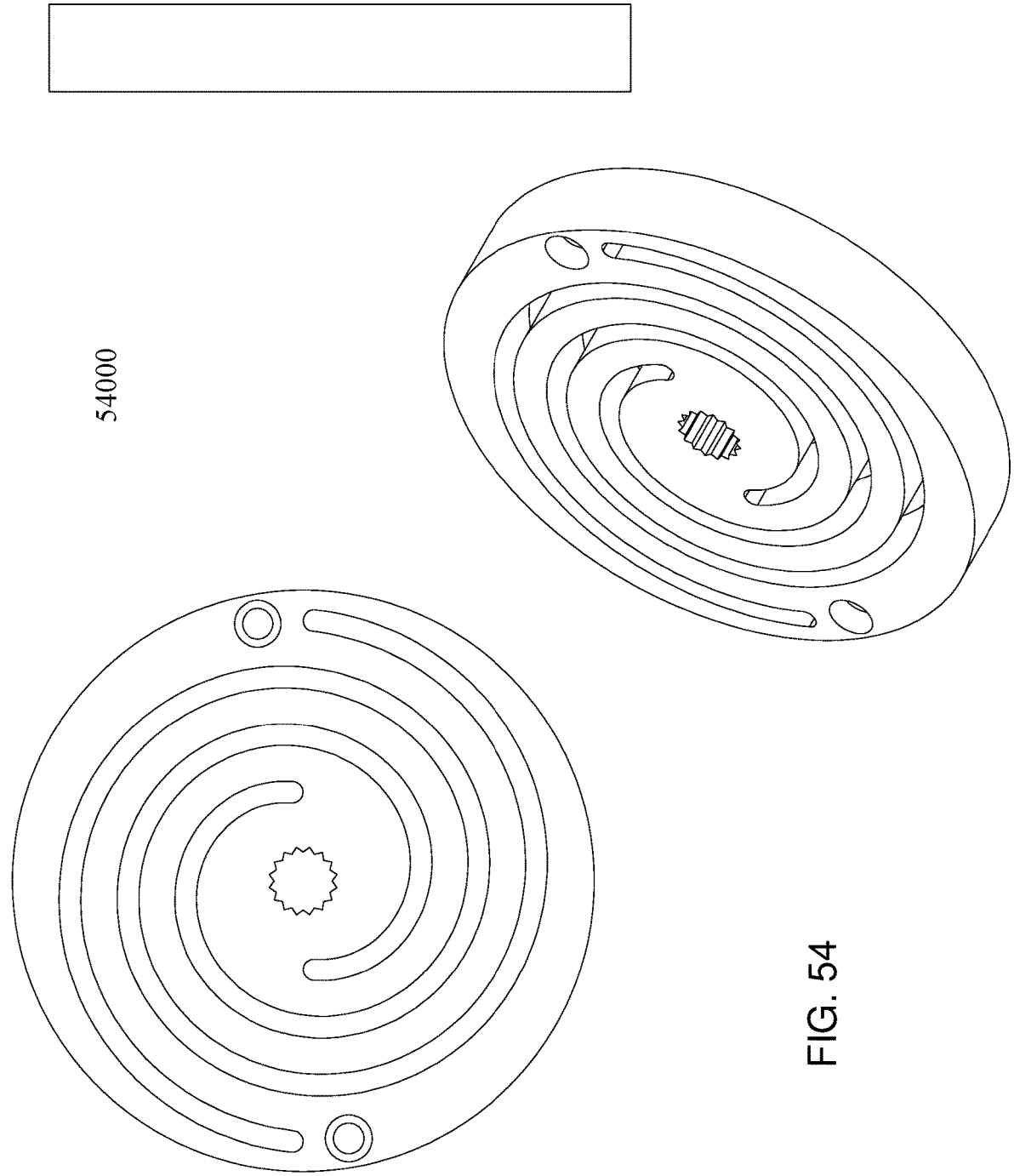
FIG. 54 is a set of views of an exemplary embodiment of spring plate 54000 from an end cap system.

FIG. 54 is a set of views of an exemplary embodiment of a spring plate 54000 from an end cap system, such as illustrated in system 49000 of FIG. 49. Spring plate 54000 can be infused with potential energy as a pipe pigging system attempts to rotate while encountering an obstruction. Potential energy infused in spring plate 54000 can assist in removing the obstruction from the pipe.

Figure 55:
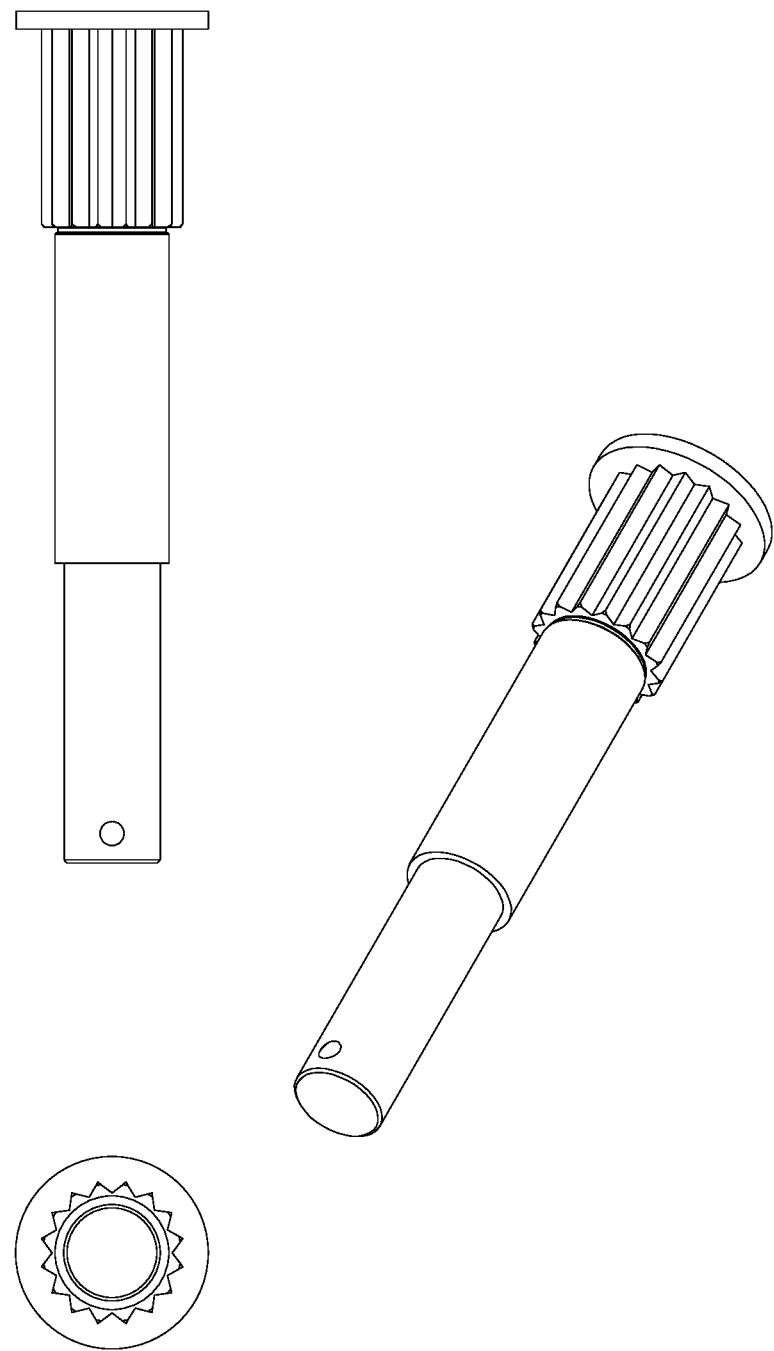
FIG. 55 is a set of views of an exemplary embodiment of a shaft 55000.

FIG. 55 is a set of views of an exemplary embodiment of a shaft 55000, such as illustrated in system 52000 of FIG. 52.

Figure 56:
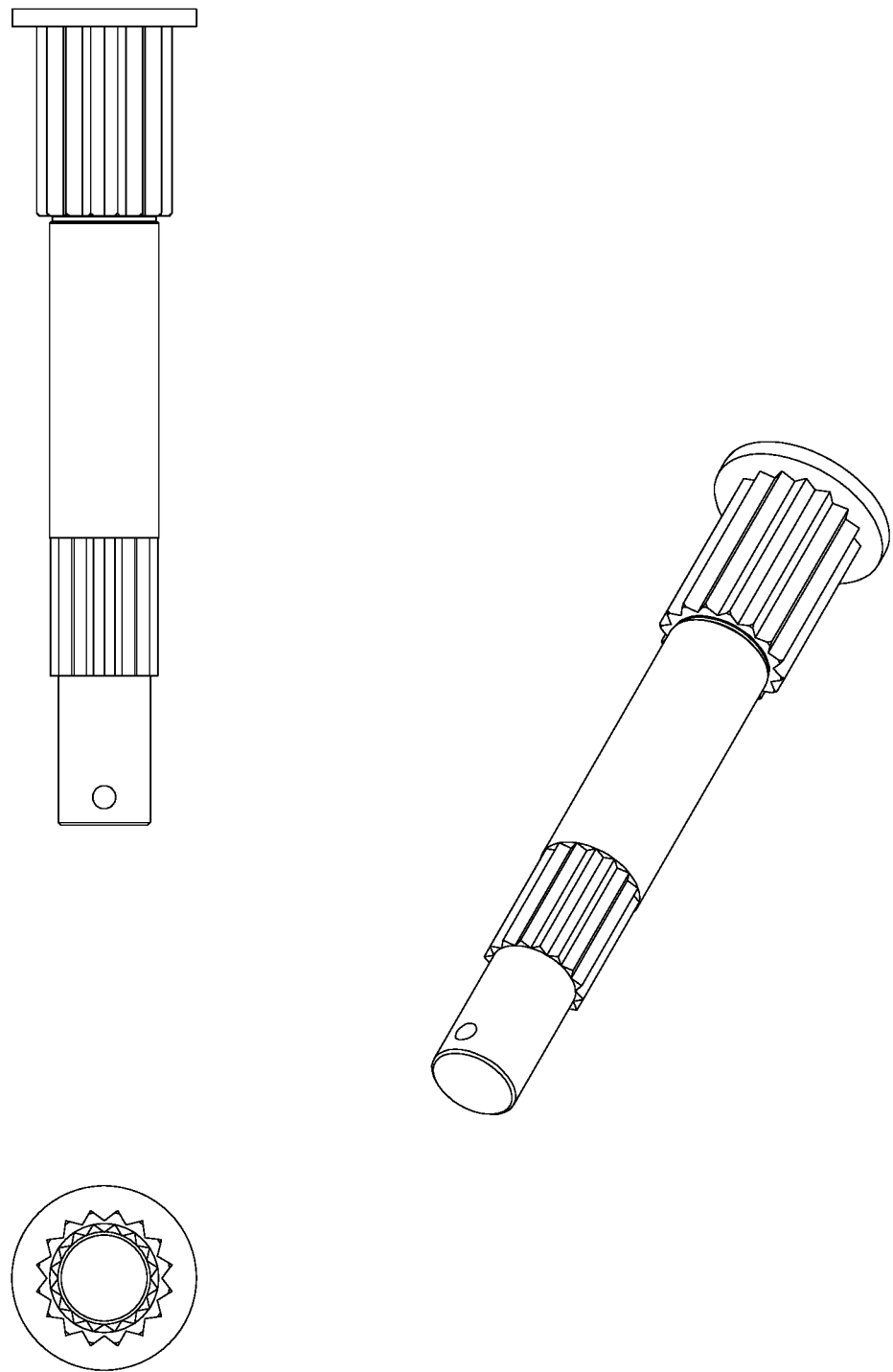
FIG. 56 is a set of views of an exemplary embodiment of a shaft 56000.

FIG. 56 is a set of views of an exemplary embodiment of a shaft 56000, such as illustrated in system 49000 of FIG. 49.

Figure 57:
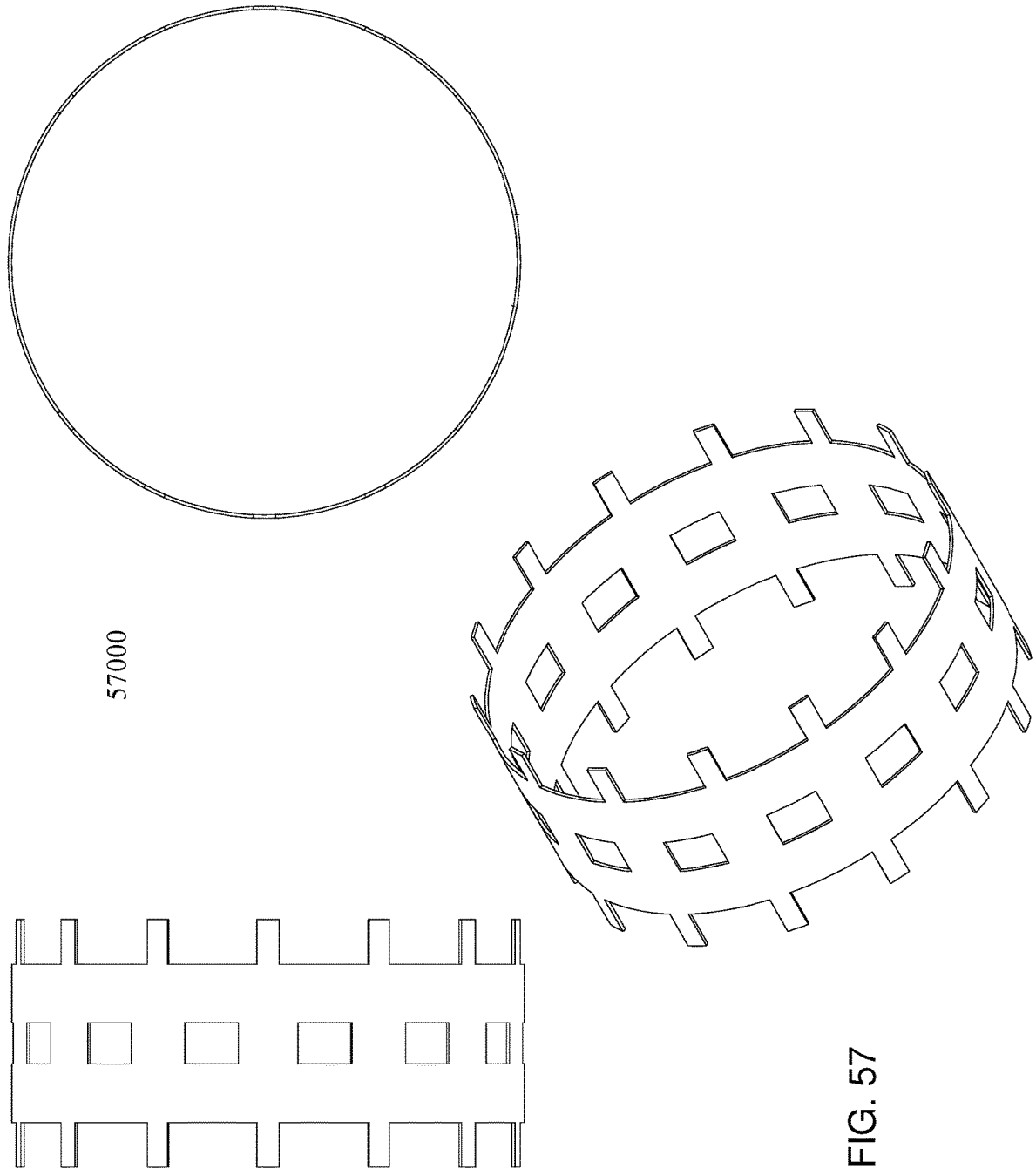
FIG. 57 is a set of views of an exemplary embodiment of a support ring 57000.

FIG. 57 is a set of views of an exemplary embodiment of a mold in support ring 57000.

Figure 58:
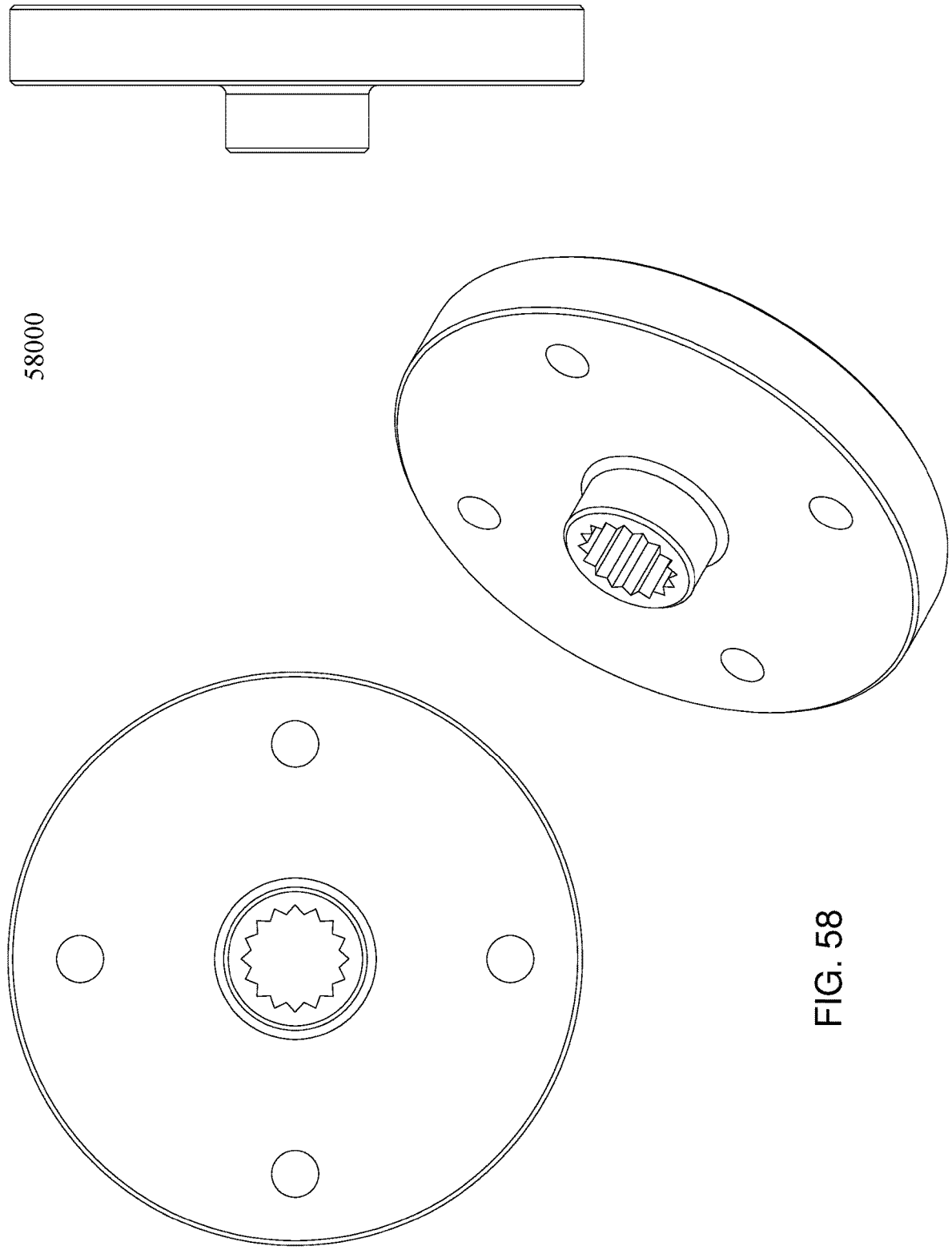
FIG. 58 is a set of views of an exemplary embodiment of a mounting plate 58000.

FIG. 58 is a set of views of an exemplary embodiment of a spline mounting plate 58000, such as illustrated in system 49000 of FIG. 49.

Figure 59:
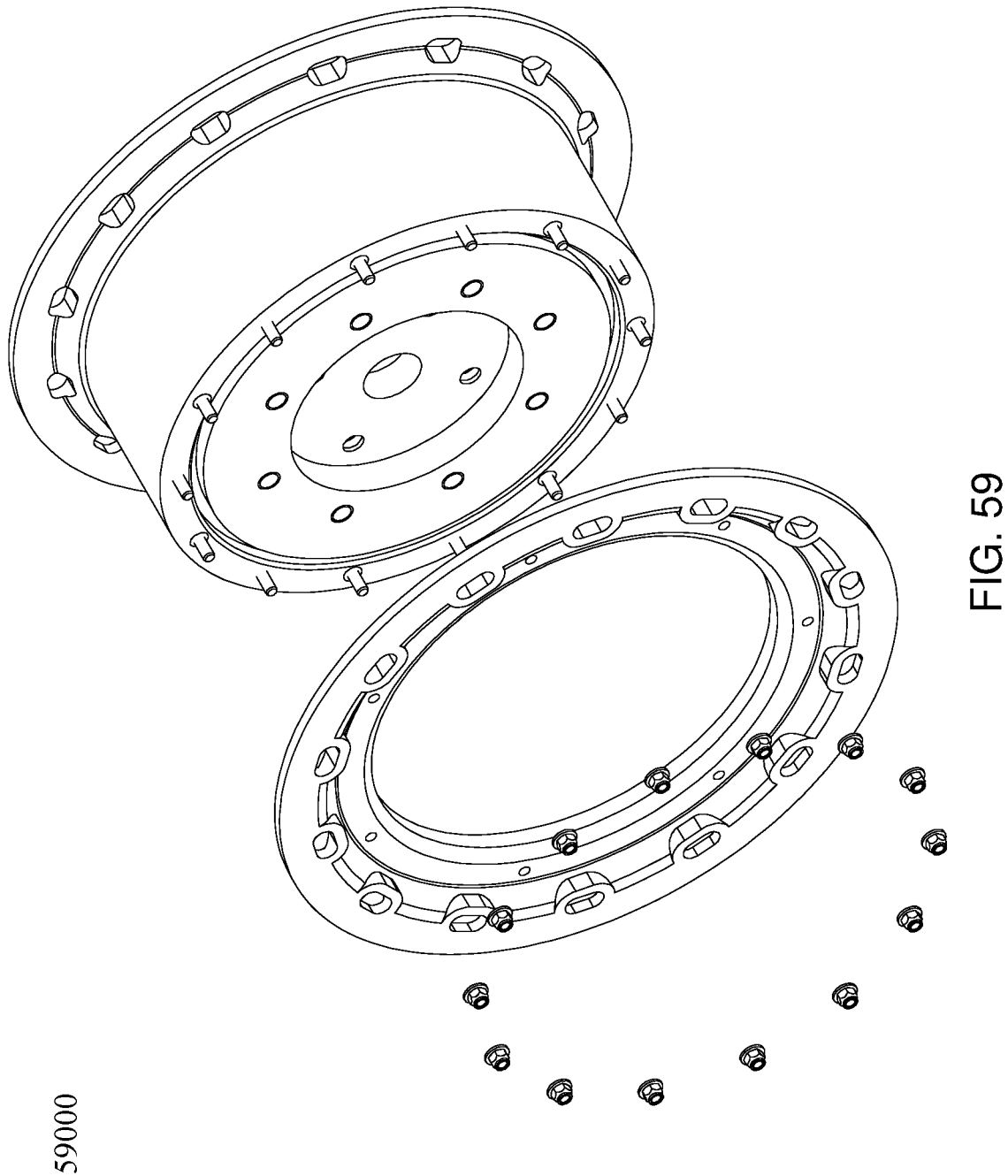
FIG. 59 is a set of views of an exemplary embodiment of a mounting hub and chassis system 59000.

FIG. 59 is a exploded view of an exemplary embodiment of a mounting hub system 59000, partially assembled to show chassis connections.

Definitions

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

a—at least one.
accessory—a device and/or object that enhances a function of a system.
activity—an action, act, step, and/or process or portion thereof
adapter—a device used to effect operative compatibility between different parts of one or more pieces of an apparatus or system.
align—to arrange something to have a longitudinal axis that is substantially parallel to a longitudinal axis of a pipe.
anchor lug—a projected piece of a sealing element via which a sealing element is coupled, supported, and held in place, each anchor lug engages with a cavity of a plurality of cavities defined by a chassis. When engaged with the cavity, the anchor leg projects past a face of the chassis, which provides a circumferential strengthening means.
and/or—either in conjunction with or in alternative to.
anterior—a first portion to arrive at a given location as an object travels through a pipe.
aperture—an opening.
apparatus—an appliance or device for a particular purpose.
assemble—to fit parts together that comprise a pig.
assist—to support and/or aid.
associate—to join, connect together, and/or relate.
attachment—a pipe pig component that is placed on an end of the pipe pig to perform a particular function (e.g., cutting through blockages, act a shield for sensors internal to the pipe pig, etc.).
battery—a device and/or system that comprises one or more cells, in which chemical energy is converted into electricity that is used as a source of power.
battery pack—a group of two or more batteries housed within a casing and used as a power source.
bidirectional—constructed to move or operate in either of two opposing directions in a pipe.
blockage—an obstruction in a pipe.
body—a main part of an object.
brush—hard wire bristles that encircle an anterior or posterior sealing element.
can—is capable of, in at least some embodiments.
cap—a cover of a system.
cavity—a hollow space defined by an object.
channel—a passage that is substantially surrounded by material.
chassis—one of a Chassis A or Chassis B.
chassis A—a precast annular steel hub structure that surrounds and encloses an end of a sealing element serving to support and strengthen the sealing element, and provide a fluid-tight seal between surfaces. Chassis A is secured onto the mounting hub and held in position with lateral grooves and bolts. Chassis A is cast with moderate angles and sharp corners to couple to sealing element ends that do not define cups. Chassis cavities, which are disposed around Chassis A, restrain movement of Chassis A relative to the sealing element when engaged with corresponding anchor lugs of the sealing element.
chassis B—a precast annular steel hub structure that surrounds and encloses an end of a sealing element serving to support and strengthen the sealing element, and provide a fluid-tight seal between surfaces. Chassis B is secured onto the mounting hub and held in position with lateral grooves and bolts. Chassis B is cast with moderate angles that conform in shape to a cup defined by an end of the sealing element. Chassis cavities, which are disposed around Chassis B, restrain movement of Chassis B relative to the sealing element when engaged with corresponding anchor lugs of the sealing element.
circumferential—about a shape that is generally circular.
clean—to remove something that is not desired.
comprising—including but not limited to.
configure—to make suitable or fit for a specific use or situation.
conform—to change to be substantially the same shape as something.
connect—to join or fasten together.
constructed to—made to and/or designed to.
convert—to transform, adapt, and/or change.
core—a central portion of a device and/or system.
core hole—an aperture defined by a central portion of a device and/or system.
coupleable—capable of being joined, connected, and/or linked together.
coupling—linking in some fashion.
cup—a conical bowl shape that defines a portion of an anterior or posterior sealing element. Sealing elements are so shaped so that the outer diameter is sized to substantially fill a pipe's interior cross section.
cut—to divide, crop, and/or shape via a sharp instrument.
cutting head—a component part that cuts.
define—to establish the outline, form, or structure of
deform—to change shape and characterized as having a Durometer hardness between approximately 60 and approximately 85 on the Shore A hardness scale.
determine—to obtain, calculate, decide, deduce, and/or ascertain.
device—a machine, manufacture, and/or collection thereof.
direct contact—having a surface of one object substantially adjacent to a corresponding surface of another object.
edge—a border of an object.
electric motor—a machine that converts electrical energy into mechanical energy.
element—a component.
end cap—a molded object with a distinctive shape and size that is coupleable to a mounting plate and has a surface that is an external surface of a pipe pig.
enter—to penetrate.
face—a surface of an object.
fastener—a hardware device that mechanically joins or affixes two or more objects together.
flange—a rib or rim that can be used for strength, guiding, or for attachment to another object.
flow—movement of a liquid and/or gas from one location to another.
fluid—a liquid and/or gas.
form—to construct.
frame—a rigid structure that surrounds or encloses something such as a mold.
fuel cell—a device and/or system that produces an electric current directly from a chemical reaction.
house—to substantially surround.
impervious—not allowing penetration of something.
information—a distinct piece of data, usually formatted in a special or predetermined way and/or organized to express concepts.

information device—any device capable of processing data and/or information, such as any general purpose and/or special purpose computer, such as a personal computer, workstation, server, minicomputer, mainframe, supercomputer, computer terminal, laptop, wearable computer, and/or Personal Digital Assistant (PDA), mobile terminal, Bluetooth device, communicator, "smart" phone (such as a Treo-like device), messaging service (e.g., Blackberry) receiver, pager, facsimile, cellular telephone, a traditional telephone, telephonic device, a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general any device on which resides a finite state machine capable of implementing at least a portion of a method, structure, and/or or graphical user interface described herein may be used as an information device. An information device can comprise components such as one or more network interfaces, one or more processors, one or more memories containing instructions, and/or one or more input/output (I/O) devices, one or more user interfaces coupled to an I/O device, etc.

install—to connect or set in position and prepare for use.

interior—an inside portion of.

lay—to be positioned on a surface of an object to rest.

length—a longest dimension of an object when the object is fully laid out.

lateral groove—a long narrow cut or depression on each side of a mounting hub that is constructed to receive a corresponding ridge of a chassis.

lift lug—a handle or projection used as a hold or support for transportation and lifting purposes.

liquid—a nearly incompressible fluid that conforms to the shape of its container but retains a substantially constant volume independent of pressure.

mandrel—a central part of a pig assembly that comprises a hollow metal body, a solid center rod, or other rigid shaft fitted with two flanged ends to which a front and rear-mounting hub are attached.

material—a substance comprised by something.

mating surface—an object exterior portion that engages with a corresponding surface of another object.

may—is allowed and/or permitted to, in at least some embodiments.

measuring instrument—a sensor that measures a value in a pipeline.

method—a process, procedure, and/or collection of related activities for accomplishing something.

mold—to form with a distinctive shape with an easily manipulated material.

more rigid—having a greater stiffness than and a Durometer hardness that is greater than 85 on the Shore A hardness scale.

mounting hub—a central component that serves to couple components that define the pig assembly (e.g., chassis components). The mounting hub defines a lateral groove on each side that receives a corresponding ridge from each chassis.

mounting plate—a solid piece of material that has enough strength and sturdiness to serve as a surface to which other things are attached and secured.

obstruction—something that blocks a pipeline.

penetrate—to pass through something.

pipe pig—a system constructed to perform one or more pipeline maintenance operations (e.g., cleaning and/or inspecting the pipeline), which pipeline maintenance operations can be performed with or without stopping flow through the pipeline. Certain pigs are constructed to be used unidirectionally. Other pigs are constructed to be used bidirectionally.

pipe—a tube that is constructed to transport liquids and/or gases.

pipeline—a conduit that comprises pipes connected end-to-end that transports fluid or gas.

place—to position something in a location.

plate—a component having at least one substantially planar surface.

platform assembly—a portion of a pig that comprises (i) a mandrel comprising body flanges, which are coupled to a front mounting hub and a second mounting hub via a first plurality of fasteners; (ii) a two piece chassis assembly that is held in place via lateral grooves and secured in place to at least one of the mounting hubs via a second plurality of fasteners; and (iii) a sealing element that is aligned and held in place via anchor lugs embedded in cavities defined by the chassis.

plurality—the state of being plural and/or more than one.

posterior—a last portion to arrive at a given location as an object travels through a pipe.

predetermined—established in advance.

prevent—to substantially stop something from happening.

provide—to furnish, supply, give, and/or make available.

proximity—near to.

raised region—a portion of a sealing element that is approximately that of a pipe through which a pipe pig traverses.

receive—to get as a signal, take, acquire, and/or obtain.

remove—to get rid of something.

restrain—to control motion of something.

reversible—capable in of being directionally reversed and continue to functionally perform.

rib—a raised portion on a sealing element that touches the inside surface of a pipe.

roller—a wheel.

rotate—to turn around an axis.

seal—to make substantially impervious to fluid entry.

sealing element—a molded object configured out of malleable material having a shape and footprint that touches an inner surface of a pipe through which a pig travels. The sealing element comprises anchor lugs, which are projected prongs by which the sealing element is coupled, supported, and held in place by a plurality of cavities defined by chassis, wherein outer ends of each anchor lug emerges past a face of the chassis, which provides a circumferential strengthening means. The sealing element comprises one or more wear rings, which can be color infused layers embedded on the sealing element ribs to indicate wear and/or a need for replacement.

set—a related plurality.

shape—a sectional contour.

sized and shaped—having a particular dimension and cross-sectional profile.

sleeve—a tubular pin.

substantially—to a great extent or degree.

support—to bear the weight of, especially from below.

support ring—an annular component that is coupled inside via a cavity defined by a sealing element (which sealing element can be symmetrical). In some embodiments the support ring can be coupled to the sealing via a plurality of fasteners on a mounting hub (which mounting hub can be symmetrical). In other embodiments, the support ring can be integrally molded with the sealing element.

symmetrical—having a substantially similar appearance when rotated one hundred and eighty degrees.

system—a collection of mechanisms, devices, machines, articles of manufacture, processes, data, and/or instructions, the collection designed to perform one or more specific functions.

threaded—comprising ridges machined into a cylinder or cone in the form of a helix that allow coupling via opposing corresponding ridges.

tightly fit—assembled with surfaces substantially in contact with one another.

transmit—to send as a signal, provide, furnish, and/or supply.

traverse—to travel from a first location to a second location.

unidirectional—constructed to move or operate in a single direction in a pipe.

unitary—one-pieced.

user—a person employing a device and/or system.

via—by way of and/or utilizing.

wear ring—a mark on a surface or color infused layer embedded on ribs (or raised regions) of a sealing element, which is used to indicate wear and replacement.

Note

Still other substantially and specifically practical and useful embodiments will become readily apparent to those skilled in this art from reading the above-recited and/or herein-included detailed description and/or drawings of certain exemplary embodiments. It should be understood that numerous variations, modifications, and additional embodiments are possible, and accordingly, all such variations, modifications, and embodiments are to be regarded as being within the scope of this application.

Thus, regardless of the content of any portion (e.g., title, field, background, summary, description, abstract, drawing figure, etc.) of this application, unless clearly specified to the contrary, such as via explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

no characteristic, function, activity, or element is "essential";

any elements can be integrated, segregated, and/or duplicated;

any activity can be repeated, any activity can be performed by multiple entities, and/or any activity can be performed in multiple jurisdictions; and any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

When any claim element is followed by a drawing element number, that drawing element number is exemplary and non-limiting on claim scope. No claim of this application is intended to invoke paragraph six of 35 USC 112 unless the precise phrase "means for" is followed by a gerund.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such material is specifically not incorporated by reference herein.

Accordingly, every portion (e.g., title, field, background, summary, description, abstract, drawing figure, etc.) of this application, other than the claims themselves, is to be regarded as illustrative in nature, and not as restrictive, and the scope of subject matter protected by any patent that issues based on this application is defined only by the claims of that patent.

What is claimed is:

1. A system comprising:
a pipe pig, said pipe pig comprising:
a substantially unitary anterior sealing element, said anterior sealing element defining a core hole that extends through a body of said anterior sealing element, said anterior sealing element comprising:
an anterior end and a posterior end, said anterior end of said anterior sealing element comprising a plurality of anterior anchor lugs, said posterior end of said anterior sealing element comprising a plurality of posterior anchor lugs; and
at least one anterior sealing element sealing ring, said at least one anterior sealing element sealing ring deformable to substantially conform to a shape of a pipe through which said pipe pig traverses, at least one anterior sealing element sealing ring constructed to substantially prevent fluid flow between said at least one anterior sealing element sealing ring and said pipe;
a first anterior sealing element chassis, said first anterior sealing element chassis being a Chassis A design, said first anterior sealing element chassis defining a plurality of first anterior sealing element chassis apertures, each of said plurality of first anterior sealing element chassis apertures engaged with a corresponding one of said plurality of anterior anchor lugs to restrain movement of first said anterior sealing element chassis relative to the sealing element when engaged with corresponding anterior anchor lugs of said first anterior sealing element;
a second anterior sealing element chassis, said second anterior sealing element chassis defining a plurality of second anterior sealing element chassis apertures, each of said plurality of second anterior sealing element chassis apertures engaged with a corresponding one of said plurality of posterior anchor lugs to restrain movement of said second anterior sealing element chassis relative to the sealing element when engaged with corresponding posterior anchor lugs of said anterior sealing element; and a first mounting hub coupled directly to said first anterior sealing element chassis and said second anterior sealing element chassis via a plurality of first mounting hub fasteners, wherein said core hole of said anterior sealing element is sized and shaped so as to tightly fit over a mating surface of said first mounting hub, said first mounting hub providing circumferential support to said anterior sealing element when coupled to said anterior sealing element; and a mandrel coupled to said first mounting hub;

wherein said pipe pig is substantially impervious to liquid entering an interior of said anterior sealing element after said pipe pig is assembled.

2. The system of claim 1, wherein:

said first mounting hub is coupled to said anterior sealing element such that movement therebetween is restrained; and said first mounting hub has a circumferential support surface that supports an inner surface of said anterior sealing element.

3. The system of claim 1, further comprising:

a support ring disposed between said first mounting hub and said first sealing element.

4. The system of claim 1, further comprising:

a support ring molded with said anterior sealing element, wherein said support ring defines a plurality of apertures via which material comprised by said anterior sealing element flows to form said anterior sealing element.

5. The system of claim 1, further comprising:

a mounting plate coupled to said first mounting hub; and a lift lug coupled to said mounting plate via a plurality of lift lug fasteners, wherein said lift lug is used to couple said pipe pig to a lifting apparatus such that said pipe pig is placed in, or removed from, said pipe.

6. The system of claim 1, further comprising:

an end cap coupled to said first mounting hub, said end cap constructed to be in direct contact with materials encountered anterior to said pipe pig as said pipe pig traverses said pipe.

7. The system of claim 1, further comprising:

an end cap coupled to said first mounting hub, said end cap comprising a cutting head that assists in penetrating blockages in said pipe.

8. The system of claim 1, further comprising:

an end cap coupled to said first mounting hub, said end cap comprising a plurality of rollers that assist in aligning and/or supporting said system as it traverses said pipe.

9. The system of claim 1, further comprising:

an electric motor that is housed within a sealed cavity either at least partially defined by said first mounting hub or defined by said mandrel, said electric motor causing an attachment to said system to rotate relative to said pipe pig.

10. The system of claim 1, further comprising:

a fuel cell or battery pack that is housed within a sealed cavity at least partially defined by said mounting hub or defined by said mandrel, said battery pack providing sufficient energy to power an electric motor or a measuring instrument.

11. The system of claim 1, further comprising:

a measuring instrument that is housed within a sealed cavity at least partially defined by said first mounting hub or defined by said mandrel, said measuring instrument transmitting information concerning said pipe.

12. The system of claim 1, further comprising:

wherein said mounting hub is of a more rigid construction than said anterior sealing element.

13. The system of claim 1, further comprising:

a substantially unitary posterior sealing element, said posterior sealing element comprising:

an anterior end and a posterior end, said anterior end of said posterior sealing element comprising a plurality of anterior anchor lugs, said posterior end of said posterior sealing element comprising a plurality of posterior anchor lugs; and at least one posterior sealing element sealing ring, said at least one posterior sealing element sealing ring deformable to substantially conform to said shape of said pipe, said at least one posterior sealing element sealing ring constructed to substantially prevent fluid flow between said at least one anterior sealing element sealing ring and said pipe.

14. The system of claim 1, wherein:

at least one sealing element comprises a brush, said at least one sealing element one of a plurality of sealing elements, the plurality of sealing elements comprising said anterior sealing element.

15. The system of claim 1, wherein:

said anterior sealing element comprises a surface that defines a cup; and said second anterior sealing element chassis is a Chassis B design.

16. The system of claim 1, wherein:

said anterior sealing element has a molded body of a deformable material.

17. The system of claim 1, wherein:

wherein, outer face of said sealing element defines a profile of raised regions, profile of raised regions comprising said at least one anterior sealing element sealing ring, wherein each raised region of said profile of raised regions is constructed to deform as the pipe traverses a pipeline to conform to a contour of said pipe.

18. The system of claim 1, wherein:

said anterior sealing element is molded as a single unit.

19. A system comprising:

a pipe pig, said pipe pig comprising:

a first mounting hub;

an attachment, said attachment directly coupled to said first mounting hub, wherein, via a powered shaft, said attachment rotates relative to said mounting hub; and a substantially unitary anterior sealing element, said anterior sealing element defining a core hole that extends through a body of said anterior sealing element, said anterior sealing element comprising at least one anterior sealing element sealing ring, said at least one anterior sealing element sealing ring deformable to substantially conform to a shape of a pipe through which said pipe pig traverses, said at least one anterior sealing element sealing ring constructed to substantially prevent fluid flow between said at least one anterior sealing element sealing ring and said pipe, wherein an interior surface of said anterior sealing element is substantially in contact with an outer radial surface of said first mounting hub.

20. The system of claim 19, wherein:

said anterior sealing element comprises an anterior end and a posterior end, said anterior end of said anterior sealing element comprising a plurality of anterior anchor lugs, said posterior end of said anterior sealing element comprising a plurality of posterior anchor lugs;

said system comprises a first anterior sealing element chassis, said first anterior sealing element chassis being a Chassis A design, said first anterior sealing element chassis defining a plurality of first anterior sealing element chassis apertures, each of said plurality of first anterior sealing element chassis apertures engaged with a corresponding one of said plurality of posterior anchor lugs to restrain movement of first said anterior sealing element chassis relative to the sealing element when engaged with corresponding posterior anchor lugs of said anterior sealing element; and said system comprises a second anterior sealing element chassis, said second anterior sealing element chassis defining a plurality of second anterior sealing element chassis apertures, each of said plurality of second anterior sealing element chassis apertures engaged with a corresponding one of said plurality of anterior anchor lugs to restrain movement of said second anterior sealing element chassis relative to the sealing element when engaged with corresponding anterior anchor lugs of said anterior sealing element.

* * * * *